US006985113B2

(12) United States Patent
Nishimura et al.

(10) Patent No.: US 6,985,113 B2
(45) Date of Patent: Jan. 10, 2006

(54) RADIO ANTENNA APPARATUS PROVIDED WITH CONTROLLER FOR CONTROLLING SAR AND RADIO COMMUNICATION APPARATUS USING THE SAME RADIO ANTENNA APPARATUS

(75) Inventors: Shotaro Nishimura, Tsuyama (JP); Atsushi Yamamoto, Osaka (JP); Koichi Ogawa, Hirakata (JP); Hiroshi Iwai, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/824,347

(22) Filed: Apr. 15, 2004

(65) Prior Publication Data
US 2004/0248523 A1    Dec. 9, 2004

(30) Foreign Application Priority Data
Apr. 18, 2003    (JP) .......................... P2003-113884

(51) Int. Cl.
    H01Q 1/24    (2006.01)
(52) U.S. Cl. .............................. 343/702; 343/700 MS; 343/895; 455/78; 455/575.7
(58) Field of Classification Search ......... 343/700 MS, 343/702, 829, 895, 846, 860; 324/244, 247; 455/78, 89, 90, 575.7
    See application file for complete search history.

(56) References Cited

U.S. PATENT DOCUMENTS

| 5,610,519 A | * | 3/1997 | Hankui et al. ............... 324/247 |
| 5,789,929 A |   | 8/1998 | Hankui ........................ 324/642 |
| 5,977,917 A |   | 11/1999 | Hirose ......................... 343/702 |
| 6,211,830 B1 | * | 4/2001 | Monma et al. ............. 343/702 |
| 6,285,893 B1 |   | 9/2001 | Keirinbou ................. 455/575.7 |
| 6,456,248 B2 |   | 9/2002 | Ito ............................... 343/702 |
| 6,657,595 B1 | * | 12/2003 | Phillips et al. ............... 343/702 |
| 6,664,930 B2 | * | 12/2003 | Wen et al. ................... 343/702 |
| 2002/0094789 A1 |  | 7/2002 | Harano ..................... 455/575.7 |
| 2004/0094316 A1 | * | 5/2004 | Ohno et al. ............... 174/35 R |

FOREIGN PATENT DOCUMENTS

| EP | 0 860 897 | 8/1998 |
| EP | 0 970 988 | 1/2000 |
| GB | 2 327 572 | 1/1999 |
| JP | 2790103 | 6/1998 |

(Continued)

OTHER PUBLICATIONS

Niels Kuster et al., *Energy Absorption Mechanism by Biological Bodies in the Near Field of Dipole Antennas Above 300 MHz*, IEEE Transaction on Vehicular Technology, vol. 41, No. 1, pp. 17-23, Feb. 1992.

(Continued)

Primary Examiner—Tho Phan
(74) Attorney, Agent, or Firm—Wenderoth, Lind & Ponack, L.L.P.

(57) ABSTRACT

A radio antenna apparatus is provided with an antenna connected with a radio communication circuit that transmits and receives a radio signal. A load impedance element is connected between a parasitic element of an electrical conductor plate and a ground of a housing of a radio communication apparatus including the radio communication circuit. A controller controls an element value of the load impedance element so as to set a current flowing on the housing to be equal to or smaller than a predetermined value when the radio communication apparatus transmits the radio signal, thereby controlling a specific absorption rate (SAR) to be equal to or smaller than a predetermined value.

18 Claims, 45 Drawing Sheets

FOURTH PREFERRED EMBODIMENT

FOREIGN PATENT DOCUMENTS

| | | |
|---|---|---|
| JP | 2000-82333 | 3/2002 |
| JP | 2002-107396 | 4/2002 |
| WO | 02/075846 | 9/2002 |

OTHER PUBLICATIONS

"*Standard of Specific Absorption Rate Measurement Method of Portable Radio Terminal*", issued by Association of Radio Industries and Business in Japan, ARIB STB-T56 Ver. 2.0, revised on Jan. 24, 2002.

Bernhard Rosenberger, "*Miniature Dielectric-loaded Personal Telephone Antennas with Low SAR*", Radio and Wireless Conference, 1998, Rawcon 98, IEEE Colorado Springs, Colorado, U.S.A., Aug. 9, 1998, pp. 103-108.

Yoshio Koyanagi et al., "*Estimation of the Radiation and SAR Characteristics of the NHA at 150 MHz by Use of the Cylindrical Whole Body Phantom*", IEEE Antennas and Propagation Society International Symposium, 2001, Digest, APS, Boston Massachusetts, U.S.A., Jul. 8, 2001, New York, vol. 1 of 4, pp. 78-81.

\* cited by examiner

FIRST PREFERRED EMBODIMENT
f=900MHz

SECOND PREFERRED EMBODIMENT

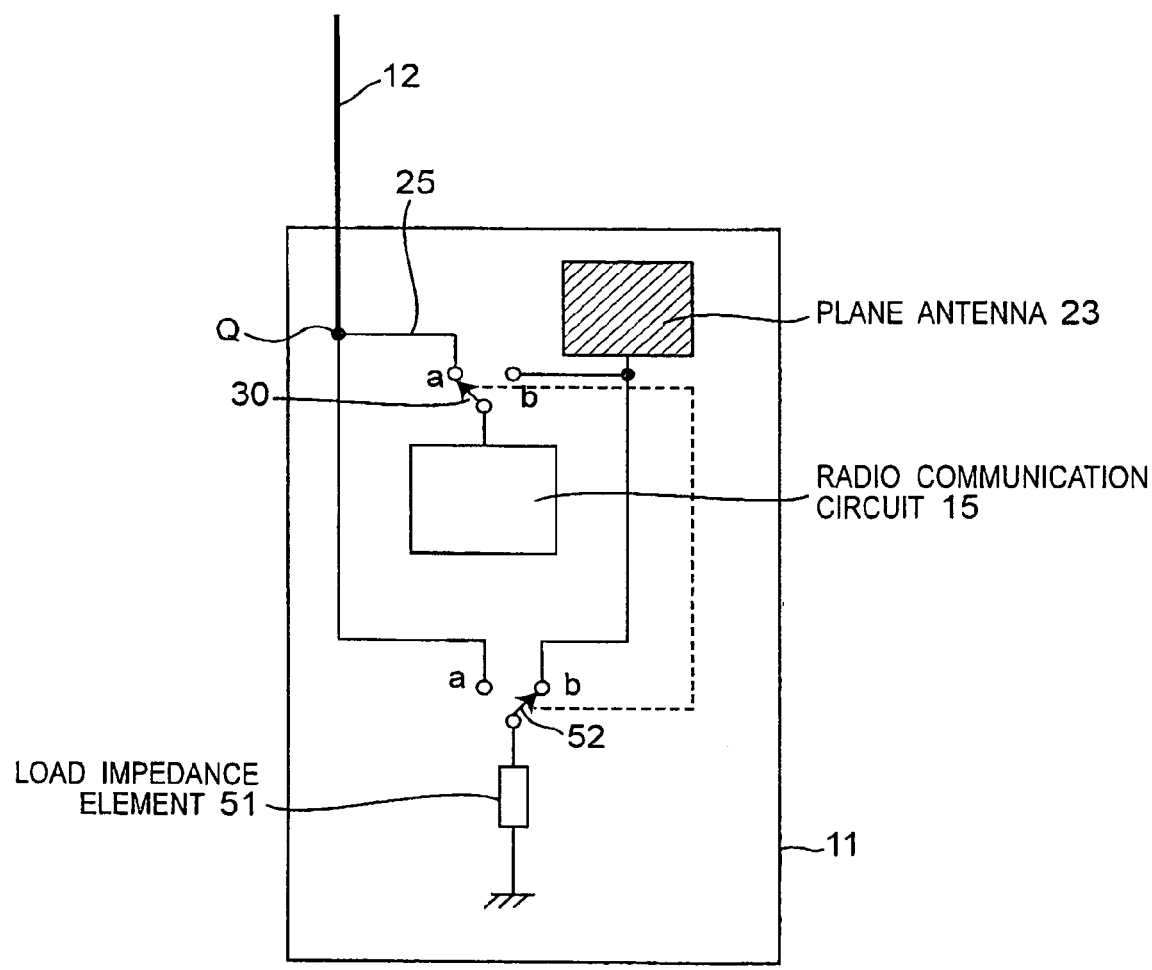

FOURTH PREFERRED EMBODIMENT

MODIFIED PREFERRED EMBODIMENT OF FOURTH
PREFERRED EMBODIMENT

FOURTH PREFERRED EMBODIMENT
f=1.5GHz

FIFTH PREFERRED EMBODIMENT

MODIFIED PREFERRED EMBODIMENT OF FIFTH
PREFERRED EMBODIMENT

*Fig.20A*
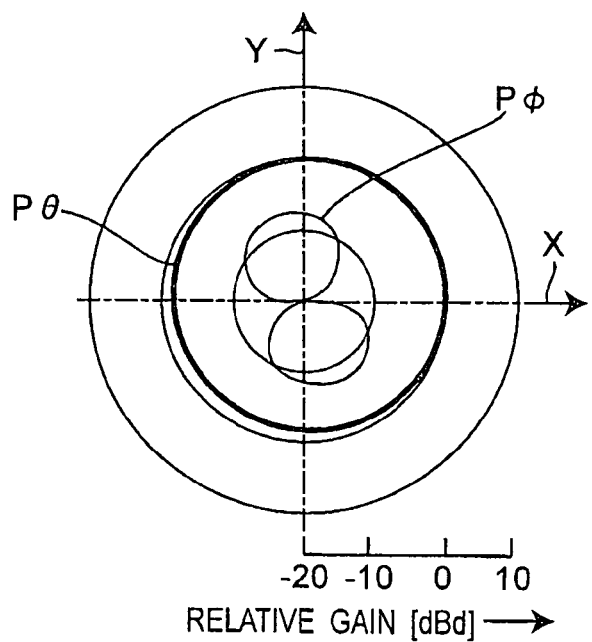
*Fig.20B*  *Fig.20C*
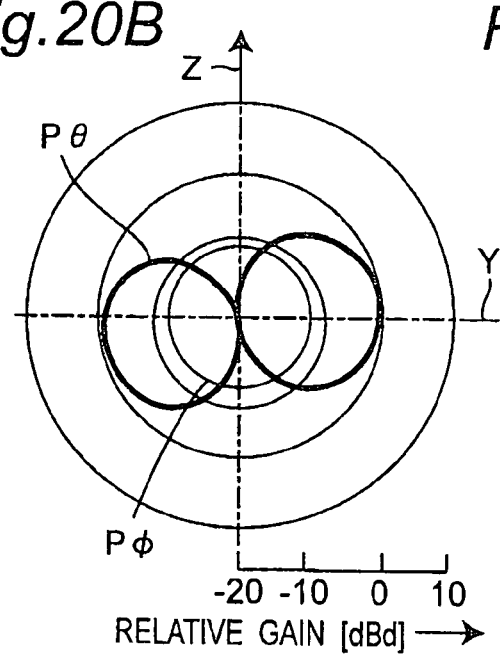 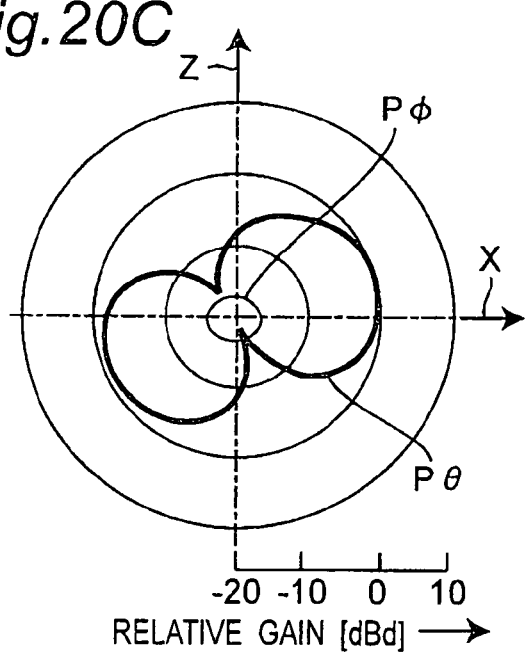

FIRST MODIFIED PREFERRED EMBODIMENT

SECOND MODIFIED PREFERRED EMBODIMENT

FIRST IMPLEMENTAL EXAMPLE

SECOND IMPLEMENTAL EXAMPLE

THIRD IMPLEMENTAL EXAMPLE

FOURTH IMPLEMENTAL EXAMPLE

FIFTH IMPLEMENTAL EXAMPLE

SIXTH IMPLEMENTAL EXAMPLE

SEVENTH IMPLEMENTAL EXAMPLE

EIGHTH IMPLEMENTAL EXAMPLE

NINTH IMPLEMENTAL EXAMPLE

TENTH IMPLEMENTAL EXAMPLE

RADIO ANTENNA APPARATUS PROVIDED WITH CONTROLLER FOR CONTROLLING SAR AND RADIO COMMUNICATION APPARATUS USING THE SAME RADIO ANTENNA APPARATUS

BACKGROUND OF THE INVENTION

1. Field of the Invention

The present invention relates to a radio antenna apparatus provided with a controller for controlling a specific absorption rate (referred to as an SAR hereinafter), and a radio communication apparatus using the same radio antenna apparatus, such as a portable telephone, a car telephone, or the like.

2. Description of the Related Art

Recently, radio communication apparatuses such as a portable telephone and a car telephone have rapidly spread. The size of each of these radio communication apparatuses has been increasingly reduced year by year. Because of reduction in size of the radio communication apparatus, radio waves are radiated not only from an antenna but also from a housing of the radio communication apparatus. That is, electromagnetic waves are radiated from the entire radio communication apparatus.

A part of the electromagnetic wave radiated from the antenna and the radio communication apparatus is absorbed by a human body. A rate of a power quantity by which the human body absorbs the electromagnetic wave among the radiated radio waves are represented by an SAR. For the past few years, a guideline for suppressing the SAR is established and it is obligated to set the SAR to be equal to or smaller than a predetermined specified value as disclosed at, for example, a prior art document of Niels Kuster et al., "Energy Absorption Mechanism by Biological Bodies in the Near Field of Dipole Antennas Above 300 MHz", IEEE Transactions on Vehicular technology, Vol. 41, No. 1, pp. 17–23, February 1992. For instance, since a portable telephone is used while being in the proximity to a head of the human body during telephone conversation, the head greatly absorbs the radio wave. In particular, since the housing is in contact with an ear or a cheek of the human body, the SAR may possibly be the highest on the housing.

FIG. 45 is a front view showing that the radio communication apparatus including a radio antenna according to a prior art is supported by the head of the human body. FIG. 46 is a perspective view showing an appearance of the radio communication apparatus shown in FIG. 45.

The radio communication apparatus shown in FIGS. 45 and 46 includes a whip antenna 1112 provided to extend upward from an upper portion of a housing 1111 of a rectangular parallelepiped shape, and an electrical conductor plate 1113 provided to be connected with the housing 1111 so as to be in parallel to a front surface (opposing to a user's face) opposite to a rear surface at the side of the whip antenna 1112. By connecting the conductor plate 1113 with the housing 1111, an electromagnetic wave in a direction of the human body, among those radiated from the radio communication apparatus in radiation directions indicated by an arrow 1113A and an arrow 1113B, can be shielded, and the SAR caused by the radio wave can be reduced (See, for example, U.S. Pat. No. 6,456,248).

However, the shape of the conductor plate 1113 according to the prior art is restricted, so that all the radio waves radiated from the radio communication apparatus cannot be shielded. Therefore, the effect of reduction of the SAR is insufficient only by shielding a part of the radio waves.

SUMMARY OF THE INVENTION

It is an object of the present invention to provide a radio antenna apparatus and a radio communication apparatus including the same radio antenna apparatus, each capable of shielding substantially almost all radio waves radiated from a radio communication apparatus from a human body, with a configuration simpler than that of prior art, thereby remarkably reducing an SAR.

In order to achieve the aforementioned objective, according to one aspect of the present invention, there is provided a radio antenna apparatus including an antenna connected with a radio communication circuit that transmits and receives a radio signal. In the radio antenna apparatus, a load impedance element is connected between a parasitic element and a ground of a housing of a radio communication apparatus including the radio communication circuit. A controller controls an element value of the load impedance element so as to set a current flowing on the housing to be equal to or smaller than a predetermined value when the radio communication apparatus transmits the radio signal, thereby controlling a specific absorption rate (SAR) to be equal to or smaller than a predetermined value.

According to another aspect of the present invention, there is provided a radio antenna apparatus including first and second antennas. In the radio antenna apparatus, a switch device switches over so as to connect the second antenna to a ground of a housing of a radio communication apparatus including a radio communication circuit, that is provided in the radio communication apparatus and transmits and receives a radio signal, through a load impedance element when the first antenna is connected with the radio communication circuit, and so as to connect the first antenna to the ground of the housing through the load impedance element when the second antenna is connected with the radio communication circuit that transmits and receives the radio signal. A controller controls an element value of the load impedance element so as to set a current flowing on the housing to be equal to or smaller than a predetermined value when the radio communication apparatus transmits the radio signal, thereby controlling a specific absorption rate (SAR) to be equal to or smaller than a predetermined value.

The above-mentioned radio antenna apparatus preferably further includes a storage device for storing, as a table, the element value of the load impedance element at which the current flowing on the housing is equal to or smaller than the predetermined value when the radio communication apparatus transmits the radio signal. In the radio antenna apparatus, the controller controls the element value of the load impedance element with reference to the table stored in the storage device.

The above-mentioned radio antenna apparatus preferably further includes a storage device for storing, for each predetermined frequency as a table, the element value of the load impedance element at which the current flowing on the housing is equal to or smaller than the predetermined value when the radio communication apparatus transmits the radio signal. In the radio antenna apparatus, the controller controls the element value of the load impedance element with reference to the table stored in the storage device, based on a communication frequency of the radio communication apparatus.

The above-mentioned radio antenna apparatus preferably further includes a measurement device for measuring the current flowing on the housing when the radio communication apparatus transmits the radio signal. The controller controls the element value of the load impedance element so as to set the current flowing on the housing to be equal to or smaller than the predetermined value based on the measured current.

In the above-mentioned radio antenna apparatus, the load impedance element preferably includes a plurality of impedance elements respectively having element values different from each other, and a switching device for changing the element value of the load impedance element by selectively changing over one of the plurality of impedance elements.

In the above-mentioned radio antenna apparatus, the load impedance element preferably includes an impedance element capable of changing the element value, and an element value of the impedance element capable of changing the element value is changed thereby changing the element value of the load impedance element.

In the above-mentioned radio antenna apparatus, the load impedance element preferably includes an impedance circuit that includes a variable capacitance diode, and a reverse bias voltage applied to the variable capacitance diode is changed so as to change an impedance of the impedance circuit, thereby changing the element value of the load impedance element.

The above-mentioned radio antenna apparatus preferably further includes a human body proximity sensor for detecting that a human body is in proximity to the housing of the radio communication apparatus, and the element value of the load impedance element is controlled as to set the current flowing on the housing to be equal to or smaller than the predetermined value when the human proximity sensor detects that the human body is in proximity to the radio communication apparatus and the radio communication apparatus transmits the radio signal.

The above-mentioned radio antenna apparatus preferably further includes a human body proximity sensor for detecting that a human body is in proximity to the housing of the radio communication apparatus, and a temperature sensor for measuring a body temperature when the human body contacts with the housing of the radio communication apparatus. In the radio antenna apparatus, the element value of the load impedance element is controlled so as to set the current flowing on the housing to be equal to or smaller than the predetermined value, when the body temperature measured by the temperature sensor is equal to or higher than a predetermined value, the human proximity sensor detects that the human body is in proximity to the radio communication apparatus, and the radio communication apparatus transmits the radio signal.

The above-mentioned radio antenna apparatus preferably further includes a human body proximity sensor for detecting that a human body is in proximity to the housing of the radio communication apparatus, and a touch sensor for measuring a stress when the human body contacts with the housing of the radio communication apparatus. In the radio antenna apparatus, the element value of the load impedance element is controlled so as to set the current flowing on the housing to be equal to or smaller than the predetermined value, when the stress measured by the touch sensor is equal to or larger than a predetermined value, the human proximity sensor detects that the human body is in proximity to the radio communication apparatus, and the radio communication apparatus transmits the radio signal.

The above-mentioned radio antenna apparatus preferably further includes a human body proximity sensor for detecting that a human body is in proximity to the housing of the radio communication apparatus, a touch sensor for measuring a stress when the human body contacts with the housing of the radio communication apparatus, and a temperature sensor for measuring a body temperature when the human body contacts with the housing of the radio communication apparatus. In the radio antenna apparatus, the element value of the load impedance element is controlled so as to set the current flowing on the housing to be equal to or smaller than the predetermined value, when the body temperature measured by the temperature sensor is equal to or higher than a predetermined value, the stress measured by the touch sensor is equal to or larger than a predetermined value, the human proximity sensor detects that the human body is in proximity to the radio communication apparatus, and the radio communication apparatus transmits the radio signal.

In the above-mentioned radio antenna apparatus, the antenna is preferably either one of a monopole antenna and a helical antenna, and the parasitic element is preferably an electrical conductor plate.

In the above-mentioned radio antenna apparatus, the first antenna is preferably either one of a monopole antenna and a helical antenna, and the second antenna is preferably a plane antenna or an inverse F antenna.

According to a further aspect of the present invention, there is provided a radio communication apparatus including a radio antenna apparatus including an antenna connected with a radio communication circuit that transmits and receives a radio signal, and a radio communication circuit, operatively connected with the antenna, for transmitting and receiving a radio signal. In the radio antenna, a load impedance element is connected between a parasitic element and a ground of a housing of the radio communication apparatus including the radio communication circuit. A controller controls an element value of the load impedance element so as to set a current flowing on the housing to be equal to or smaller than a predetermined value when the radio communication apparatus transmits the radio signal, thereby controlling a specific absorption rate (SAR) to be equal to or smaller than a predetermined value.

In the above-mentioned radio communication apparatus, the radio communication apparatus is preferably a portable radio communication apparatus.

According to a still further aspect of the present invention, there is provided a radio communication apparatus including a radio antenna apparatus including first and second antennas, and a radio communication circuit, operatively connected with either one of the first antenna and the second antenna, for transmitting and receiving a radio signal. In the above-mentioned radio antenna apparatus, a switch device switches over so as to connect the second antenna to a ground of a housing of the radio communication apparatus including the radio communication circuit, that is provided in the radio communication apparatus and transmits and receives a radio signal, through a load impedance element when the first antenna is connected with the radio communication circuit, and so as to connect the first antenna to the ground of the housing through the load impedance element when the second antenna is connected with the radio communication circuit that transmits and receives the radio signal. A controller controls an element value of the load impedance element so as to set a current flowing on the housing to be equal to or smaller than a predetermined value when the radio communication apparatus transmits the radio signal, thereby controlling a specific absorption rate (SAR) to be equal to or smaller than a predetermined value.

In the above-mentioned radio communication apparatus, the radio communication apparatus is preferably a portable radio communication apparatus.

Therefore, according to the radio antenna apparatus and the radio communication apparatus using the same radio antenna apparatus, substantially almost all radio waves radiated from a radio communication apparatus can be shield from a human body, with a configuration simpler than that of prior art, thereby remarkably reducing an SAR.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 9 is a block diagram showing a configuration of a radio communication apparatus including a radio antenna according to a third preferred embodiment of the present invention;

FIG. 20A is a plan view showing results of an experiment when the radiation pattern from the radio communication apparatus shown in FIG. 16 is measured, and showing a radiation pattern on an XY plane;

FIG. 20B is a plan view showing results of the experiment, and showing a radiation pattern on a YZ plane;

FIG. 20C is a plan view showing results of the experiment, and showing a radiation pattern on a ZX plane;

DETAILED DESCRIPTION OF THE PREFERRED EMBODIMENTS

Preferred embodiments according to the present invention will be described below with reference to the attached drawings.

First Preferred Embodiment

Figure 1:
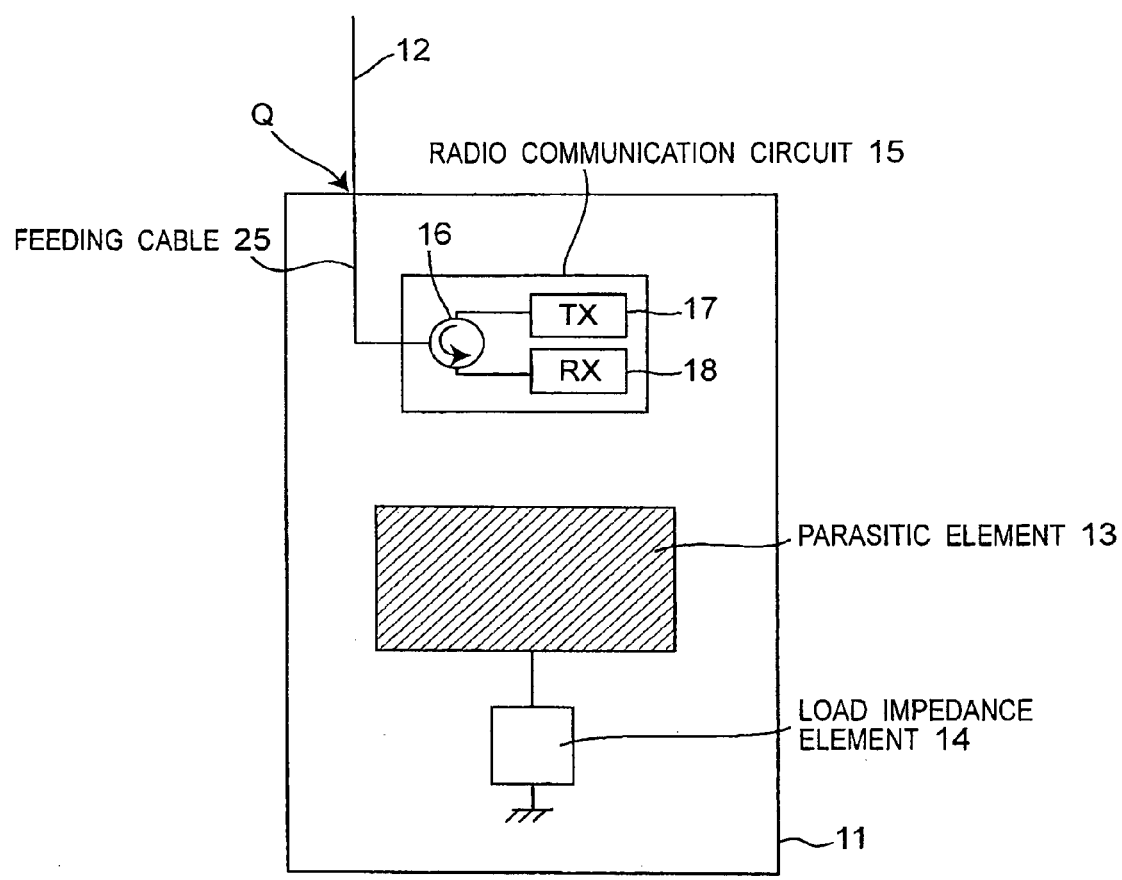
FIG. 1 is a block diagram showing a configuration of a radio communication apparatus including a radio antenna according to a first preferred embodiment of the present invention.

FIG. 1 is a block diagram showing a configuration of a radio communication apparatus including a radio antenna according to a first preferred embodiment of the present invention.

Referring to FIG. 1, a radio communication circuit 15 provided in a housing 11 of the radio communication apparatus includes a radio transmitter circuit 17, a radio receiver circuit 18, and a circulator 16 for sharing one-quarter-wave whip antenna 12 between the two circuits 17 and 18. The radio transmitter circuit 17 executes processings including modulation, high frequency conversion and power amplification on an input voice signal or an input data signal, and then, generates a radio transmitted signal. The radio transmitted signal is outputted to the whip antenna 12 through the circulator 16, a feeding cable 25, and a feeding point Q, and then, a radio wave of the radio transmitted signal is radiated from the whip antenna 12. A radio received signal received by the whip antenna 12 is inputted to the radio receiver circuit 18 through the feeding point Q, the feeding cable 25, and the circulator 16, and then, it is subjected to processings such as low noise amplification, low frequency conversion, and demodulation.

In the housing 11, a parasitic element 13 and a load impedance element 14 are provided. The parasitic element 13 is, for example, a rectangular-plane-shaped electrical conductor plate. The parasitic element 13 is provided, for example, in parallel to a front surface (corresponding to the head of the human body of a user) of the housing 11 to be in proximity to the housing 11 so as to be electromagnetically connected with the housing 11. The parasitic element 13 is connected with the load impedance element 14, and it is connected with the housing 11 through the load impedance element 14 to be grounded.

Figure 2:
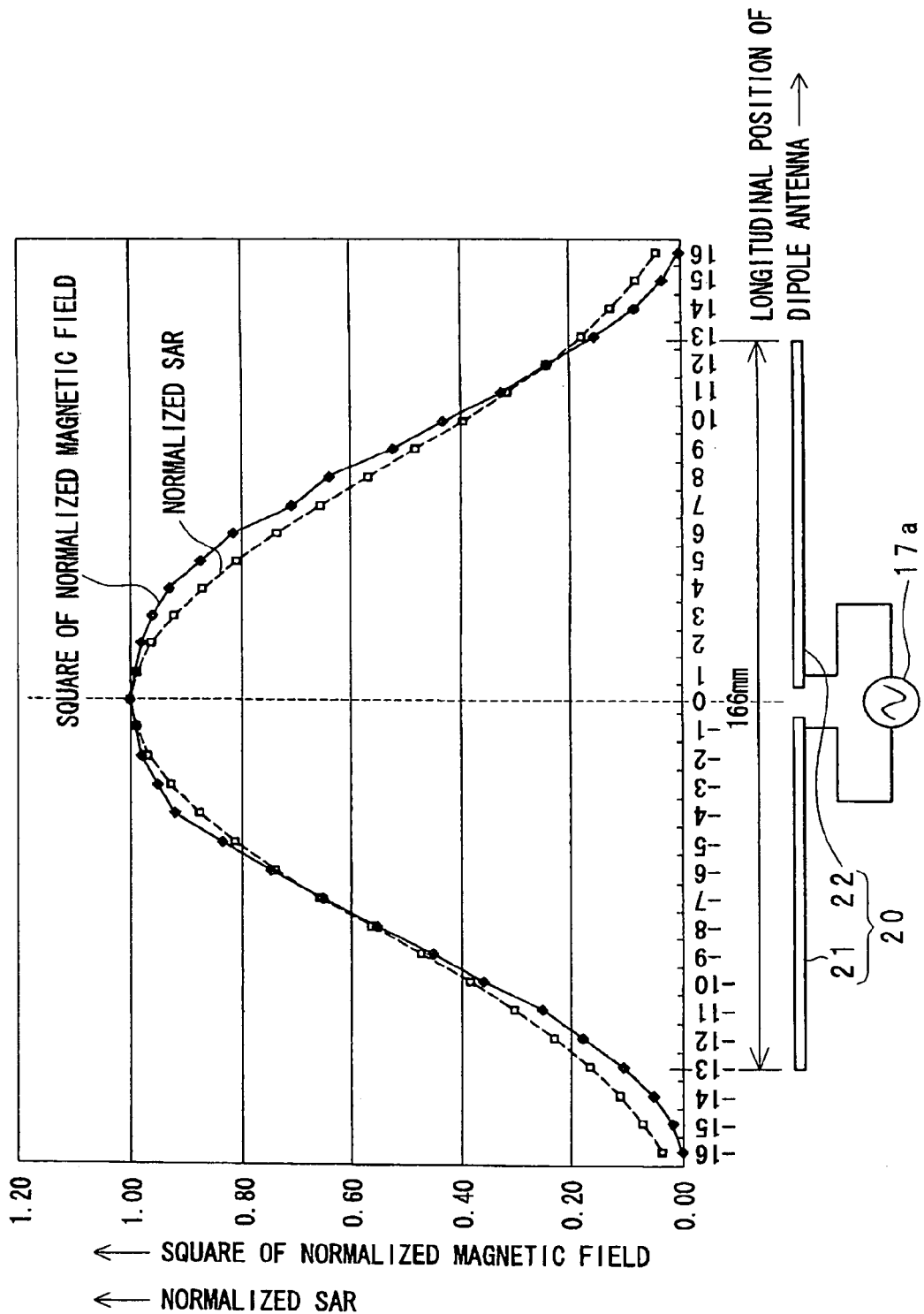
FIG. 2 is a graph showing a relationship between a square of a normalized magnetic field and a normalized SAR relative to a longitudinal position of a half-wave dipole antenna 20 in a near electromagnetic field of radio waves radiated from the half-wave dipole antenna 20.

FIG. 2 is a graph showing a relationship between a square of a normalized magnetic field and a normalized SAR relative to a longitudinal position of a half-wave dipole antenna 20, which is an experimental measurement antenna, in a near electromagnetic field of radio waves radiated from the half-wave dipole antenna 20.

Referring to FIG. 2, a transmitted signal from the radio transmitter circuit 17 is fed to the half-wave dipole antenna 20 including two antenna elements 21 and 22. A near magnetic field during feeding of the signal is detected by a magnetic field probe, and it is measured by using an electric field probe according to a well-known electric field probe method (See, for example, a prior art document of "Standard of Specific Absorption Rate (SAR) Estimation Method for Portable Radio Terminal", ARIB STB-T56 Ver. 2.0, Revised on Jan. 24, 2002, Association of Radio Industries and Business in Japan ("ARSB")), and it is measured by calculating the near electric field using the following Equation (1):

$$SAR=(\sigma \cdot E^2)/\rho \qquad (1).$$

In the Equation (1), a unit of SAR is W/kg, $\sigma$ is a conductivity of a human tissue (dielectric), E is a field intensity of an electric field applied to the human body, and $\rho$ is a specific gravity of the human tissue (dielectric).

As is apparent from FIG. 2, the square $H^2$ of the near magnetic field and the SAR have substantially the same distributions as each other. This follows that the square $H^2$ of the near magnetic field is proportional to the SAR. In addition, since the near magnetic field H is proportional to an antenna current as is well known, a square of the current is proportional to the SAR. In other words, if the current distribution is changed, the SAR can be changed.

Figure 3:
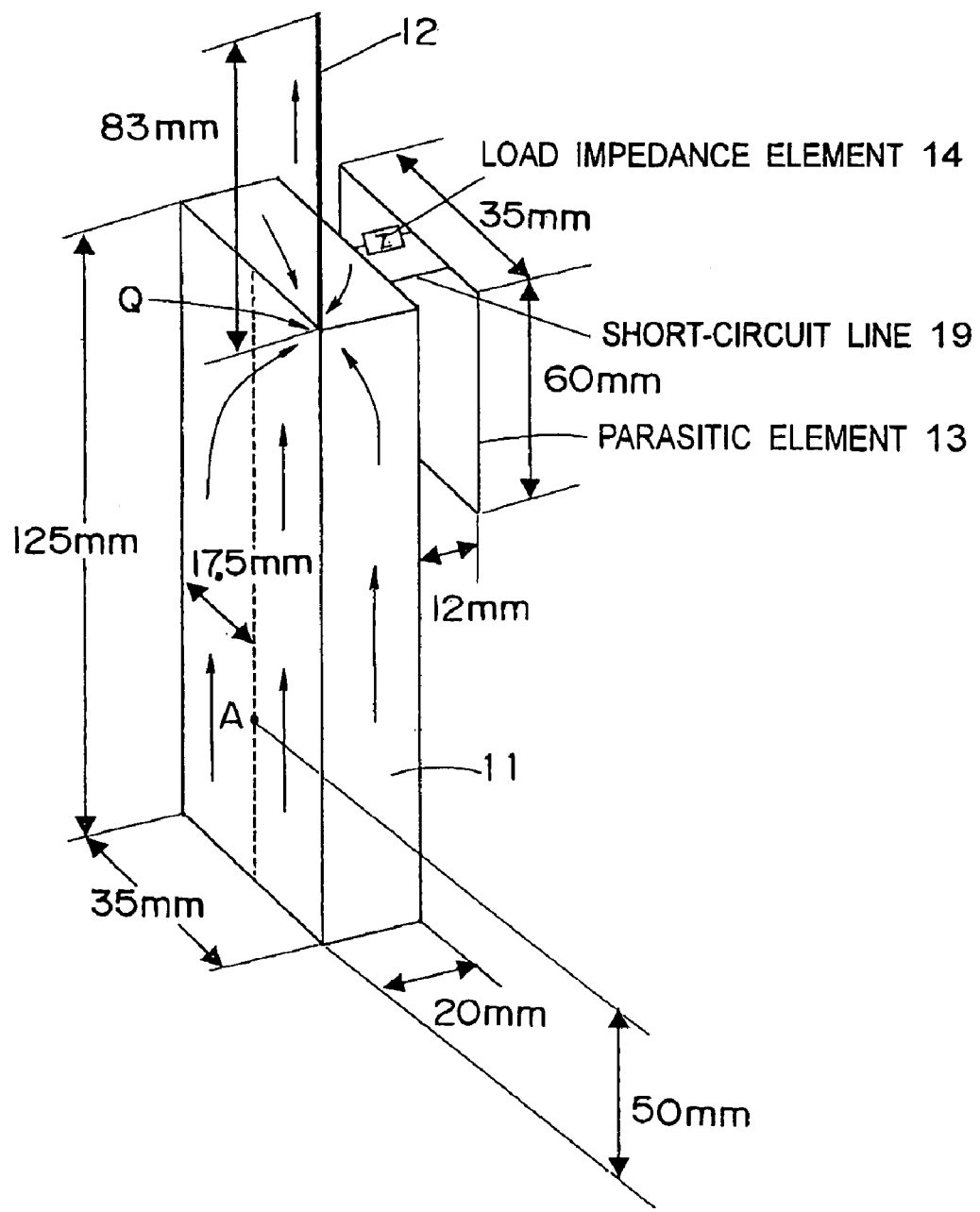
FIG. 3 is a perspective view of a radio communication apparatus model at a transmission frequency "f" of 900 MHz according to the first preferred embodiment.

If the radio waves are radiated from the whip antenna 12, a housing current flows on the housing 11 of the radio communication apparatus toward a feeding point Q above the housing 11 as shown in FIG. 3. Then the inventors of the present invention found out reduction of the SAR by reducing the current flowing on the housing 11 of the radio communication apparatus, or by distributing the current to thereby reduce a local maximum current, according to the following method. In order to change the current flowing on the housing 11 of the radio communication apparatus, the parasitic element 13 is provided in the radio communication apparatus as shown in FIG. 1. The parasitic element 13 is connected with the housing 11 through the load impedance element 14 to be grounded. By changing an impedance of this load impedance element 14, the current flowing on the housing 11 is changed. This can suppress the current distribution of the current flowing on the housing 11 from locally increasing and can reduce the SAR.

Figure 4:
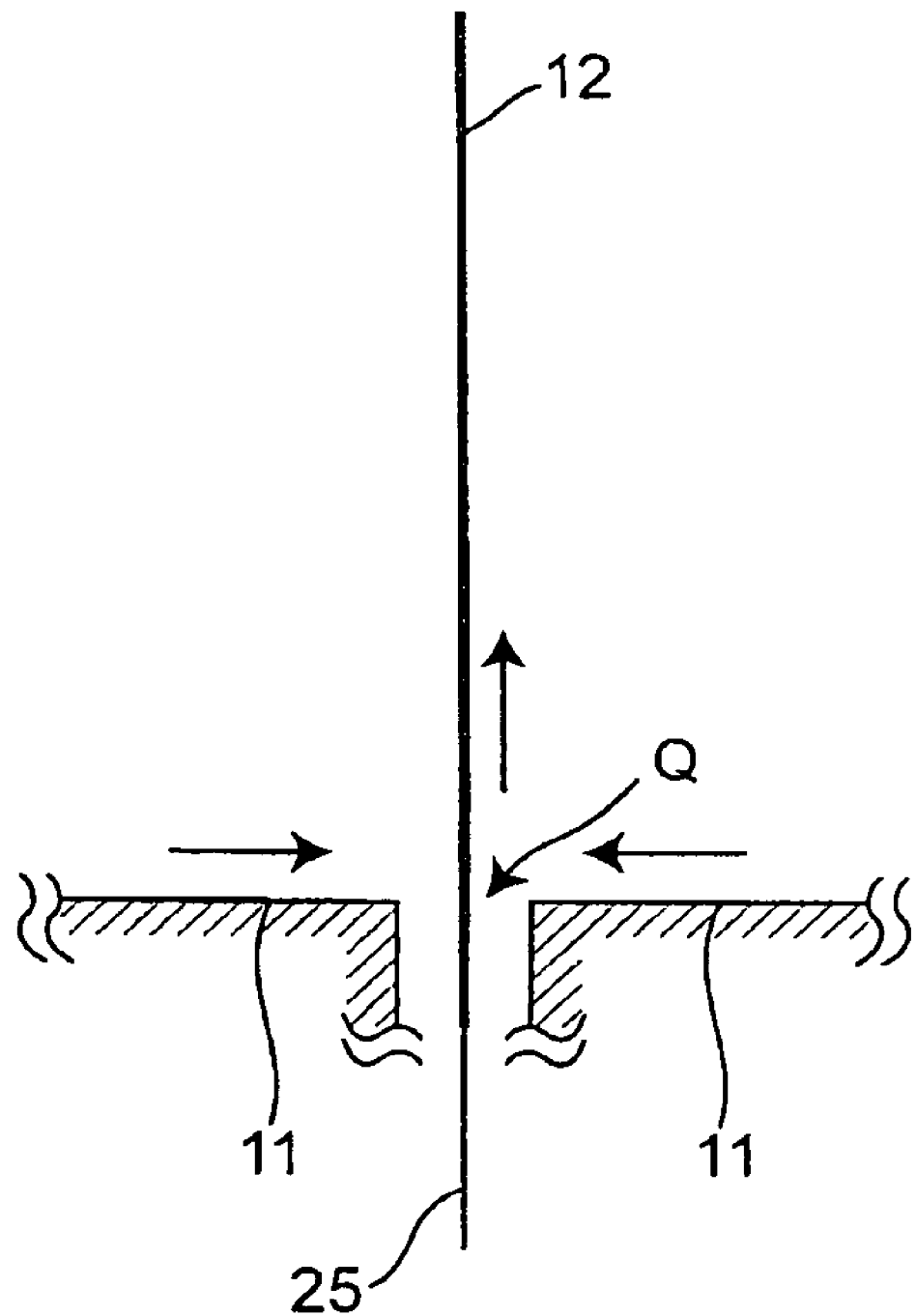
FIG. 4 is a cross-sectional view showing a current generated near a feeding point Q of the radio communication apparatus model shown in FIG. 3.

FIG. 3 is a perspective view of a radio communication apparatus model at a transmission frequency "f" of 900 MHz according to the first preferred embodiment. FIG. 4 is a cross-sectional view showing the current generated near the feeding point Q of the radio communication apparatus model shown in FIG. 3.

Referring to FIG. 3, the whip antenna 12 is provided to extend upward from a front corner on an upper surface of the housing 11 (at the side in the proximity to a rear surface of the housing 11), and includes the feeding point Q in this corner. The parasitic element 13 that is a rectangular electrical conductor plate for shielding is provided to oppose to and in the vicinity of an upper portion on a front surface of the housing 11. The parasitic element 13 is connected with the upper portion on the front surface of the housing 11 through the load impedance element 14 from one point on an upper edge or side of the parasitic element 13, and it is connected with the upper portion on the front surface of the housing 11 through a short-circuit line 19 from another point on the upper edge or side of the parasitic element 13 to be grounded.

In an implemental example of the radio communication apparatus model shown in FIG. 3, the whip antenna 12 is a monopole antenna and made of a metallic wire having an entire length of 83 mm. The parasitic element 13 is made of a metallic plate of 35 mm×60 mm, and it is short-circuited to the housing 11 by the short-circuit line 19 to be grounded. This implemental example shows a model for use in a portable telephone at a frequency of 900 MHz. The SAR is rapidly reduced as the distance of the model to a radiation source is larger. Conversely, at a point in contact with the human body, the SAR is larger. In addition, even at a position at which a current density is not a maximum, the SAR is often the highest. In this implemental example, a current at a point A (shown in FIG. 3) at which the model contacts with the cheek of the human body during telephone conversation is also examined. It is noted that a housing current and a feeding current at the feeding point Q flow as shown in FIG. 4.

Figure 5:
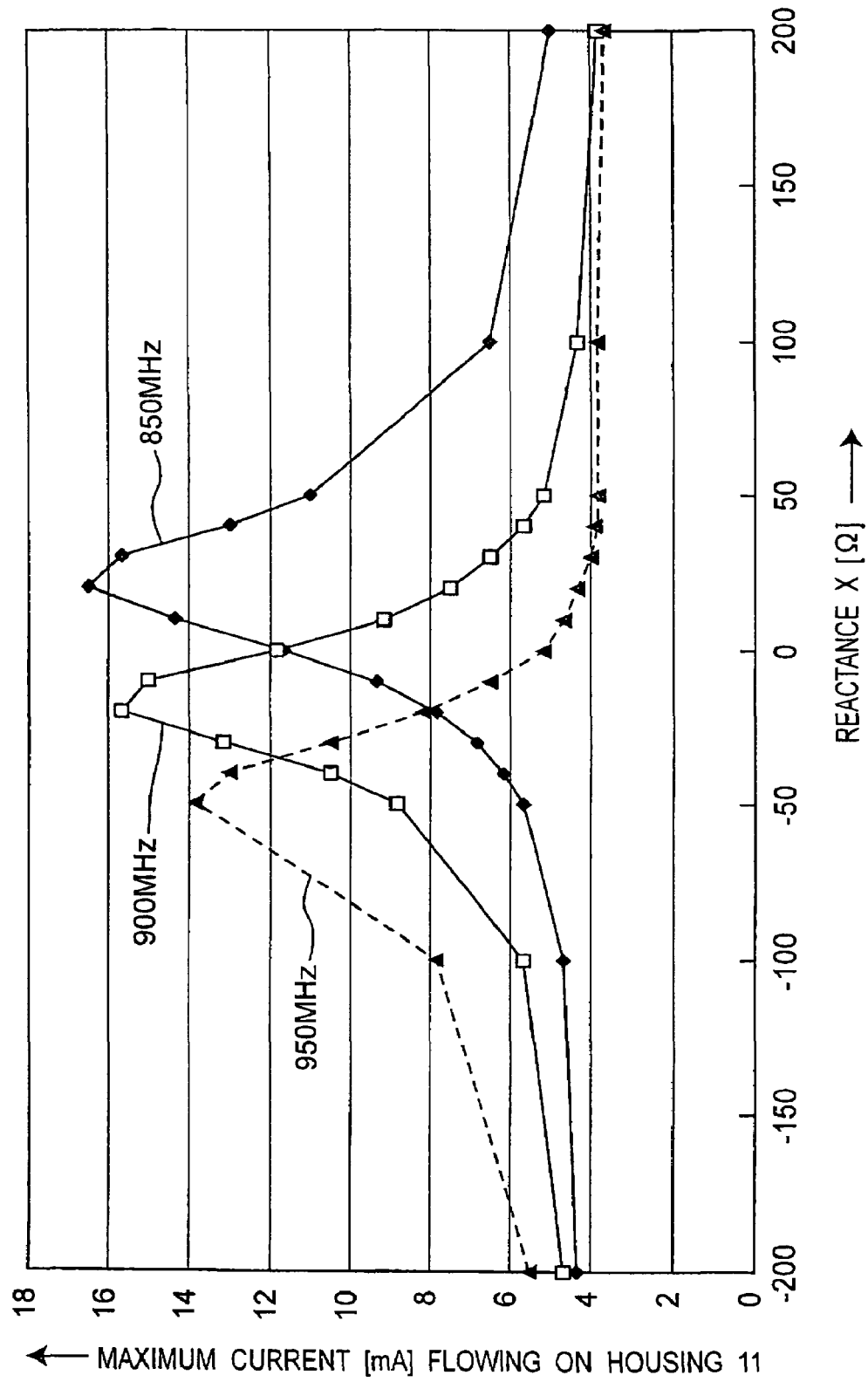
FIG. 5 is a graph showing maximum currents flowing on a housing 11 of the radio communication apparatus when a reactance X of a load impedance element 14 connected with a parasitic element 13 shown in FIG. 3 is changed when transmitting transmitted signals having transmission frequencies "f" of 850, 900, and 950 MHz, respectively.

FIG. 5 is a graph showing maximum currents flowing on the housing 11 of the radio communication apparatus when a reactance X of the load impedance element 14 connected with the parasitic element 13 shown in FIG. 3 is changed when transmitting transmitted signals having transmission frequencies "f" of 850, 900 and 950 MHz, respectively. The graphs of FIGS. 5, 6, 14 and 15 show currents when the current is fed to, for example, the monopole antenna, the load impedance element is connected with an inverse F plane-shaped antenna, and a power of one watt is applied to the monopole antenna.

Referring to FIG. 5, at the frequency "f" of 900 MHz, when the reactance X is changed from −200 to 200 Ω, then the current reaches a maximum at the reactance X of 0 Ω. When the reactance X gets away from 0 Ω, the maximum current decreases as shown in FIG. 5. Then it is understood that the reactance X may be set to satisfy either X<−25 Ω or X>20 Ω so as to set the maximum current at 10 mA or less. Further, it is understood that the load impedance at which the current reaches the maximum is changed as the frequency "f" is changed. However, it is also understood that as an absolute value of the load impedance is higher, the current decreases. In other words, at |Z|>100 [Ω], the current of 8 mA or less can be realized at all the frequencies.

Figure 6:
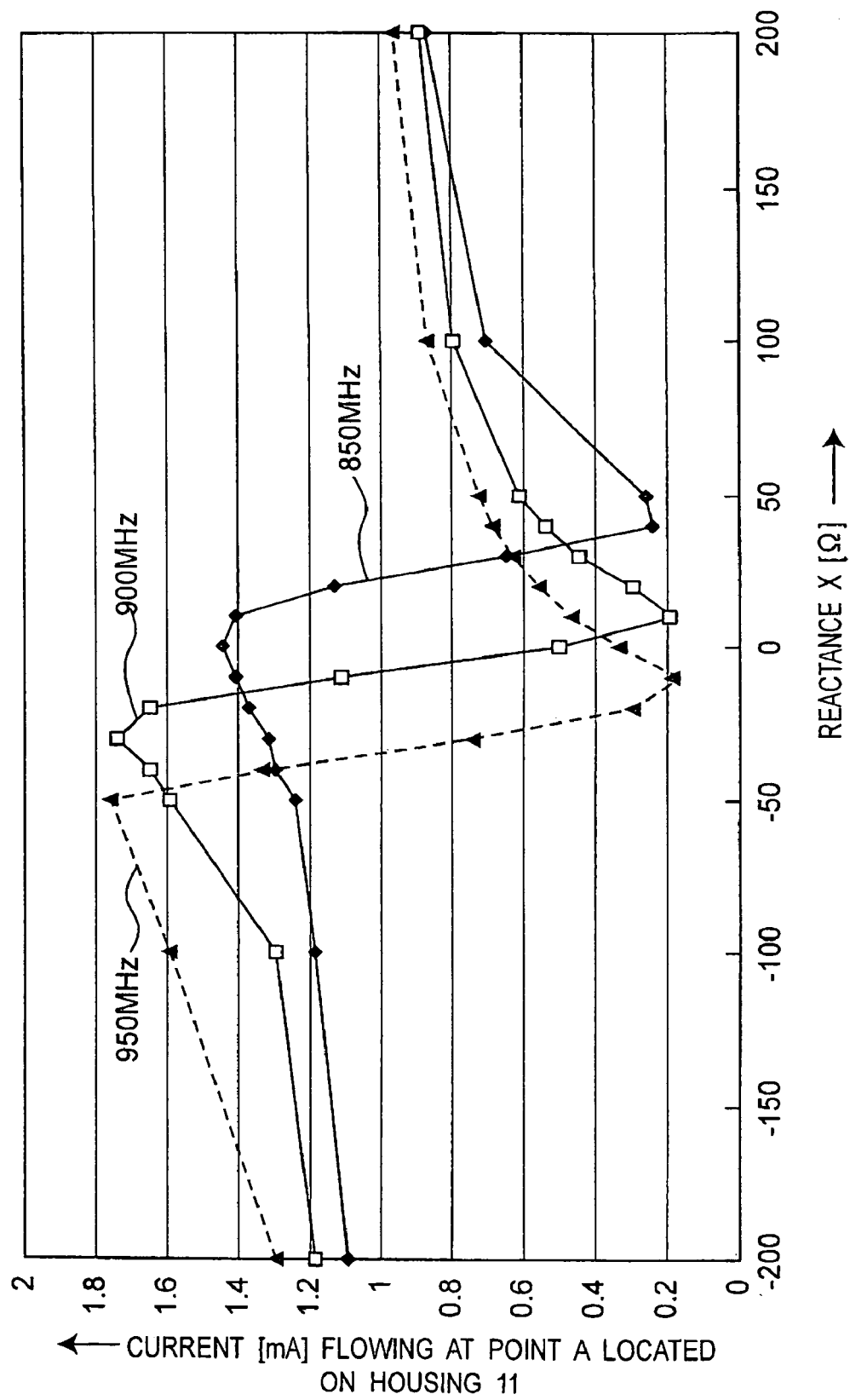
FIG. 6 is a graph showing currents flowing at a point A on the housing 11 of the radio communication apparatus when the reactance X of the load impedance element 14 connected with the parasitic element 13 shown in FIG. 3 is changed when transmitting the transmitted signals having the transmission frequencies "f" of 850, 900, and 950 MHz, respectively.

FIG. 6 is a graph showing currents flowing at the point A on the housing 11 of the radio communication apparatus when the reactance X of the load impedance element 14 connected with the parasitic element 13 shown in FIG. 3 is changed when transmitting the transmitted signals having transmission frequencies "f" of 850, 900, and 950 MHz, respectively. The graph of FIG. 6 shows a change of the current at the point A on the housing 11 which contacts with the cheek during telephone conversation, and which is shown in FIG. 3. At the frequency "f" of 900 MHz, the reactance X may be set to satisfy 5 Ω<X<50 Ω so as to set the current at the point A to, for example, 2 mA (a threshold) or less. As is apparent from FIGS. 5 and 6, when the reactance X is set to 20 to 50 Ω, the maximum current and the local current at the point A shown in FIG. 3 can be reduced and the SAR can be suppressed low as a whole to a predetermined value or less. Further, it is understood that as the frequency "f" is changed, the load impedance at which the current reaches the minimum is changed. However, it is also understood that as the absolute value of the impedance is higher, the current decreases. In other words, at Z>−150 [Ω], the current of 1 mA or less can be realized at all frequencies. In addition, it is understood from FIGS. 5 and 6 that at Z>j100 [Ω], the maximum current of 8 mA or less and the current of 1 mA or less at the point A can be realized.

Figure 11:
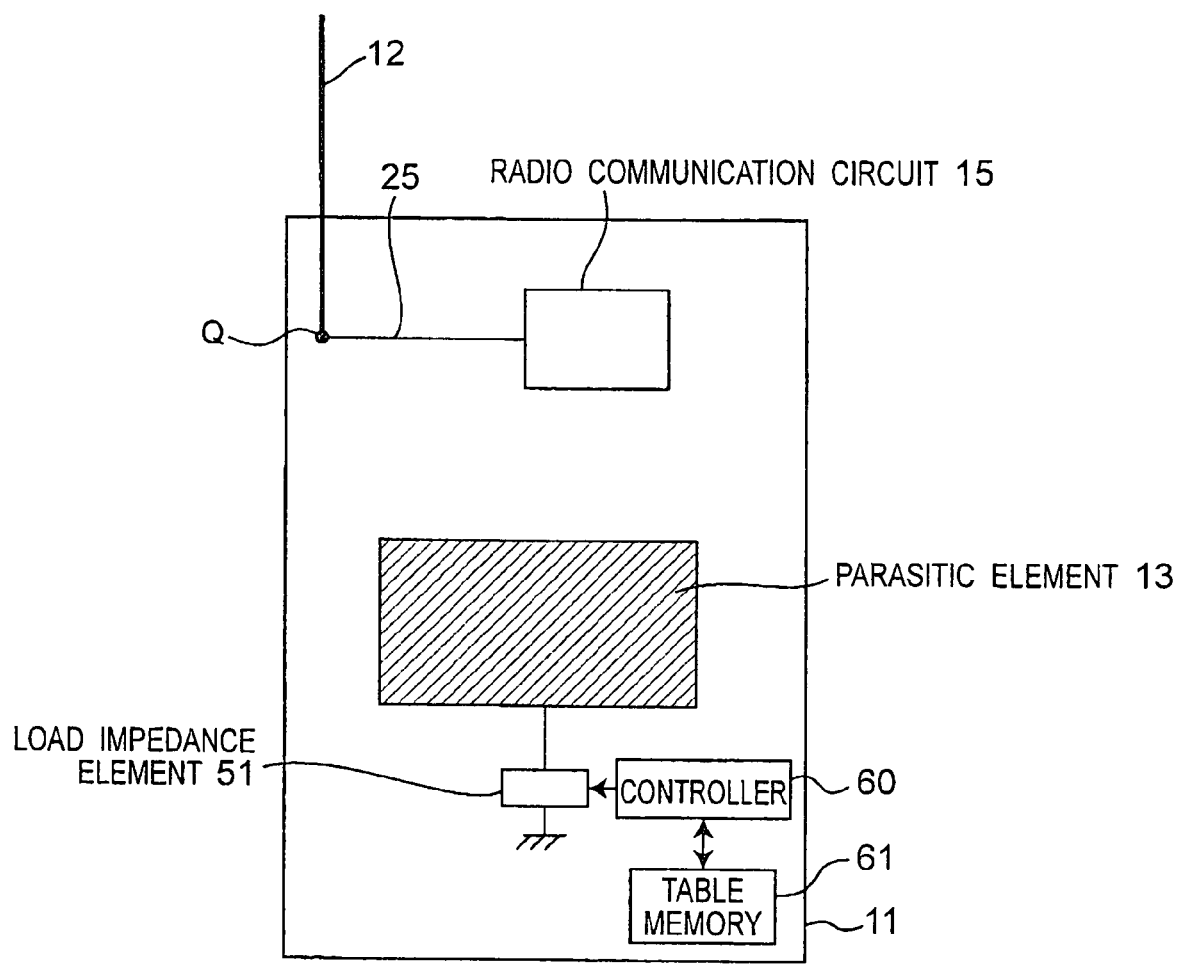
FIG. 11 is a block diagram showing a configuration of a radio communication apparatus including a radio antenna according to a fourth preferred embodiment of the present invention.

In the present preferred embodiment, it is preferable that the reactance of the load impedance element at which the maximum current flowing on the housing 11 is the predetermined threshold or less is stored in a table memory 61 shown in FIG. 11 in advance for each predetermined frequency based on FIG. 5, and that the reactance is adjusted according to the frequency to be used. Further, it is preferable that the reactance of the load impedance element at which the maximum current flowing at the point A (which is an example of a point that is the most proximate location to the human body) on the housing 11 is the predetermined threshold or less is stored in the table memory 61 shown in FIG. 11 for each predetermined frequency based on FIG. 6, and that the reactance is adjusted according to the frequency to be used. As a modified preferred embodiment of the first preferred embodiment, using a current detecting method which will be described later, a current flowing at a predetermined point (e.g., the point A) on the housing 11 may be measured, and the reactance of the load impedance element may be controlled so that the current is the predetermined threshold or less based on the measured current.

In the above-mentioned present preferred embodiment, the parasitic element 13 including the rectangular-plane-shaped electrical conductor is employed. However, the present invention is not limited to this. As the parasitic element, there may be used a line electrical conductor, an electrical conductor plate having a slit formed in a rectangular-plane-shaped electrical conductor, or the like. Such an electrical conductor can exhibit the same functions and advantageous effects as those of the parasitic element 13.

Figure 7A:
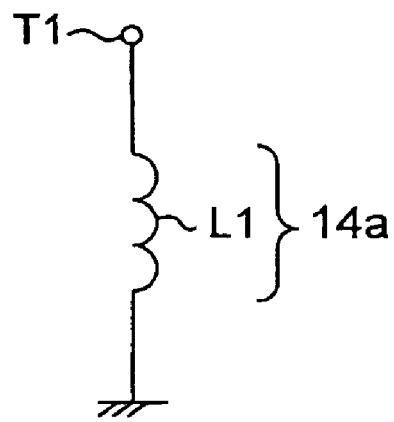
FIG. 7A is a circuit diagram showing a configuration of a load impedance element 14a which is a first implemental example of the load impedance element 14 shown in FIG. 1.
Figure 7B:
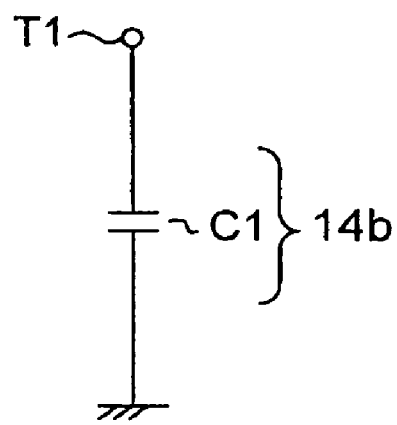
FIG. 7B is a circuit diagram showing a configuration of a load impedance element 14b which is a second implemental example of the load impedance element 14 shown in FIG. 1.
Figure 7C:
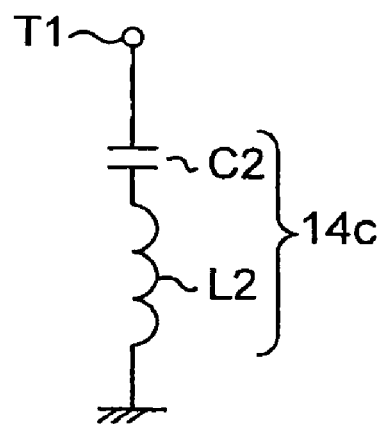
FIG. 7C is a circuit diagram showing a configuration of a load impedance element 14c which is a third implemental example of the load impedance element 14 shown in FIG. 1.
Figure 7D:
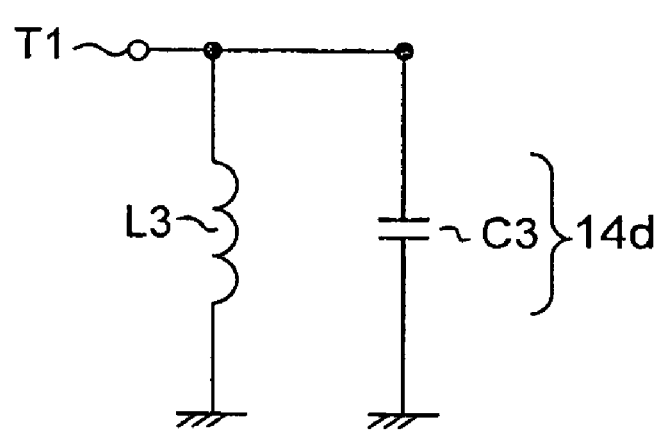
FIG. 7D is a circuit diagram showing a configuration of a load impedance element 14d which is a fourth implemental example of the load impedance element 14 shown in FIG. 1.

FIG. 7A is a circuit diagram showing a configuration of a load impedance element 14a which is a first implemental example of the load impedance element 14 shown in FIG. 1. FIG. 7B is a circuit diagram showing a configuration of a load impedance element 14b which is a second implemental example of the load impedance element 14 shown in FIG. 1. FIG. 7C is a circuit diagram showing a configuration of a load impedance element 14c which is a third implemental example of the load impedance element 14 shown in FIG. 1. FIG. 7D is a circuit diagram showing a configuration of a load impedance element 14d which is a fourth implemental example of the load impedance element 14 shown in FIG. 1. Namely, the load impedance element 14 shown in FIG. 1 or FIG. 3 may be one of the load impedance elements 14a, 14b, 14c and 14d shown in FIGS. 7A to 7D, respectively.

When the reactance X is to be set to a positive value, then the load impedance element 14a is constituted by an inductor L1 connected in series with a housing ground, and it is inserted between a terminal T1 connected with the parasitic element 13 shown in FIG. 1 and the housing ground as shown in FIG. 6A. When the reactance X is to be set to a negative value, then the load impedance element 14b is constituted by a capacitor C1 connected in series with the housing ground, and it is inserted between the terminal T1 connected with the parasitic element 13 shown in FIG. 1 and the housing ground as shown in FIG. 6B. Alternatively, when the reactance X is set to the negative value, then the load impedance element 14c may be constituted by a series circuit of a capacitor C2 and an inductor L2, and it is inserted between the terminal T1 connected with the parasitic element 13 shown in FIG. 1 and the housing ground as shown in FIG. 6C. Further, when the reactance X is to be set to the negative value, then the load impedance element 14d may be constituted by a parallel circuit of a capacitor C3 and an inductor L3, and it is inserted between the terminal T1 connected with the parasitic element 13 shown in FIG. 1 and the housing ground as shown in FIG. 6D. Each of the inductors L1, L2, and L3 can be made of, for example, a chip inductor or an electrical conductor line of, for example, a meander shape. Further, each of the capacitors C1, C2, and C3 can be made of a chip capacitor, a plane-shaped parallel capacitor, an MIM capacitor, or the like. When one of or both of the chip inductor and the chip capacitor are used, the size of the radio communication apparatus can be remarkably reduced.

Furthermore, as the load impedance element 14, there can be used a distributed constant line having one end at the side of ground which is short-circuited or opened, such as a coaxial line or the like. At that time, the impedance can be set to be changed depending on a terminal conditions and a line length of the distributed constant line. The distributed constant line can exhibit the same advantageous effects as those of the impedance elements 14a to 14d shown in FIGS. 7A to 7D, respectively, including the change of the reactance X. Besides, as the distributed constant line, a micro-strip line can be employed in place of the coaxial line. When the micro-strip line is employed, the line can be formed on a substrate of the radio communication apparatus such as a portable telephone or the like. By thus constituting the same, it is characteristically and advantageously possible to decrease the number of parts of the radio communication apparatus, and to realize a small-size, thin radio communication apparatus.

Second Preferred Embodiment

Figure 8:
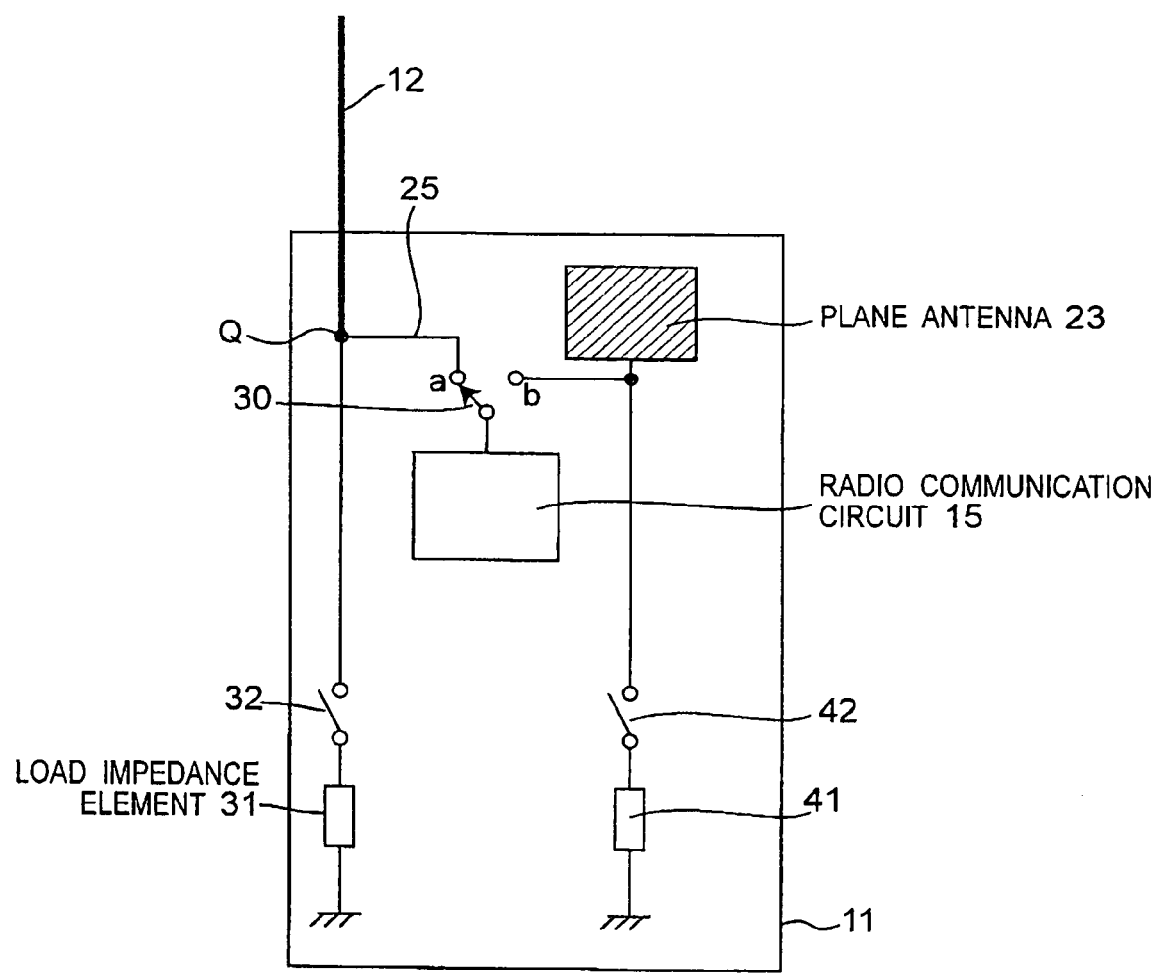
FIG. 8 is a block diagram showing a configuration of a radio communication apparatus including a radio antenna according to a second preferred embodiment of the present invention.

FIG. 8 is a block diagram showing a configuration of a radio communication apparatus including a radio antenna according to a second preferred embodiment of the present invention. As shown in FIG. 8, the radio communication apparatus according to the second preferred embodiment includes a whip antenna 12 extending upward from an upper portion of a housing 11, and a plane antenna 23 provided in the housing 11, where the two antennas 12 and 23 constitute a space diversity system.

Referring to FIG. 8, the radio communication apparatus includes the plane antenna 23 and two load impedance elements 31 and 41, which are provided in the housing 11. The plane antenna 23 is, for example, a rectangular-plane-shaped electrical conductor plate, and it is provided, for example, so as to be parallel to a front surface (corresponding to the head of a human body that is a user) of the housing 11 in the vicinity of the front surface of the housing 11 to be electromagnetically connected with the housing 11.

In the radio communication apparatus shown in FIG. 8, when a switch 30 is switched over to a contact "a" thereof, a radio transmitted signal from a radio communication circuit 15 provided in the housing 11 of the radio communication apparatus is outputted to the one-quarter-wave whip antenna 12 through the contact "a" of the switch 30, a feeding cable 25, and a feeding point Q, and then, a radio wave of the radio transmitted signal is radiated from the whip antenna 12. The feeding point Q is grounded to the housing 11 through a switch 32 and the load impedance element 31. Further, when the switch 30 is switched over to a contact "b" thereof, the radio transmitted signal from the radio communication circuit 15 is outputted to the plane antenna 23 through the contact "b" of the switch 30, and then, the radio wave of the radio transmitted signal is radiated from the plane antenna 23. The plane antenna 23 is grounded to the housing 11 through a switch 42 and the load impedance element 41.

In the radio communication apparatus constituted as mentioned above, when an intensity of a received signal received by, for example, the whip antenna 12 is larger than that of a received signal received by the plane antenna 23, then the switch 30 is switched over to the contact "a" thereof, and the radio signals are transmitted and received using the whip antenna 12. At that time, by turning off the switch 32 and turning on the switch 42, the plane antenna 23 is electrically disconnected from the radio communication circuit 15 and grounded through the switch 42 and the load impedance element 41. Then, the plane antenna 23 operates in a manner similar to that of the parasitic element 13 according to the first preferred embodiment. When the reactance X of the load impedance element 41 is set, in a manner similar to that of the first preferred embodiment, so as to reduce the current flowing on the housing 11 of the radio communication apparatus, and to reduce a near magnetic field on the front surface of the housing 11, the SAR can be remarkably reduced. It is preferable that the current flowing on the housing 11 of the radio communication apparatus is set to be substantially the minimum and that the SAR is thereby set to the minimum.

On the other hand, when the intensity of the received signal received by, for example, the plane antenna 23 is larger than that of the received signal received by the whip antenna 12, then the switch 30 is switched over to the contact "b" thereof, and radio signals are transmitted and received using the plane antenna 23. At that time, by turning on the switch 32 and turning off the switch 42, the whip antenna 12 is electrically disconnected from the radio communication circuit 15 and grounded through the switch 32 and the load impedance element 31. Then, the whip antenna 12 operates in a manner similar to that of the parasitic element 13 according to the first preferred embodiment. If the reactance X of the load impedance element 31 is set, in a manner similar to that of the first preferred embodiment, so as to reduce the current flowing on the housing 11 of the radio communication apparatus, and to reduce the near magnetic field on the front surface of the housing 11, the SAR can be remarkably reduced.

In the second preferred embodiment mentioned above, one of the load impedance elements 14a to 14d shown in FIGS. 7A to 7D, respectively, for example, may be employed as each of the load impedance elements 31 and 41. In addition, as each of the load impedance elements 31 and 41, there can be used a distributed constant line having one end at the side of ground which is short-circuited or opened, such as a coaxial line or the like. When the distributed constant line is used, the impedance can be set to be changed depending on the terminal conditions and the line length of the distributed constant line. The distributed constant line can exhibit the same advantageous effects as those of the load impedance elements 14a to 14d shown in FIGS. 7A to 7D, respectively, including the change of the reactance X. Besides, as the distributed constant line, a micro-strip line can be employed in place of the coaxial line. When the micro-strip line is employed, the line can be formed on a substrate of the radio communication apparatus such as a portable telephone or the like. By thus constituting the same, it is characteristically and advantageously possible to decrease the number of parts of the radio communication apparatus, and to realize a small-sized and thin radio communication apparatus.

The radio communication apparatus constituted as mentioned above according to the second preferred embodiment can transmit and receive radio signals by a space diversity system using the two antennas 12 and 13, and exhibit the same functions and advantageous effects as those of the radio communication apparatus according to the first preferred embodiment.

In the second preferred embodiment, the radio communication apparatus includes the whip antenna 12 and the plane antenna 23. However, the present invention is not limited to this. The plane antenna 23 may be constituted alternatively as a whip antenna, an inverse F antenna, or the like, and the whip antenna 12 may be constituted alternatively as a plane antenna, an inverse F antenna, or the like.

Third Preferred Embodiment

FIG. 9 is a block diagram showing a configuration of a radio communication apparatus including a radio antenna according to a third preferred embodiment of the present invention. As shown in FIG. 9, the radio communication apparatus according to the third preferred embodiment is characterized by including a whip antenna 12 extending upward from an upper portion of a housing 11, and a plane antenna 23 provided in the housing 11, where the two antennas 12 and 23 constitute a space diversity system. Further, one load impedance element 51 and one changeover switch 52 capable of changing the reactance X are provided in place of the two load impedance elements 31 and 41 and the two switches 32 and 42 according to the second preferred embodiment shown in FIG. 8.

Referring to FIG. 9, the plane antenna 23 and the load impedance element 51 are provided in the housing 11. The plane antenna 23 is, for example, a rectangular-plane-shaped electrical conductor plate and provided, for example, in parallel to a front surface (corresponding to the head of a human body that is a user) of the housing 11 to be in the proximity of the housing 11 so as to be electromagnetically connected with the housing 11.

In the radio communication apparatus shown in FIG. 9, when an intensity of a received signal received by, for example, the whip antenna 12 is larger than that of a received signal received by the plane antenna 23, then the switch 30 is switched over to a contact "a" thereof, and then, the changeover switch 52 is switched over to a contact "b" thereof in interlocking with the changeover of the switch 30. At that time, a radio transmitted signal from a radio communication circuit 15 provided in the housing 11 of the radio communication apparatus is outputted to the one-quarter-wave whip antenna 12 through the contact "a" of the switch 30, a feeding cable 25, and a feeding point Q, and then, a radio wave of the radio transmitted signal is radiated from the whip antenna 12. In addition, the plane antenna 23 is grounded through the contact "b" of the changeover switch 52 and the load impedance element 51. Then, the plane antenna 23 operates in a manner similar to that of the parasitic element 13 according to the first preferred embodiment. When the reactance X of the load impedance element 51 is set, in a manner similar to that of first preferred embodiment, so as to reduce the current flowing on the housing 11 of the radio communication apparatus, and to reduce a near magnetic field on the front surface of the housing 11, then the SAR can be remarkably reduced.

On the other hand, when an intensity of a received signal received by, for example, the plane antenna 23 is larger than that of a received signal received by the whip antenna 12, then the switch 30 is switched over to the contact "b" thereof, and the changeover switch 52 is switched over to the contact "a" thereof in interlocking with the changeover of the switch 30. At that time, the radio transmitted signal from the radio communication circuit 15 provided in the housing 11 of the radio communication apparatus is outputted to the plane antenna 23 through the contact "b" of the switch 30, and then, the radio wave of the radio transmitted signal is radiated from the plane antenna 23. In addition, the whip antenna 12 is grounded through the contact "a" of the changeover switch 52 and the load impedance element 51. Then, the whip antenna 12 operates in a manner similar to that of the parasitic element 13 according to the first preferred embodiment. When the reactance X of the load impedance element 51 is set, in a manner similar to that of the first preferred embodiment, so as to reduce the current flowing on the housing 11 of the radio communication apparatus, and to reduce a near magnetic field on the front surface of the housing 11, the SAR can be remarkably reduced.

Figure 10A:
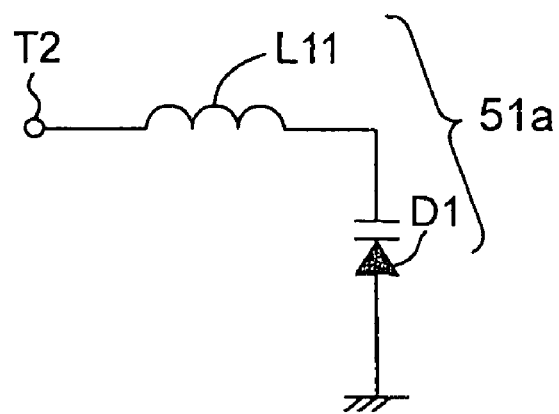
FIG. 10A is a circuit diagram showing a configuration of a load impedance element 51a which is a first implemental example of the load impedance element 51 shown in FIG. 9.
Figure 10B:
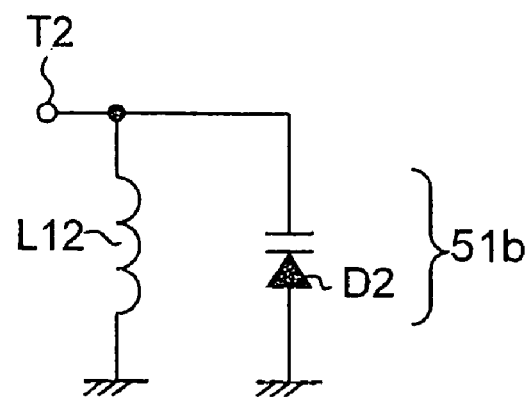
FIG. 10B is a circuit diagram showing a configuration of a load impedance element 51b which is a second implemental example of the load impedance element 51 shown in FIG. 9.
Figure 10C:
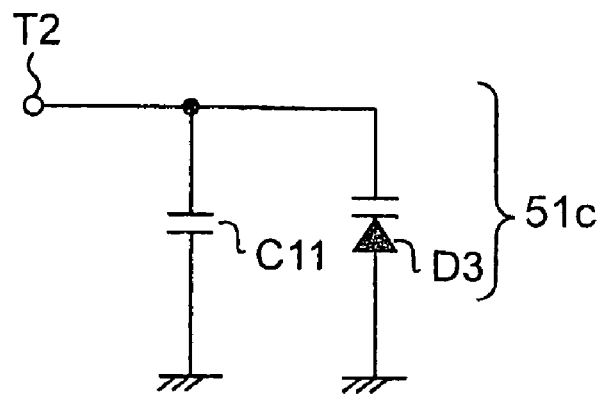
FIG. 10C is a circuit diagram showing a configuration of a load impedance element 51c which is a third implemental example of the load impedance element 51 shown in FIG. 9.
Figure 10D:
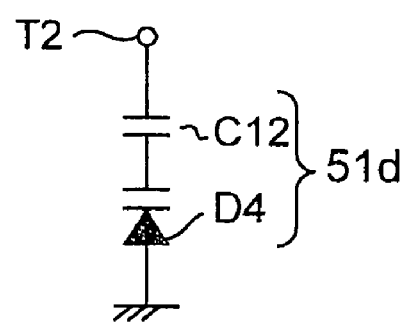
FIG. 10D is a circuit diagram showing a configuration of a load impedance element 51d which is a fourth implemental example of the load impedance element 51 shown in FIG. 9.

FIG. 10A is a circuit diagram showing a configuration of a load impedance element 51a which is a first implemental example of the load impedance element 51 shown in FIG. 9. FIG. 10B is a circuit diagram showing a configuration of a load impedance element 51b which is a second implemental example of the load impedance element 51 shown in FIG. 9. FIG. 10C is a circuit diagram showing a configuration of a load impedance element 51c which is a third implemental example of the load impedance element 51 shown in FIG. 9. FIG. 10D is a circuit diagram showing a configuration of a load impedance element 51d which is a fourth implemental example of the load impedance element 51 shown in FIG. 9. Namely, the load impedance element 51 shown in FIG. 9 may be one of the load impedance elements 51a, 51b, 51c, and 51d shown in FIGS. 10A to 10D, respectively.

As shown in FIG. 10A, the load impedance element 51a is constituted by a series circuit of an inductor L11 and a variable capacitance diode D1, and it is inserted between a terminal T2 connected with a common terminal of the changeover switch 52 shown in FIG. 9 and a housing ground. As shown in FIG. 10B, the load impedance element 51b is constituted by a parallel circuit of an inductor L12 and a variable capacitance diode D2, and it is inserted between the terminal T2 connected with the common terminal of the changeover switch 52 shown in FIG. 9 and the housing ground. As shown in FIG. 10C, the load impedance element 51c is constituted by a parallel circuit of a capacitor C11 and a variable capacitance diode D3, and it is inserted between the terminal T2 connected with the common terminal of the changeover switch 52 shown in FIG. 9 and the housing ground. As shown in FIG. 10D, the load impedance element 51d is constituted by a series circuit of a capacitor C 12 and a variable capacitance diode D4, and it is inserted between the terminal T2 connected with the common terminal of the changeover switch 52 shown in FIG. 9 and the housing ground.

In respective implemental examples shown in FIGS. 10A to 10D, when a reverse bias voltage applied to each of the variable capacitance diodes D1, D2, D3, and D4 is changed, a capacitance of the diode can be changed. The change control can be executed by, for example, a controller 60 shown in FIG. 11, which will be described later. A reactance of the load impedance element capable of reducing an SAR to a predetermined threshold or less is stored in a table memory 61 connected with the controller 60 in advance for each predetermined frequency. The controller 60 can change the capacitance of one of the variable capacitance diodes D1, D2, D3, and D4 according to the frequency to be used with reference to the data stored in the table memory 61. In a manner similar to that of the first preferred embodiment, by setting the reactance X of the load impedance element 51 so as to reduce the current flowing on the housing 11 of the radio communication apparatus and to reduce a near magnetic field on the front surface of the housing 11, the SAR can be remarkably reduced.

By increasing a change width of the reverse bias voltage applied to one of the variable capacitance diodes D1, D2, D3 and D4, a change width of the capacitance of the diode and that of the reactance X of one of the load impedance elements 51a to 51d can be increased. On the other hand, by reducing the change width of the reverse bias voltage applied to one of the variable capacitance diodes D1, D2, D3 and D4, the change width of the capacitance of the diode and that of the reactance X of one of the load impedance elements 51a to 51d can be reduced.

Furthermore, as the load impedance element 51, there can be employed a distributed constant line having one end at the side of ground which is short-circuited or opened, such as a coaxial line or the like. Then, the impedance can be set to be changed depending on a terminal conditions and a line length of the distributed constant line. The distributed constant line can exhibit the same advantageous effects as those of the load impedance elements 51a to 51d shown in FIGS. 10A to 10D, respectively, including the change of the reactance X. Besides, as the distributed constant line, a micro-strip line can be employed in place of the coaxial line. When the micro-strip line is employed, the line can be formed on a substrate of the radio communication apparatus such as a portable telephone. By thus constituting the same, it is characteristically and advantageously possible to decrease the number of parts of the radio communication apparatus, and to realize a small-sized and thin radio communication apparatus.

The radio communication apparatus constituted as mentioned above according to the third preferred embodiment can transmit and receive radio signals by a space diversity system using the two antennas 12 and 23, and exhibit the same functions and advantageous effects as those of the radio communication apparatus according to the first preferred embodiment.

In the above-mentioned preferred embodiment, the radio communication apparatus employs one of the variable capacitance diodes D1, D2, D3, and D4. However, the present invention is not limited to this. The variable capacitance diode may be replaced by an impedance element, such as a variable capacitor or a variable inductor, capable of changing an element value.

Fourth Preferred Embodiment

FIG. 11 is a block diagram showing a configuration of a radio communication apparatus including a radio antenna according to a fourth preferred embodiment of the present invention. The radio communication apparatus according to the fourth preferred embodiment is different from the radio communication apparatus according to the first preferred embodiment shown in FIG. 1 at the following respects:

(1) The radio communication apparatus includes a load impedance element 51, shown in FIG. 9, capable of changing the reactance X in place of the load impedance element 14.

(2) The reactance X of the load impedance element 51 is controlled by a controller 60.

The load impedance element 51 is an impedance element that includes one of the variable capacitance diodes D1, D2, D3, and D4 shown in FIGS. 10A to 10D, and the reactance X of the load impedance element 51 is controlled by the controller 60. The controller 60 adjusts and sets a reverse bias voltage applied to one of the variable capacitance diodes D1, D2, D3, and D4 (i.e., a capacitance of the diode) so as to reduce the current flowing on the housing 11 of the radio communication apparatus, and this leads to setting of a near magnetic field on the front surface of the housing 11, in a manner similar to that of the first preferred embodiment. Then the SAR can be remarkably reduced.

Figure 12:
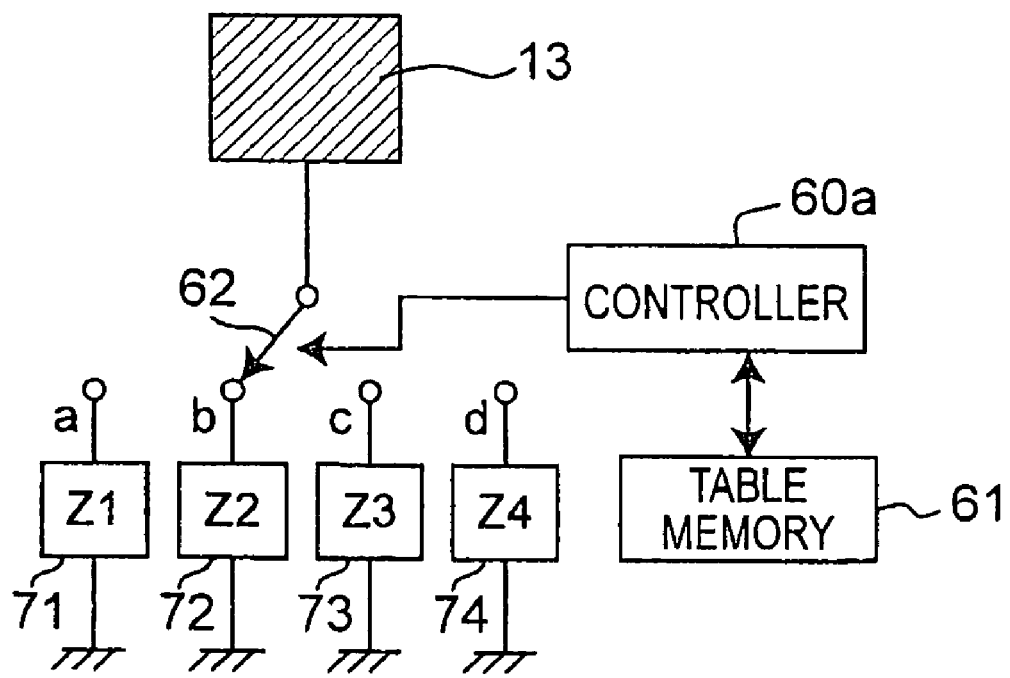
FIG. 12 is a block diagram showing a configuration of a part of a radio communication apparatus including a radio antenna according to a modified preferred embodiment of the fourth preferred embodiment of the present invention.

FIG. 12 is a block diagram showing a configuration of a part of a radio communication apparatus including a radio antenna according to a modified preferred embodiment of the fourth preferred embodiment of the present invention. The other configuration (the housing 11, the whip antenna 12, and the radio communication circuit 15) of the radio communication apparatus according to the modified preferred embodiment of the fourth preferred embodiment is constituted in a manner similar to that shown in FIG. 11. The modified preferred embodiment is different from the fourth preferred embodiment shown in FIG. 11 at the following respects:

(1) The radio communication apparatus includes four load impedance elements 71, 72, 73, and 74 having fixed impedances Z1, Z2, Z3, and Z4 different from each other, respectively, in place of the load impedance element 51, and a changeover switch 62.

(2) The radio communication apparatus includes a controller 60a to which a table memory 61 is connected in place of the controller 60.

Referring to FIG. 12, the changeover switch 62 includes four contacts "a", "b", "c", and "d" thereof, and a common terminal, and it is controlled by the controller 60a to connect the common terminal to one of the four contacts "a", "b", "c", and "d" of the changeover switch 62. The contact "a" of the switch 62 is grounded through the load impedance element 71, the contact "b" of the switch 62 is grounded through the load impedance element 72, the contact "c" of the switch 62 is grounded through the load impedance element 73, and the contact "d" of the switch 62 is grounded through the load impedance element 74.

In the radio communication apparatus constituted as mentioned above, when the changeover switch 62 is switched over to the contact "a" thereof, the plane antenna 23 is grounded through the contact "a" of the changeover switch 62 and the load impedance element 71. When the changeover switch 62 is switched over to the contact "b" thereof, the plane antenna 23 is grounded through the contact "b" of the changeover switch 62 and the load impedance element 72. When the changeover switch 62 is switched over to the contact "c" thereof, the plane antenna 23 is grounded through the contact "c" of the changeover switch 62 and the load impedance element 73. When the changeover switch 62 is switched over to the contact "d" thereof, the plane antenna 23 is grounded through the contact "d" of the changeover switch 62 and the load impedance element 74. The changeover control over each of the load impedance elements 71 to 74 is executed by the controller 60a. In a manner similar to that of the first preferred embodiment, the controller 60a selectively changes over one load impedance element (one of 71 to 74, preferably substantially having a minimum current) so as to reduce the current flowing on the housing 11 of the radio communication apparatus with reference to the data stored in the table memory 61, and sets the reactance X of the load impedance element so as to reduce a near magnetic field on the front surface of the housing 11. Then the SAR can be remarkably reduced.

The radio communication apparatus according to the modified preferred embodiment shown in FIG. 12 includes the four load impedance elements 71 to 74. However, the present invention is not limited to this. The radio communication apparatus may include a plurality of load impedance elements.

Figure 13:
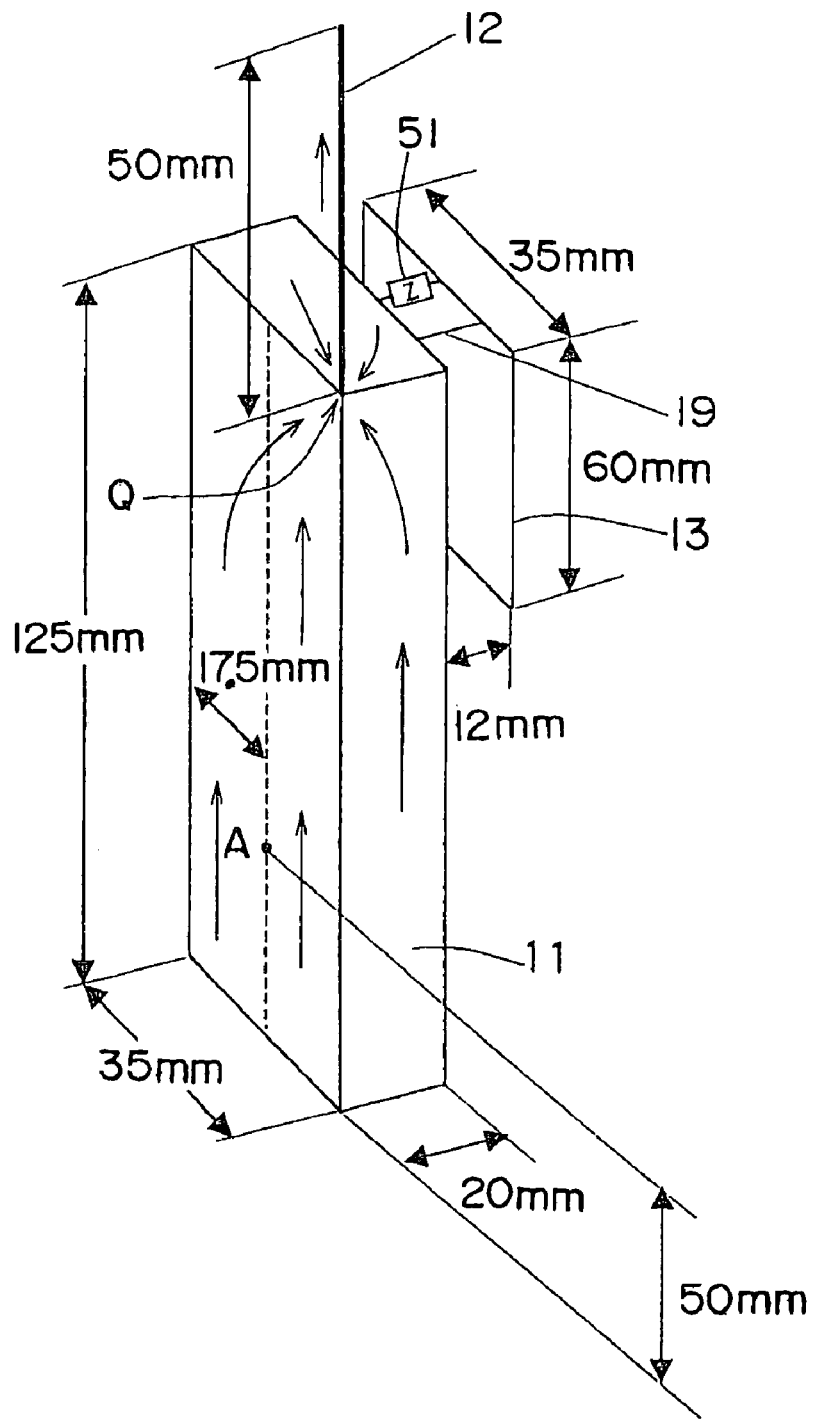
FIG. 13 is a perspective view of a radio communication apparatus model at a transmission frequency "f" of 1.5 GHz according to the fourth preferred embodiment.

FIG. 13 is a perspective view of a radio communication apparatus model at a transmission frequency "f" of 1.5 GHz according to the fourth preferred embodiment. In a manner similar to that of the radio communication apparatus model shown in FIG. 3, the whip antenna 12 is provided to extend upward from a front corner on an upper surface of the housing 11 (at the side being in the proximity to a rear surface of the housing 11), and includes the feeding point Q in this corner. A parasitic element 13 that is a rectangular electrical conductor plate for shielding is provided to oppose to and in the vicinity of an upper portion on a front surface of the housing 11. The parasitic element 13 is connected with the upper portion on the front surface of the housing 11 through the load impedance element 51 from one point on an upper edge or side of the parasitic element 13, and it is connected with the upper portion on the front surface of the housing 11 through a short-circuit line 19 from another point on the upper edge or side of the parasitic element 13 to be grounded. The whip element 12 of a monopole antenna is made of a metallic wire of 50 mm. The parasitic element 13 is made of a metallic plate of 35 mm×60 mm.

Figure 14:
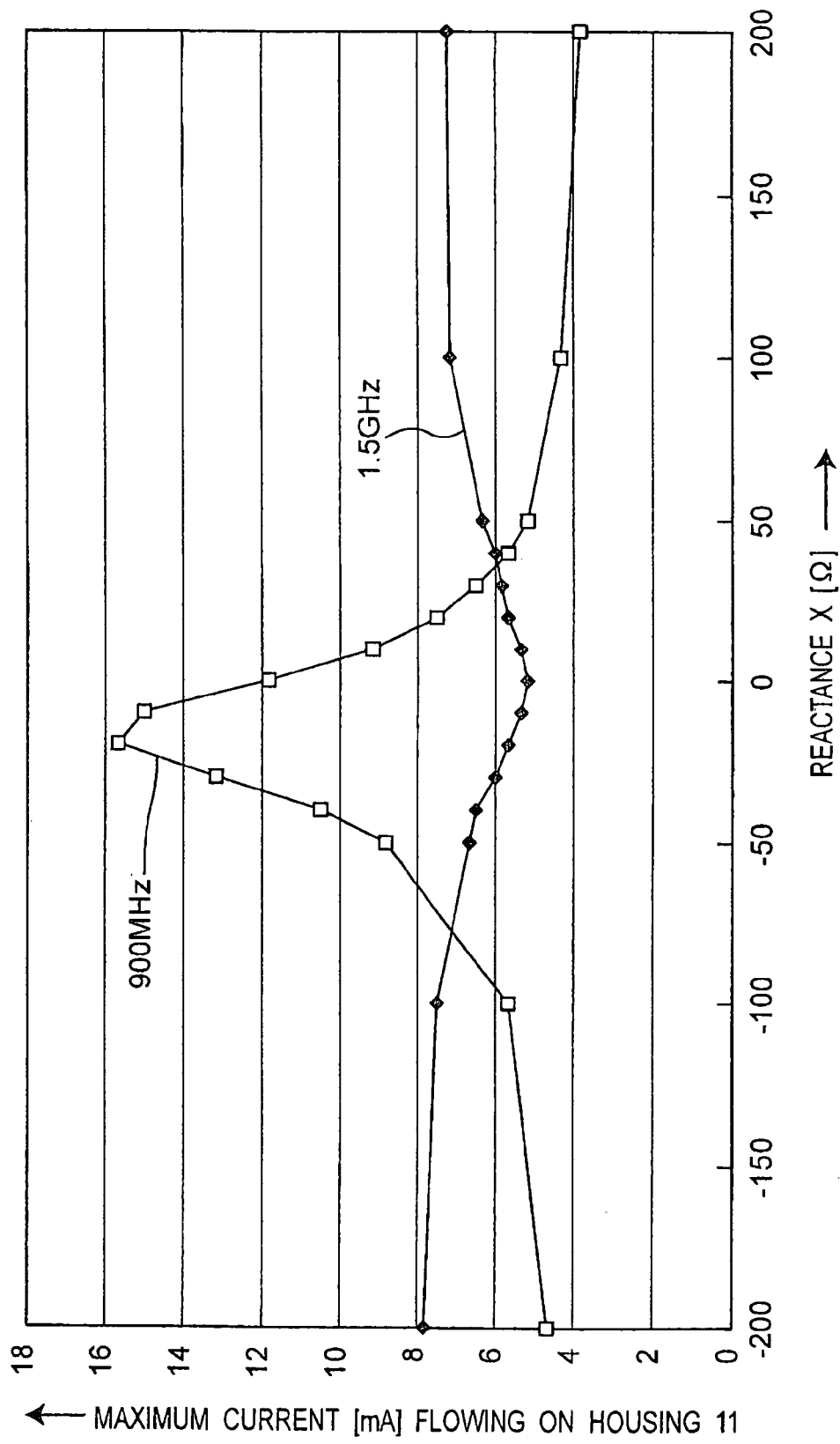
FIG. 14 is a graph showing maximum currents flowing on the housing 11 of the radio communication apparatus when the reactance X of the load impedance element 51 connected with the parasitic element 13 shown in FIG. 11 or 13 when transmitting transmitted signals having transmission frequencies "f" of 900 MHz and 1.5 GHz, respectively.

FIG. 14 is a graph showing maximum currents flowing on the housing 11 of the radio communication apparatus when the reactance X of the load impedance element 51 connected with the parasitic element 13 shown in FIG. 11 or 13 when transmitting transmitted signals having transmission frequencies "f" of 900 MHz and 1.5 GHz, respectively. As is apparent from FIG. 14, when the transmitted signal having the transmission frequency "f" of 900 MHz is transmitted, the maximum current is the highest at the reactance X of about −20 Ω, and the maximum current is about 5 mA or less at the reactance X of +100 Ω or more or −100 Ω or less. When the transmitted signal having the transmission frequency "f" of 1.5 GHz is transmitted, a change quantity of the maximum current is relatively small and 6 mA or less even if the reactance X changes from −230 to 200 Ω. This indicates that the reactance X can be set to an arbitrary value in the range of −230 to 200 Ω.

Figure 15:
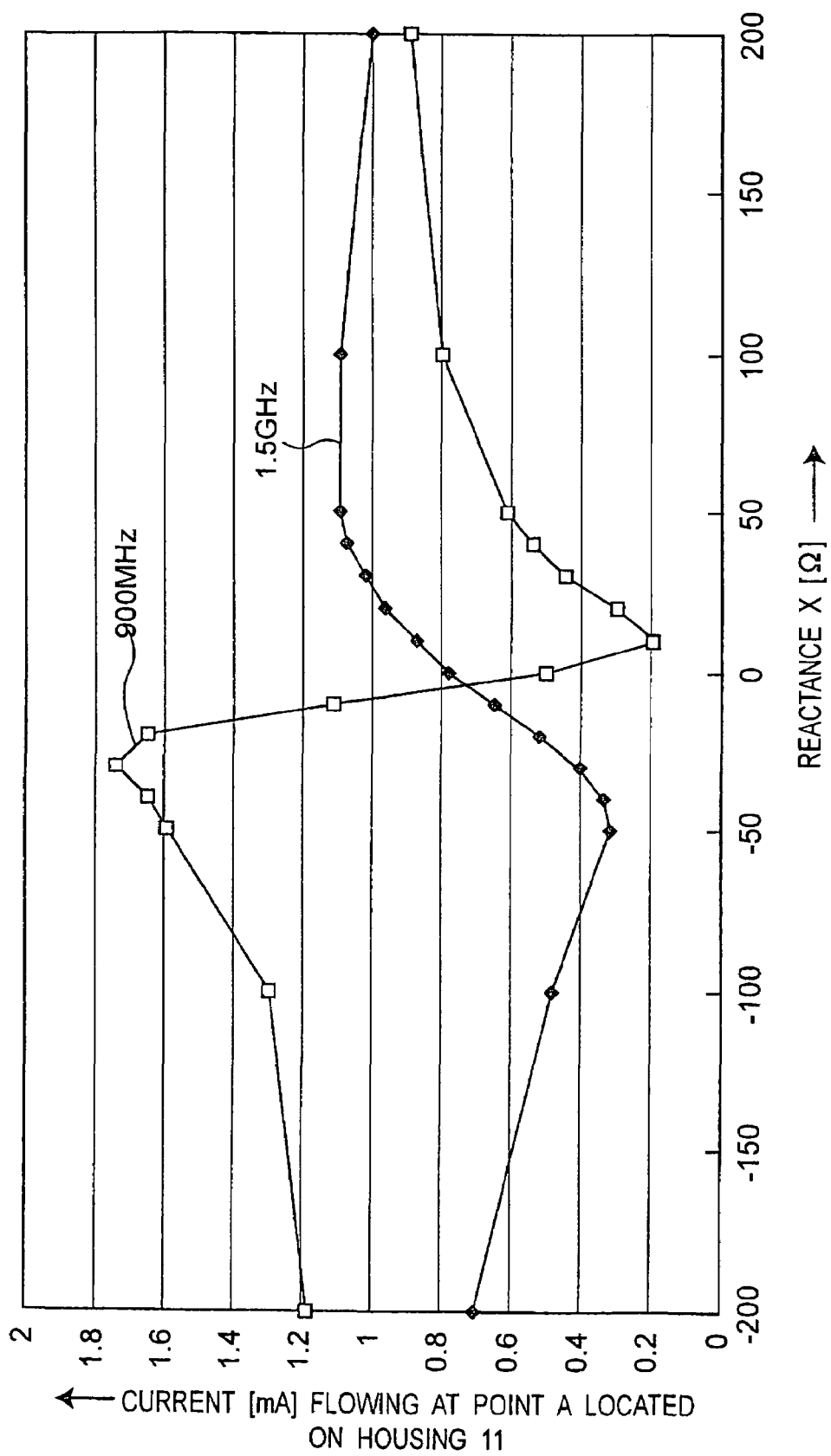
FIG. 15 is a graph showing currents flowing at the point A on the housing 11 of the radio communication apparatus when the reactance X of the load impedance element 51 connected with the parasitic element 13 shown in FIG. 11 or 13 when transmitting the transmitted signal having the transmission frequencies "f" of 900 MHz and 1.5 GHz, respectively.
Figure 18:
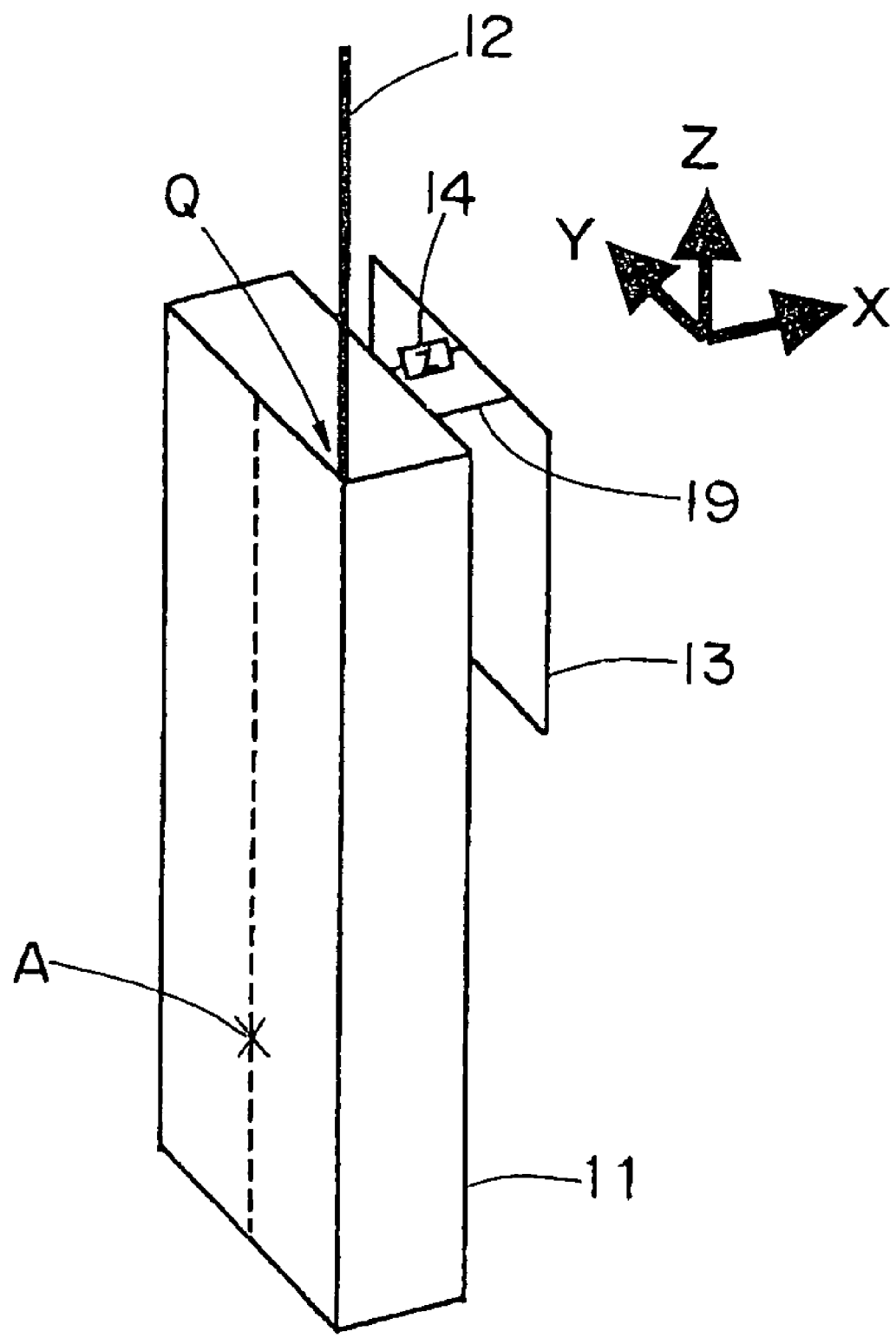
FIG. 18 is a perspective view showing a direction of an XYZ coordinate system provided relative to the radio communication apparatus shown in FIG. 16 when a radiation pattern from the radio communication apparatus is measured.

FIG. 15 is a graph showing currents flowing at the point A on the housing 11 of the radio communication apparatus when the reactance X of the load impedance element 51 connected with the parasitic element 13 shown in FIG. 11 or 13 when transmitting the transmitted signals having the transmission frequencies "f" of 900 MHz and 1.5 GHz, respectively. As is apparent from FIG. 15, when the transmitted signal having the transmission frequency "f" of 1.5 GHz is transmitted, the reactance X at which the current at the point A is a minimum is −180 Ω. When the transmitted signal having the transmission frequency "f" of 900 MHz is transmitted, the current at the point A is the maximum at the reactance X of −30 Ω, and it is the minimum at the reactance X of +20 Ω. This indicates that as the transmission frequency "f" is changed, the reactance X at which the current flowing on the housing 11 of the radio communication apparatus is changed. In this case, the parasitic element 13 is provided inside or outside of the housing 11 of the radio communication apparatus, and in order to suppress the influence of the human body, the parasitic element 13 is preferably provided in the vicinity of the surface of the housing 11 at the side opposite to the surface which contacts with the human body, as shown in FIGS. 15 and 18.

Therefore, when the radio communication apparatus that operates at multiple frequencies is constituted as shown in FIG. 11 or 12, then the controller 60 or 60a can control the load impedance element 51, and set the reactance X of the load impedance element 51 so as to reduce the current flowing on the housing 11 of the radio communication apparatus, preferably set the current substantially at the minimum, when the transmission frequency is changed. Accordingly, by setting the near magnetic field on the front surface of the housing 11 to be reduced, the SAR can be remarkably reduced. Concretely, the reactance X at which the current at the point A is the minimum is calculated, for example, by an experiment in advance, and is stored in the table memory 61 for each predetermined frequency. The controller 60 or 60a controls the reactance X of the load impedance element 51 so that the current at the point A is substantially the minimum based on operating frequency information from a controller (not shown) that controls entirety of the radio communication apparatus with reference to the table memory 61, and this leads to reduction of the SAR.

Fifth Preferred Embodiment

Figure 16:
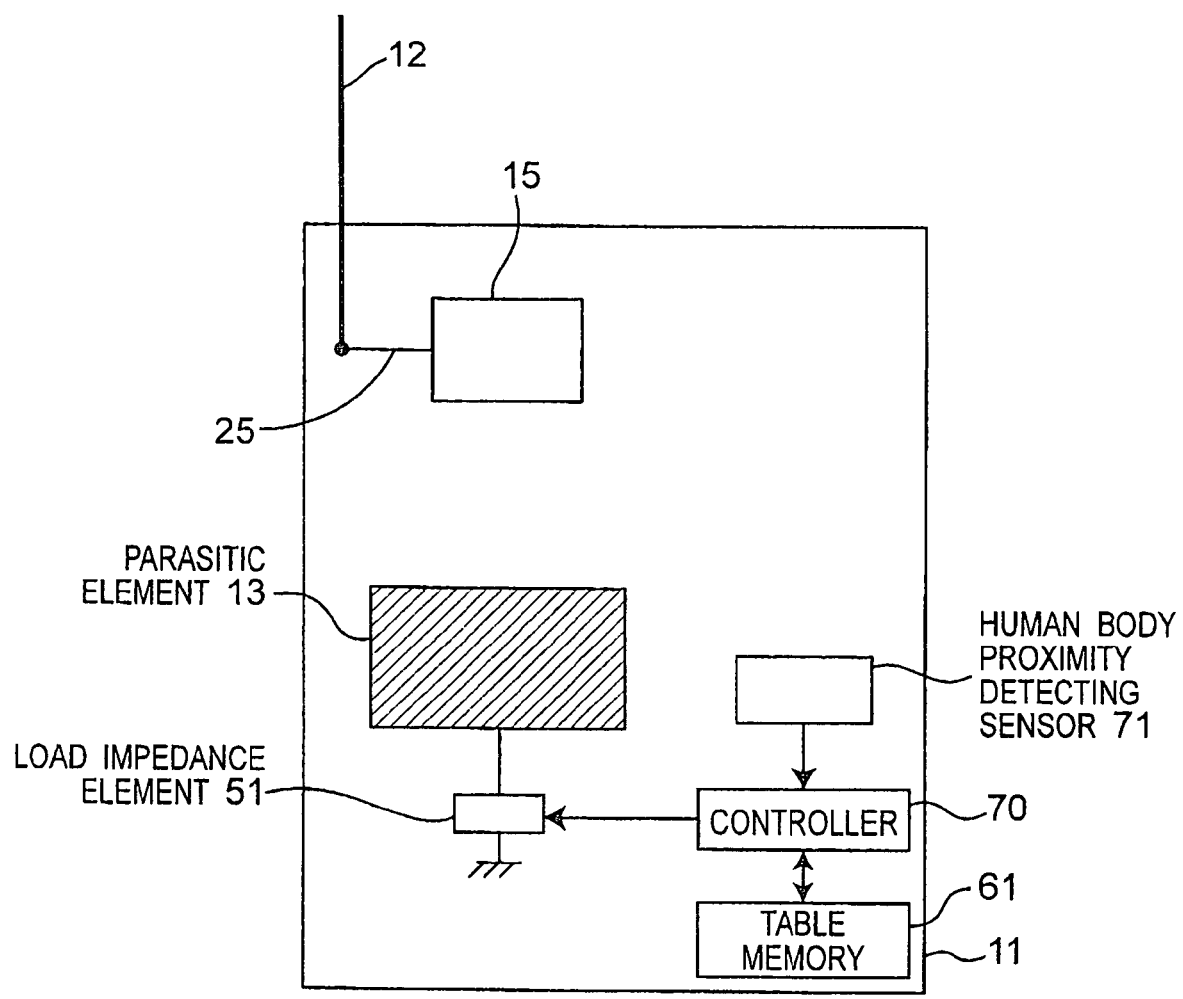
FIG. 16 is a block diagram showing a configuration of a radio communication apparatus including a radio antenna according to a fifth preferred embodiment of the present invention.

FIG. 16 is a block diagram showing a configuration of a radio communication apparatus including a radio antenna according to a fifth preferred embodiment of the present invention. The radio communication apparatus according to the fifth preferred embodiment is different from the radio communication apparatus according to the fourth preferred embodiment shown in FIG. 11 at the following respects:

(1) The radio communication apparatus includes a controller 70 to which a table memory 61 is connected, in place of the controller 60.

(2) A human body proximity sensor 71s is connected with the controller 70.

Referring to FIG. 16, the human body proximity sensor 71s detects whether a human body is in proximity to a housing 11 of the apparatus using, for example, an infrared ray. The human body proximity sensor 71s radiates the infrared ray toward the human body, and detects a reflected wave of the infrared ray, then detecting that the human body is in proximity to the housing 11 of the apparatus based on a distance to the human body and an intensity of the reflected wave. When the human body is in proximity to the housing 11 of the radio communication apparatus at a distance of, for example, about 10 mm or less, then the human body proximity sensor 71s detects that the human body is in proximity to the housing 11 of the apparatus, and outputs a detection signal to the controller 70. The controller 70 starts a control processing for a load impedance element 51 in response to the detection signal, and controls a reactance X of the load impedance element 51 so as to reduce a current flowing at a point A of the housing 11 of the radio communication apparatus, and to reduce an SAR with reference to control data stored in a table memory 61.

Figure 17:
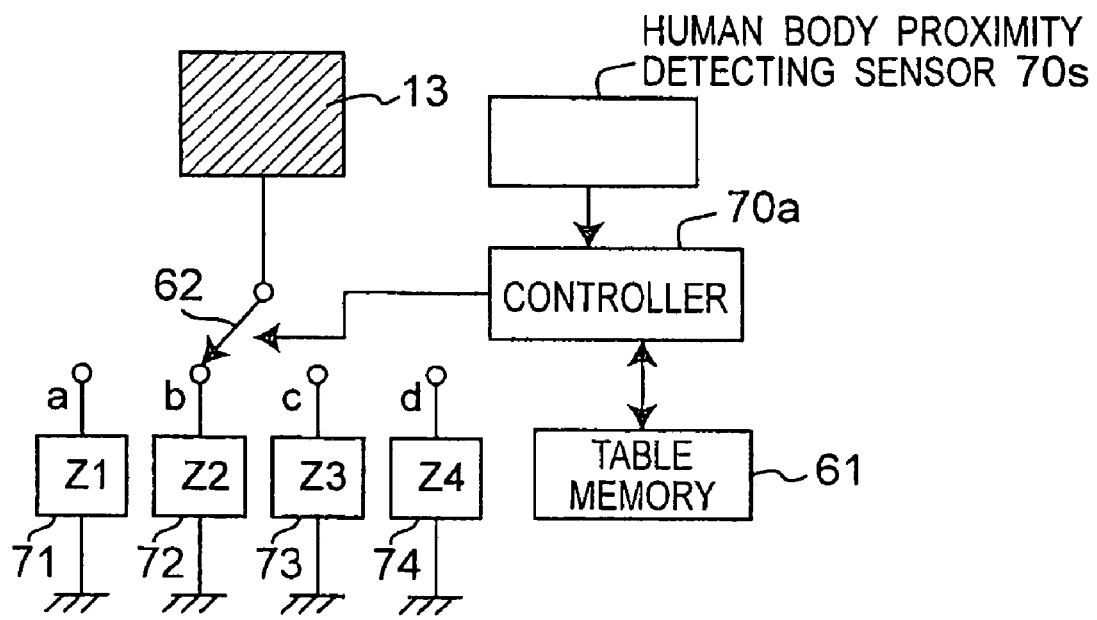
FIG. 17 is a block diagram showing a configuration of a radio communication apparatus including a radio antenna according to a modified preferred embodiment of the fifth preferred embodiment of the present invention.

FIG. 17 is a block diagram showing a configuration of a radio communication apparatus including a radio antenna according to a modified preferred embodiment of the fifth preferred embodiment of the present invention. In the modified preferred embodiment, the human body proximity sensor 71s shown in FIG. 16 is applied to the radio communication apparatus shown in FIG. 12.

Referring to FIG. 17, a controller 70a starts a control processing for a changeover switch 62 for selectively changing over load impedance elements 71 to 74 in response to a detection signal from the human body proximity sensor 71s, selects one of the load impedance elements (one of 71 to 74) so as to reduce a current flowing at a point A of a housing 11 of the radio communication apparatus with reference to control data stored in a table memory 61. Then, the current flowing at the point A of the housing 11 of the radio communication apparatus is reduced, preferably and substantially the minimum, and the SAR can be remarkably reduced.

FIG. 18 is a perspective view showing a direction of an XYZ coordinate system provided relative to the radio communication apparatus shown in FIG. 16 when a radiation pattern from the radio communication apparatus is measured.

Referring to FIG. 18, a direction perpendicular to a front surface of the radio communication apparatus (on which surface a keyboard, a microphone, and a loudspeaker sound hole section are provided), and toward a human body is defined as an X direction, a lateral or horizontal direction of the front surface is defined as a Y direction, and the longitudinal direction of the whip antenna 12 directed upward is defined as a Z direction.

Figure 19:
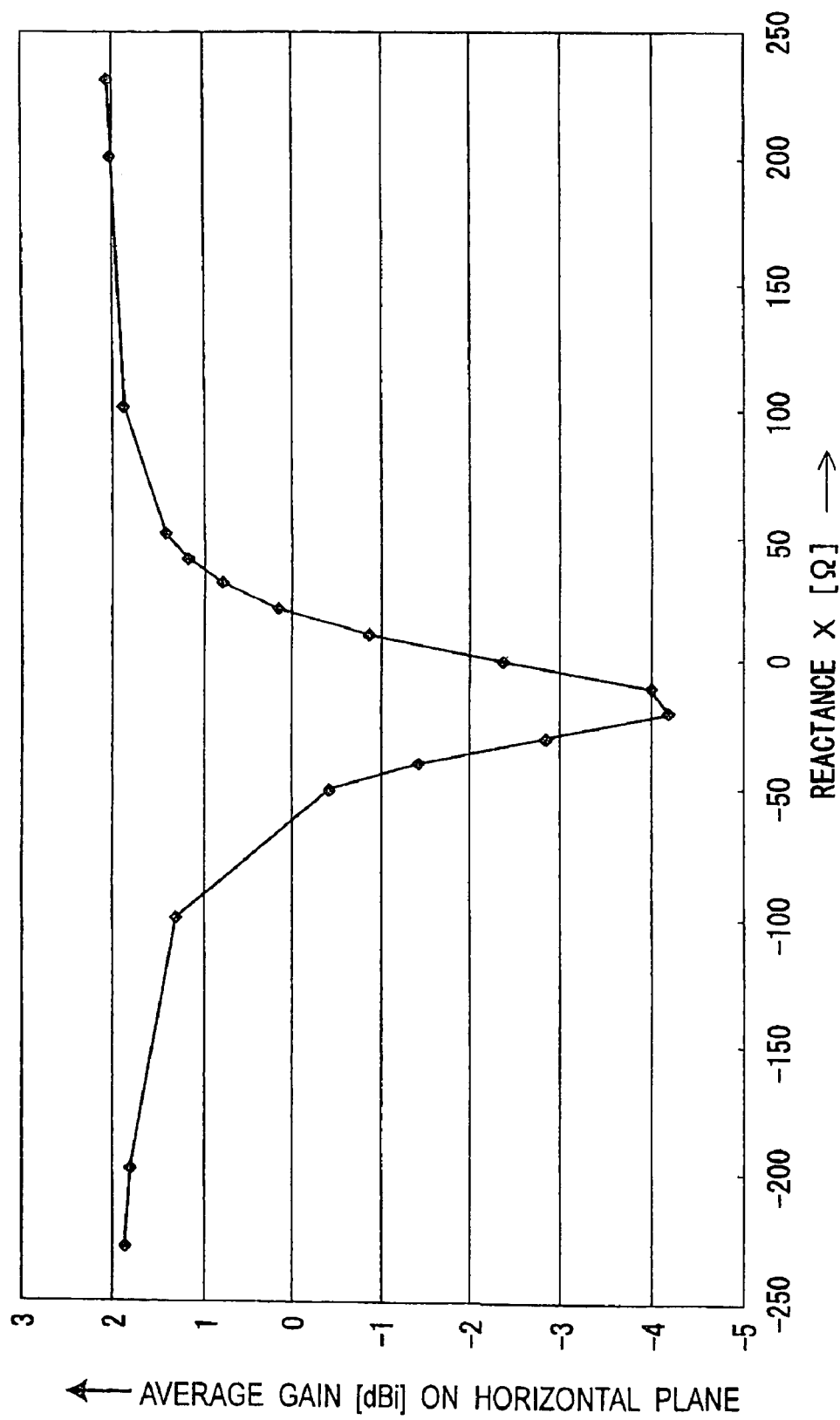
FIG. 19 is a graph showing an average gain on a horizontal plane when the reactance X of the impedance element 51 connected with a parasitic element 13 shown in FIG. 16 is changed.

FIG. 19 is a graph showing an average gain on a horizontal plane (an XY plane of FIG. 16) when the reactance X of the load impedance element 51 connected with a parasitic element 13 shown in FIG. 16 is changed. The "average gain" means herein an average gain at all azimuth angles. As is apparent from FIG. 19, when the reactance X of the load impedance element 51 is changed, the radiation average gain is changed, accordingly. It is when the reactance X satisfies either X>40 Ω or X<−100 Ω that the radiation average gain is larger than one dBi. On the other hand, when the reactance X is set to 20 to 50 Ω, the maximum current shown in FIG. 5 and the current at the local point A shown in FIG. 6 are reduced. It can be seen that it is when the reactance X is 50 Ω that the average gain shown in FIG. 19 is larger than one dBi while the reactance X is in this range.

FIG. 20A is a plan view showing results of an experiment when the radiation pattern from the radio communication apparatus shown in FIG. 16 is measured, and showing a radiation pattern on the XY plane. FIG. 20B is a plan view showing results of the experiment, and showing a radiation pattern on a YZ plane. FIG. 20C is a plan view showing results of the experiment, and showing a radiation pattern on a ZX plane. In FIGS. 20A to 20C, $P_\theta$ denotes a θ component of a radiation relative gain (with reference to a half-wave dipole antenna) at an angle θ in a longitudinal direction of the antenna, and $P_\phi$ denotes a φ component of the radiation relative gain (with reference to the half-wave dipole antenna) at an angle φ that is an azimuth angle on a plane including the longitudinal direction of the antenna.

During measurement of the radiation pattern shown in FIGS. 20A to 20C, the reactance X of the load impedance element 51 is 50 Ω. At that time, the radiation average gain is 1.42 dBi, the current flowing on the housing 11 is 5.7 mA, and the current flowing at the point A is 2.0 mA. Therefore, when the reactance X is 50 Ω, the antenna according to the present preferred embodiment radiates with relatively high radiation gain, and the SAR is relatively low. The reactance X of 50 Ω can be said to be optimum.

Alternatively, in the preferred embodiment shown in FIG. 16 or 17, when the human body is not in the proximity to the housing of the radio communication apparatus, the reactance X of the load impedance element 51 can be set to increase the radiation gain. When the human body is in the proximity to the housing thereof, the reactance can be set to reduce the current flowing on the housing 11 of the radio communication apparatus. For instance, when the human body is not in the proximity to the housing thereof, the reactance X of the load impedance element 51 is set to 100 to 200 Ω. When the human body is in the proximity to the housing thereof, the reactance X of the load impedance element 51 is set to 50 Ω. By thus controlling the same, the SAR can be reduced, and the radiation gain can be improved.

In the above-mentioned preferred embodiments, only when a telephone conversation signal that indicates that the telephone conversation is held is received from a controller (not shown) that controls the entirety of the radio communication apparatus, the detection signal from the human body proximity sensor 71s can be received, and the load impedance element 51 can be controlled based on the received detection signal.

The Other Modified Preferred Embodiments

Figure 21:
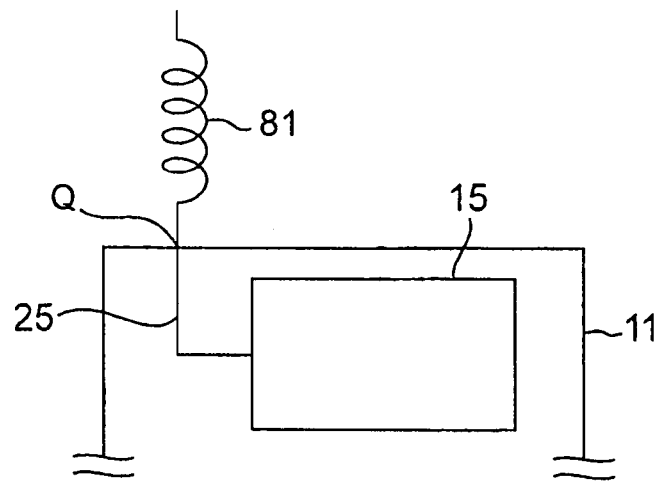
FIG. 21 is a block diagram showing a configuration of a part of a radio communication apparatus including a radio antenna according to a first modified preferred embodiment of the present invention.

FIG. 21 is a block diagram showing a configuration of a part of a radio communication apparatus including a radio antenna according to a first modified preferred embodiment of the present invention. A helical antenna 81 shown in FIG. 21 may be employed in place of the whip antenna 12 employed in the preceding preferred embodiments.

Figure 22:
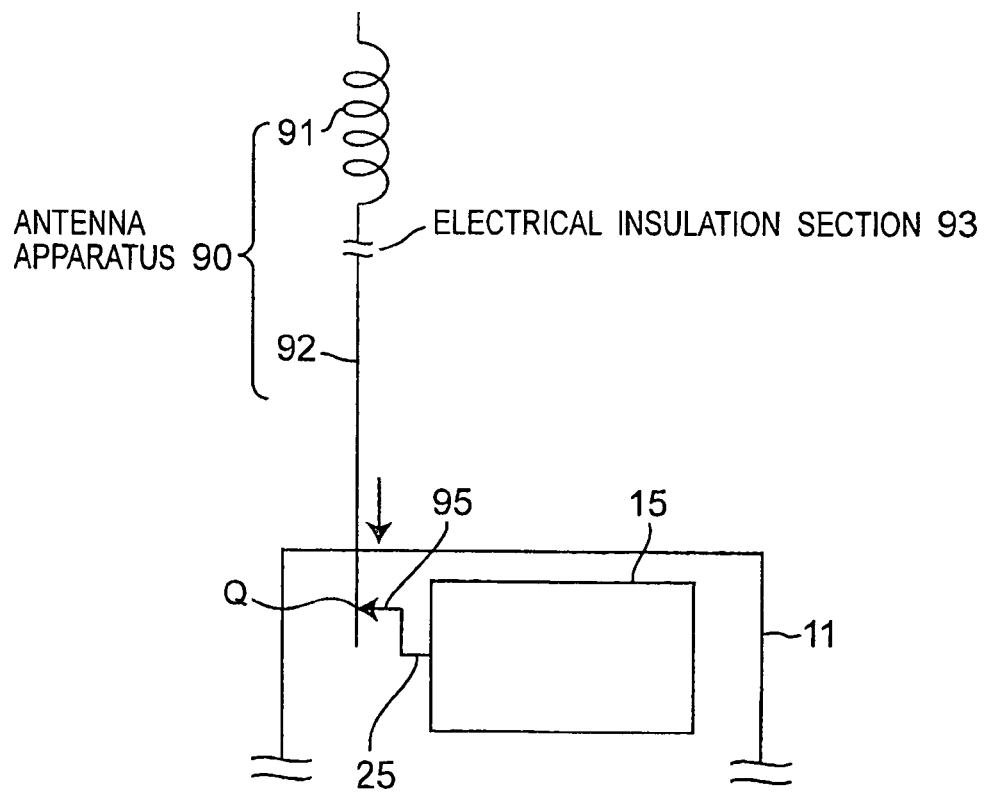
FIG. 22 is a block diagram showing a configuration of a part of a radio communication apparatus including a radio antenna according to a second modified preferred embodiment of the present invention.

FIG. 22 is a block diagram showing a configuration of a part of a radio communication apparatus including a radio antenna according to a second modified preferred embodiment of the present invention. An antenna apparatus 90 shown in FIG. 22 may be employed in place of the whip antenna 12 employed in the preceding preferred embodiments. The antenna apparatus 90 is constituted such that a helical antenna 91 and a one-quarter-wave whip antenna 92 are connected with each other through a dielectric section that is an electric insulation section 93 so that longitudinal directions of the antennas 91 and 92 extend on the same line. A radio communication circuit 15 is connected with a contact 95 which contacts with the whip antenna 92, through a feeding cable 25, and a connection section in which the contact 95 is connected with the whip antenna 92 serves as a feeding point Q. When the antenna apparatus 90 is expanded, the whip antenna 92 is connected with the radio communication circuit 15 to set the whip antenna 92 in an operation state as shown in FIG. 22. When the whip antenna 92 included in the antenna apparatus 90 is contained in the housing 11, the contact 95 is connected with a lower one end of the helical antenna 91, and the helical antenna 91 is connected with the radio communication circuit 15 to thereby set the helical antenna 91 in an operation state.

In the preferred embodiment shown in FIG. 1, the circulator 16 is employed so as to separate the transmitted signal from the received signal. However, the present invention is not limited to this. A multiplexer filter, a transmission-reception changeover switch, or the like may be employed in place of the circulator 16.

Sensor and its Implemental Position

In the fifth preferred embodiment and the modified preferred embodiment of the fifth preferred embodiment mentioned above, the human proximity sensor 71s is employed. However, the present invention is not limited to the fifth preferred embodiment and the modified preferred embodiment of the fifth preferred embodiment. A temperature sensor, a touch sensor, or a combination of the temperature sensor and the touch sensor is preferably and additionally provided in the radio communication apparatus so as to prevent erroneous detection by the single human proximity sensor 71s. In other words, the load impedance element 51 may be controlled only when the temperature sensor detects that a body temperature is equal to or higher than a predetermined threshold (when the human body contacts with the housing 11 of the radio communication apparatus), and when the detection signal from the human body proximity sensor 71s is received. Alternatively, the load impedance element 51 may be controlled only when the touch sensor detects a stress equal to or larger than a predetermined threshold, and when the detection signal from the human body proximity sensor 71s is received. Further, the load impedance element 51 may be controlled only when the temperature sensor detects the body temperature equal to or higher than the predetermined threshold, the touch sensor detects the stress equal to or larger than the predetermined threshold, and when the detection signal from the human body proximity sensor 71s is received.

That is, in the preferred embodiments, it suffices to provide at least one of the human body proximity sensor 71s, the temperature sensor, and the touch sensor (which sensors will be generically referred to as "sensor 111 or 113" hereinafter). The sensor 111 is preferably provided in at least one of the following portions of the portable radio communication apparatus with which portion the human body contacts:

(A) A loudspeaker sound hole section which is in contact with the ear of the human body or a neighborhood of the sound hole section;

(B) A microphone in contact with the cheek of the human body or a neighborhood of the microphone; and (C) A hinge section which is in contact with the cheek of the human body (with which the human body may possibly contact because of a protruding shape of the hinge section) when the radio communication apparatus is a folding portable radio communication apparatus.

When a plurality of sensors are provided in the apparatus, and the sensors are provided at different positions, then SAR reduction control at a position at which it is necessary to suppress the SAR can be exercised. For example, when the sensors are arranged in the respective portions (A) and (B), and detection is carried out in the portion (A), then the load impedance is switched over so as to reduce the SAR in the neighborhood of the sound hole section. When the detection is carried out in the portion (B), the load impedance is switched over so as to reduce the SAR in the neighborhood of the microphone. Then, the SAR can be effectively reduced. It is also preferable that current control based on a load is exercised only during telephone conversation or data communication. Then, unnecessary control is not exercised, so that power consumption can be reduced and a battery life can be lengthened. The radio communication apparatus will now be described with reference to drawings which depict implemental examples of the sensor 111 or 113.

Figure 23:
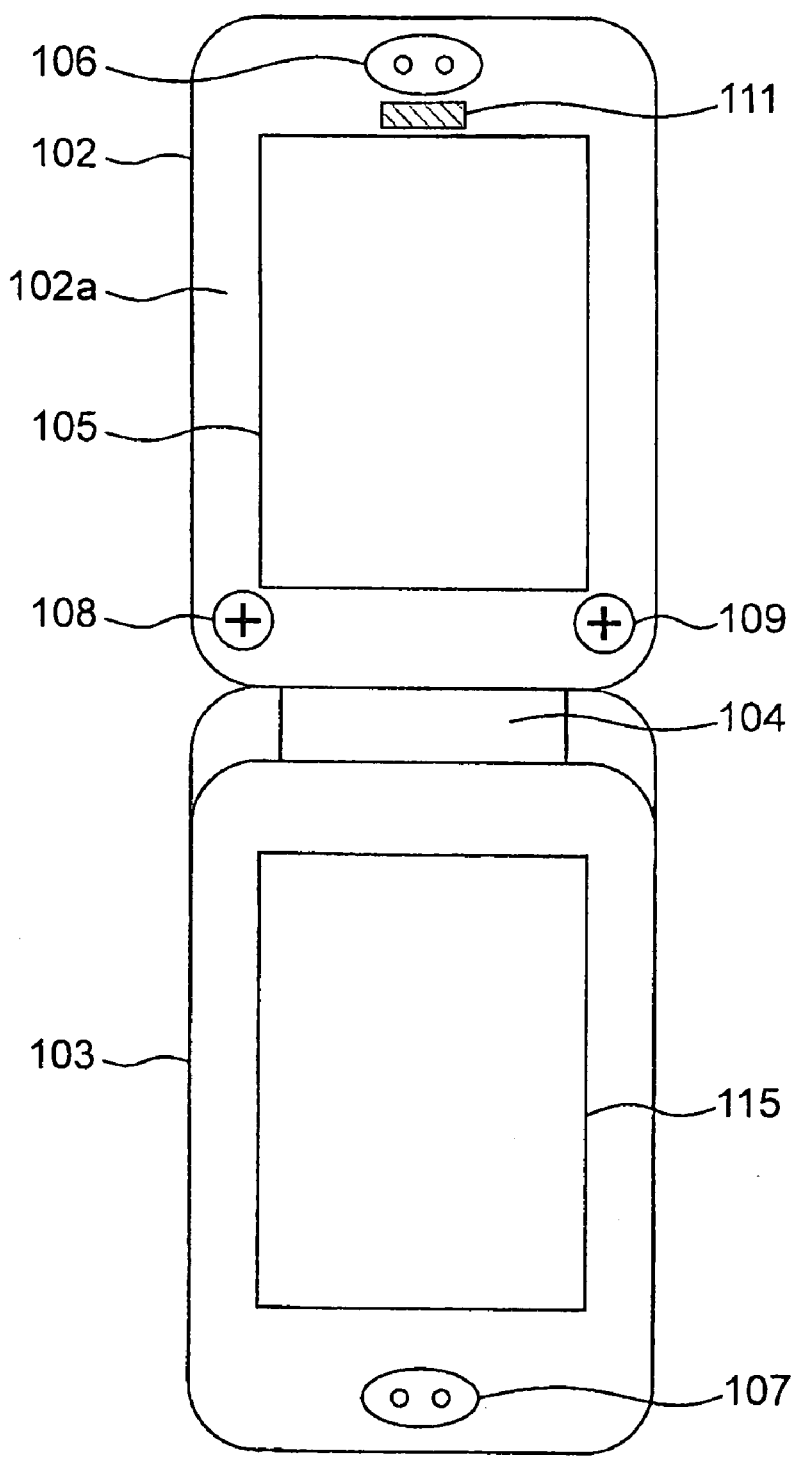
FIG. 23 is a front view of a folding portable radio communication apparatus according to a first implemental example of the present invention when a sensor 111 is provided in an upper housing 102 of the apparatus.
Figure 24:
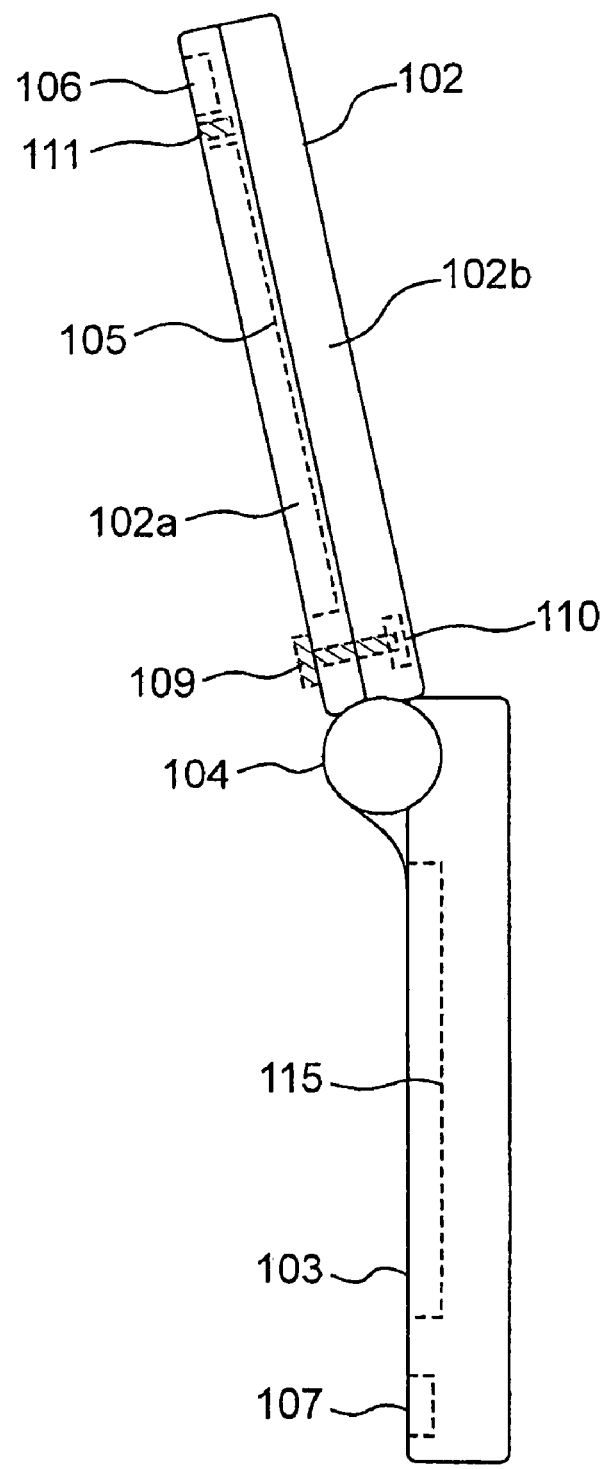
FIG. 24 is a side view of the folding portable radio communication apparatus shown in FIG. 23.

FIG. 23 is a front view of a folding portable radio communication apparatus according to a first implemental example of the present invention when the sensor 111 is provided in an upper housing 102 of the apparatus. FIG. 24 is a side view of the folding portable radio communication apparatus shown in FIG. 23. In figures following FIGS. 23 and 24, the same components are denoted by the same reference symbols as those shown in FIGS. 23 and 24.

Referring to FIGS. 23 and 24, the folding portable radio communication apparatus is constituted such that the upper housing 102 and a lower housing 103 are foldable through a hinge section 104. The upper housing 102 includes an upper first housing section 102a provided inside and an upper second housing section 102b provided outside. The upper first housing section 102a and the upper second housing section 102b are bonded and fixed to each other by screwing a lower side of a liquid crystal display 105 arranged in a central portion of the upper first housing section 102a near left and right ends of the section 102a with a screw reception portion 102b of the upper second housing section 102b using screws 108 and 109. A loudspeaker sound hole section 106 is provided above the liquid crystal display 105, and a rectangular sensor 111 is provided between the sound hole section 106 and the liquid crystal display 115. A keypad 115 is arranged in a central portion of an inner surface of the lower housing 103, and a microphone 107 is provided below the keypad 115.

Figure 25:
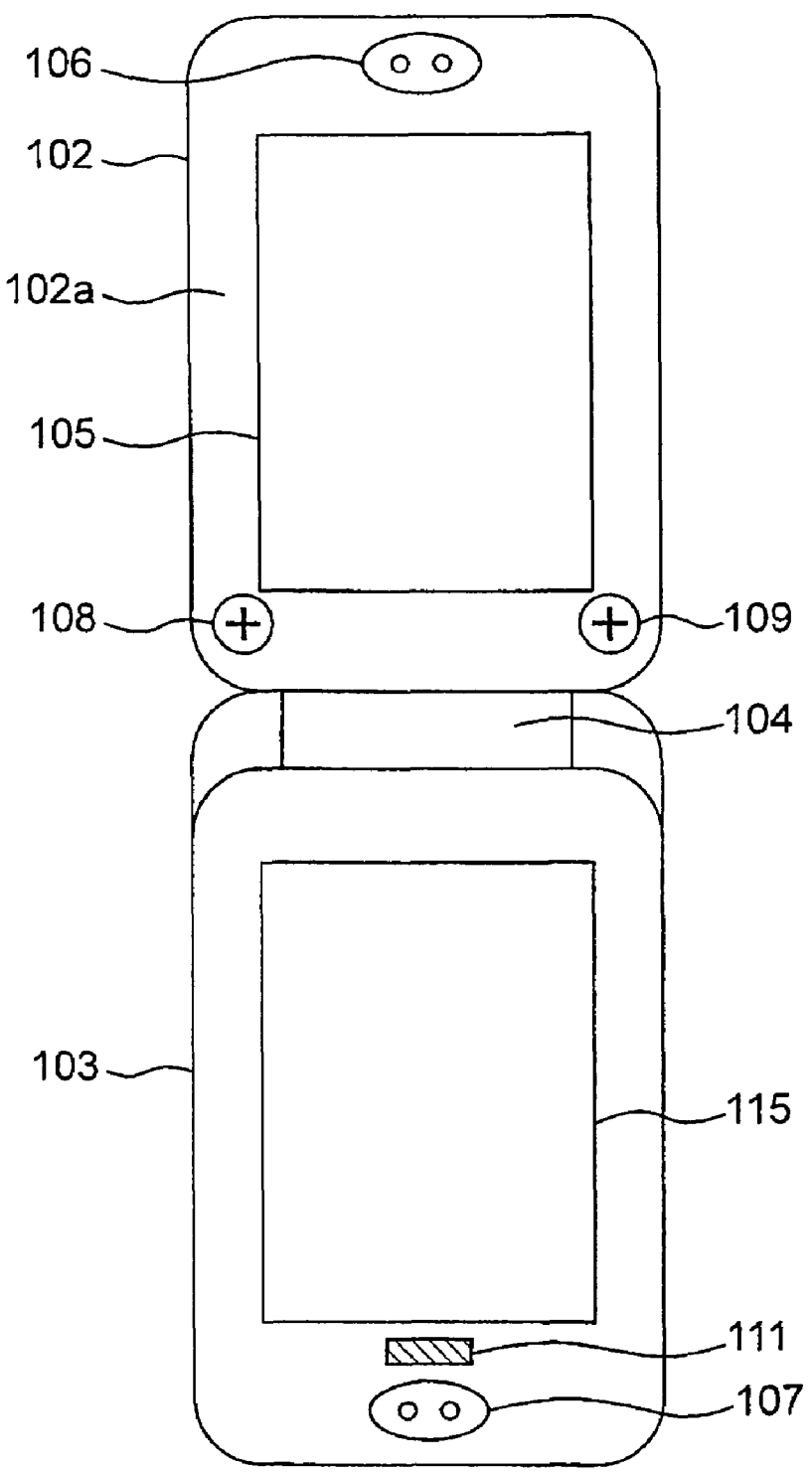
FIG. 25 is a front view of a folding portable radio communication apparatus according to a second implemental example of the present invention when the sensor 111 is included in a lower housing 103 of the apparatus.
Figure 26:
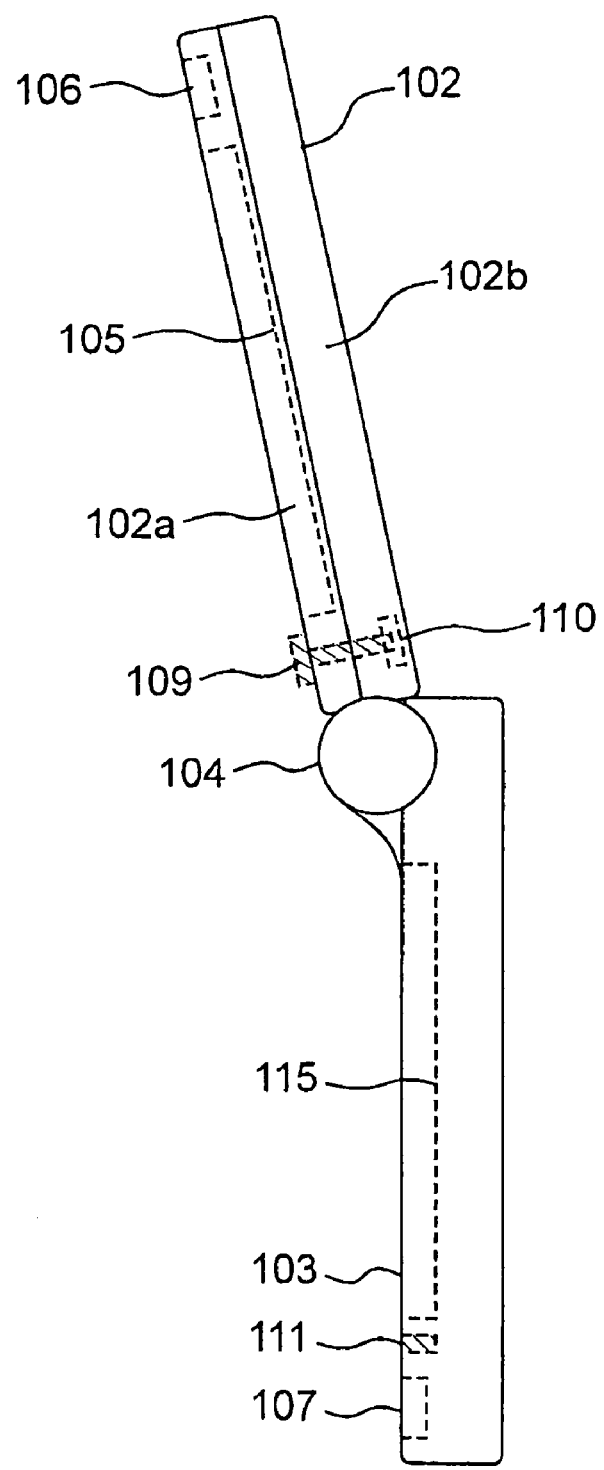
FIG. 26 is a side view of the folding portable radio communication apparatus shown in FIG. 25.

FIG. 25 is a front view of a folding portable radio communication apparatus according to a second implemental example of the present invention when the sensor 111 is included in a lower housing 103 of the apparatus. FIG. 26 is a side view of the folding portable radio communication apparatus shown in FIG. 25. Referring to FIGS. 25 and 26, the sensor 111 is provided between a keypad 115 and a microphone 107 on an inner surface of the lower housing 103.

Figure 27:
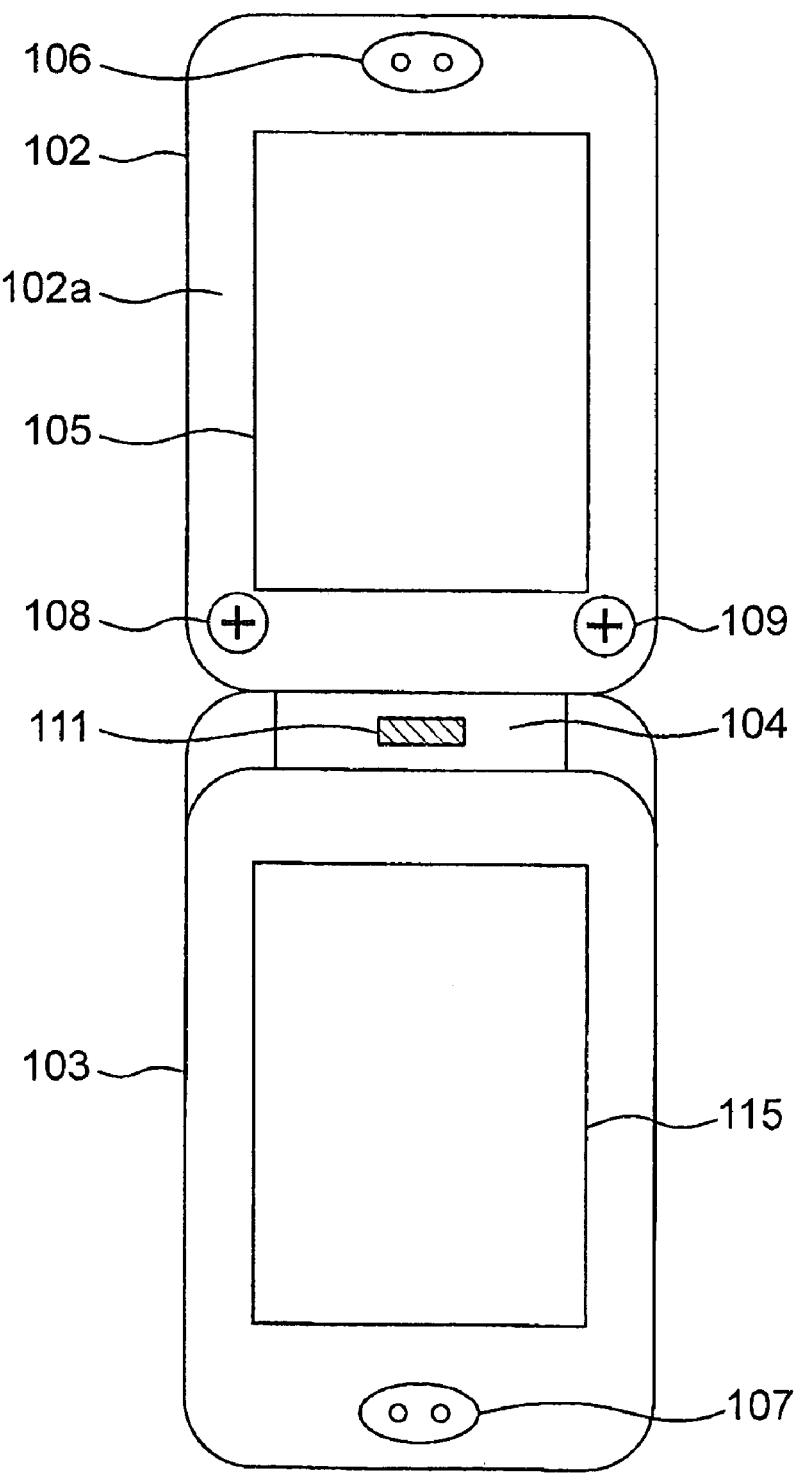
FIG. 27 is a front view of a folding portable radio communication apparatus according to a third implemental example of the present invention when the sensor 111 is provided in a hinge section 104 of the apparatus.
Figure 28:
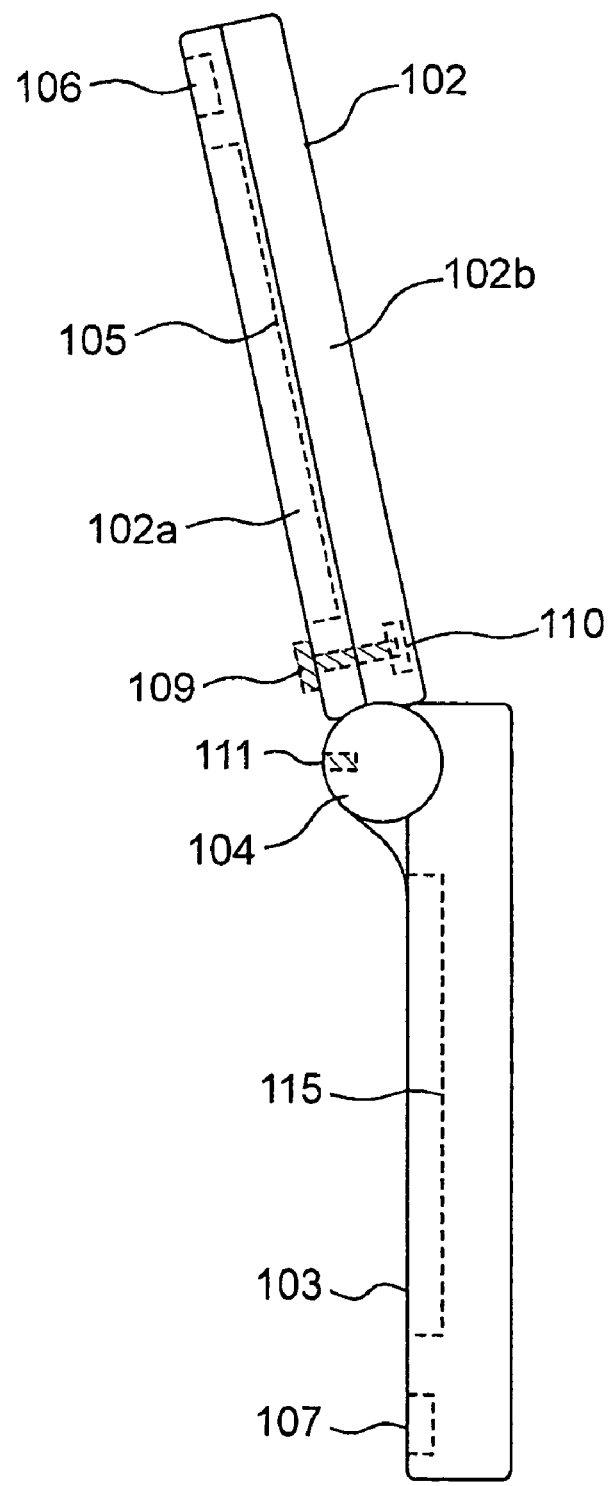
FIG. 28 is a side view of the folding portable radio communication apparatus shown in FIG. 27.

FIG. 27 is a front view of a folding portable radio communication apparatus according to a third implemental example of the present invention when the sensor 111 is provided in a hinge section 104 of the apparatus. FIG. 28 is a side view of the folding portable radio communication apparatus shown in FIG. 27. Referring to FIGS. 27 and 28, the sensor 111 is provided in an inner central portion of the hinge section 104.

Figure 29:
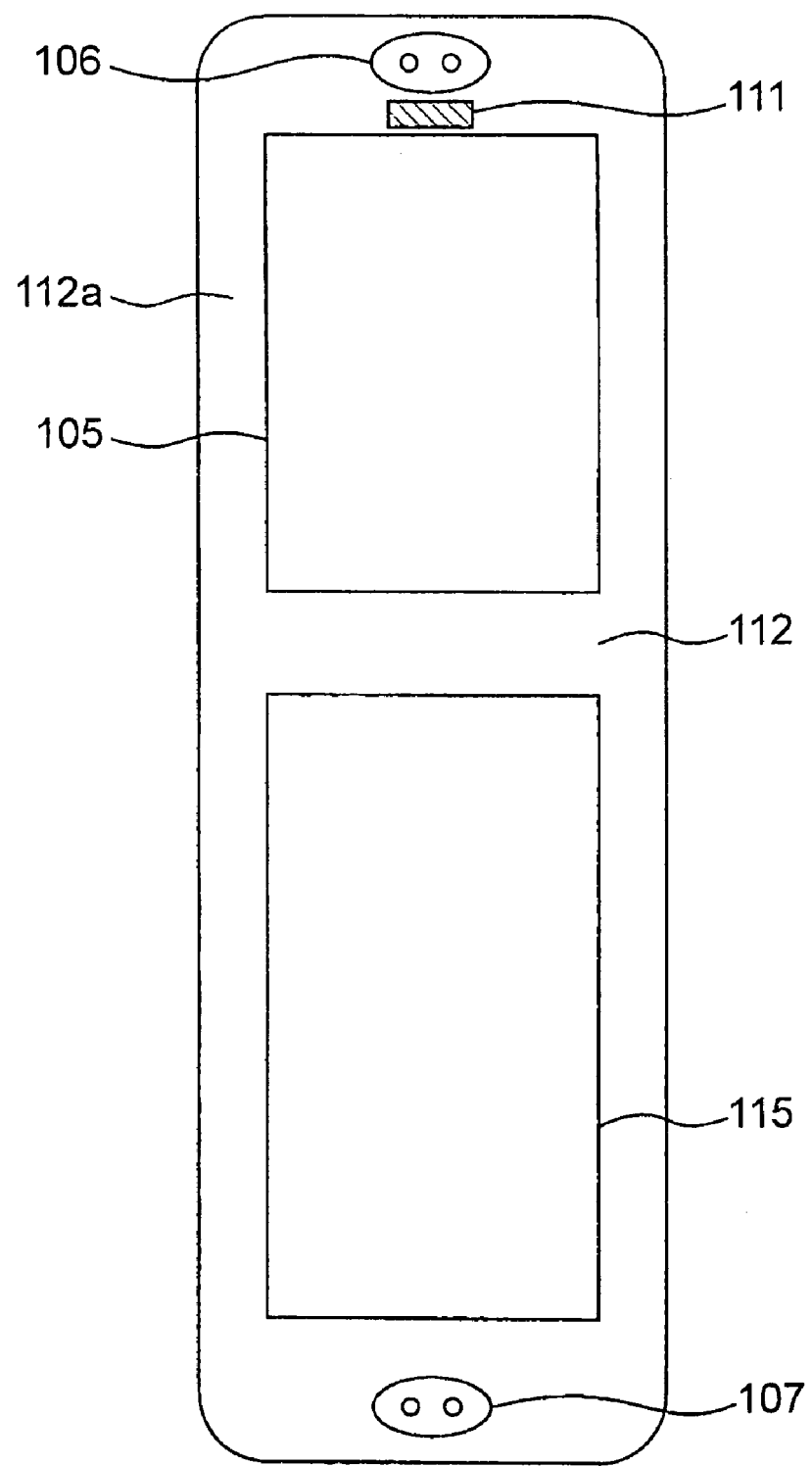
FIG. 29 is a front view of a straight portable radio communication apparatus according to a fourth implemental example of the present invention when the sensor 111 is provided in a housing 112 of the apparatus.
Figure 30:
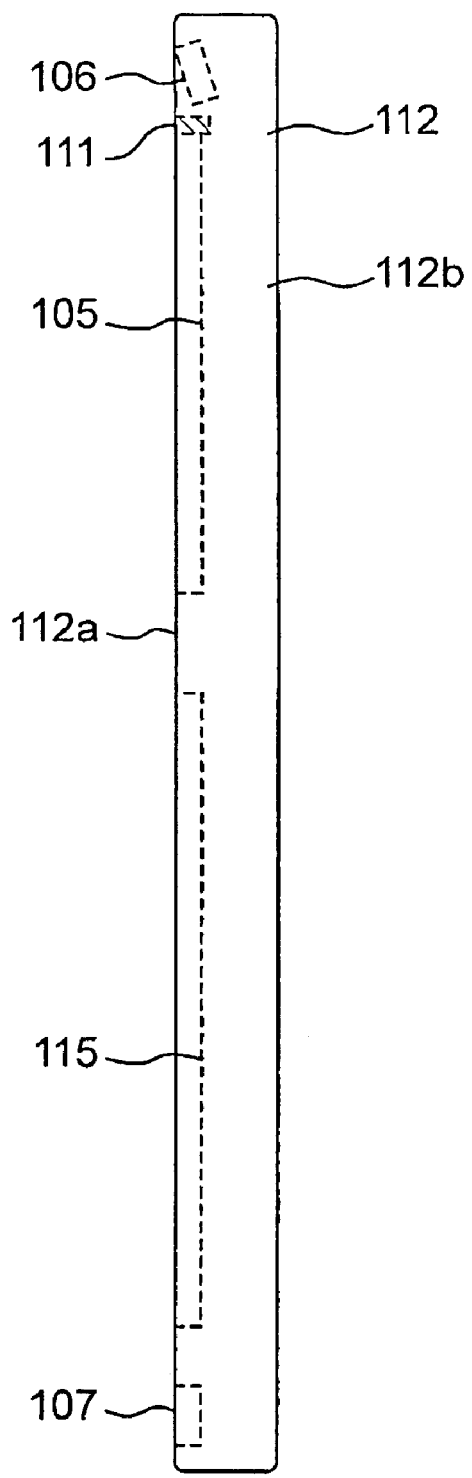
FIG. 30 is a side view of the straight portable radio communication apparatus shown in FIG. 29.

FIG. 29 is a front view of a straight portable radio communication apparatus according to a fourth implemental example of the present invention when the sensor 111 is provided in a housing 112 of the apparatus. FIG. 30 is a side view of the straight portable radio communication apparatus shown in FIG. 29.

Referring to FIGS. 29 and 30, a liquid crystal display 105 and a keypad 115 are provided on an upper side and a lower side on an inner side surface 112a of the housing 112 that includes the inner side surface 112a and an outer side surface 112b, respectively. A loudspeaker sound hole section 106 is provided between the liquid crystal display 105 and an upper end of the housing 112, and the sensor 111 is provided between the sound hole section 106 and the liquid crystal display 105. Further, a microphone 107 is provided between the keypad 115 and a lower end of the housing 112.

Figure 31:
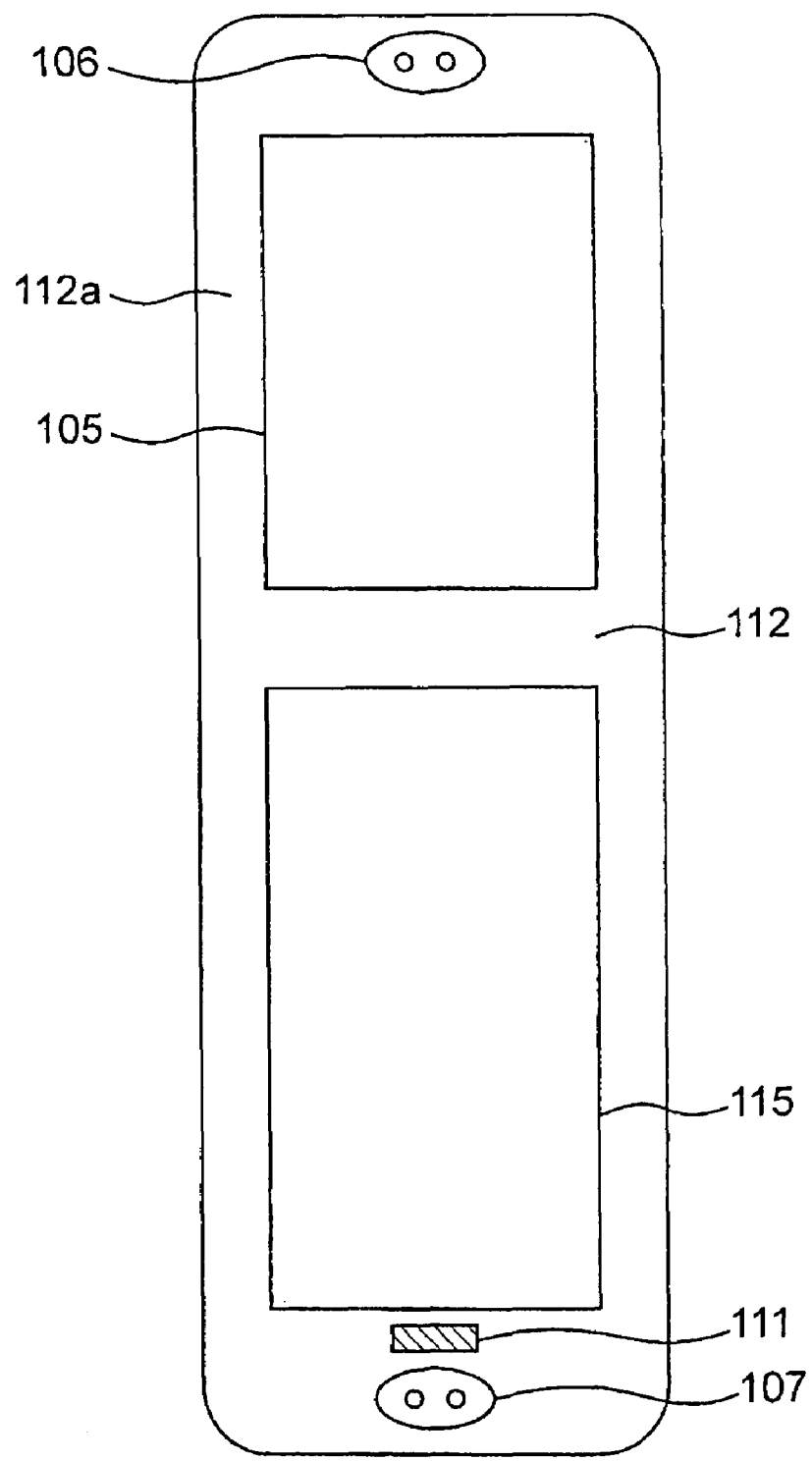
FIG. 31 is a front view of a straight portable radio communication apparatus according to a fifth implemental example of the present invention when the sensor 111 is provided in a housing 112 of the apparatus.
Figure 32:
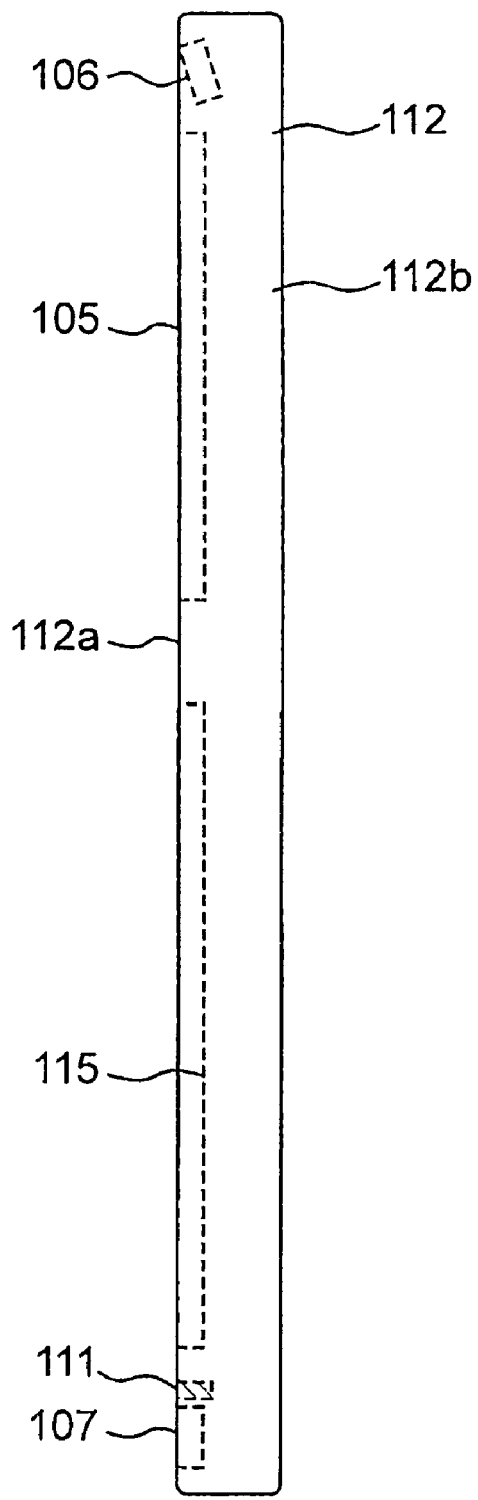
FIG. 32 is a side view of the straight portable radio communication apparatus shown in FIG. 31.

FIG. 31 is a front view of a straight portable radio communication apparatus according to a fifth implemental example of the present invention when the sensor 111 is provided in a housing 112 of the apparatus. FIG. 32 is a side view of the straight portable radio communication apparatus shown in FIG. 31. Referring to FIGS. 31 and 32, the sensor 111 is included between a keypad 115 and a microphone 107.

Figure 33:
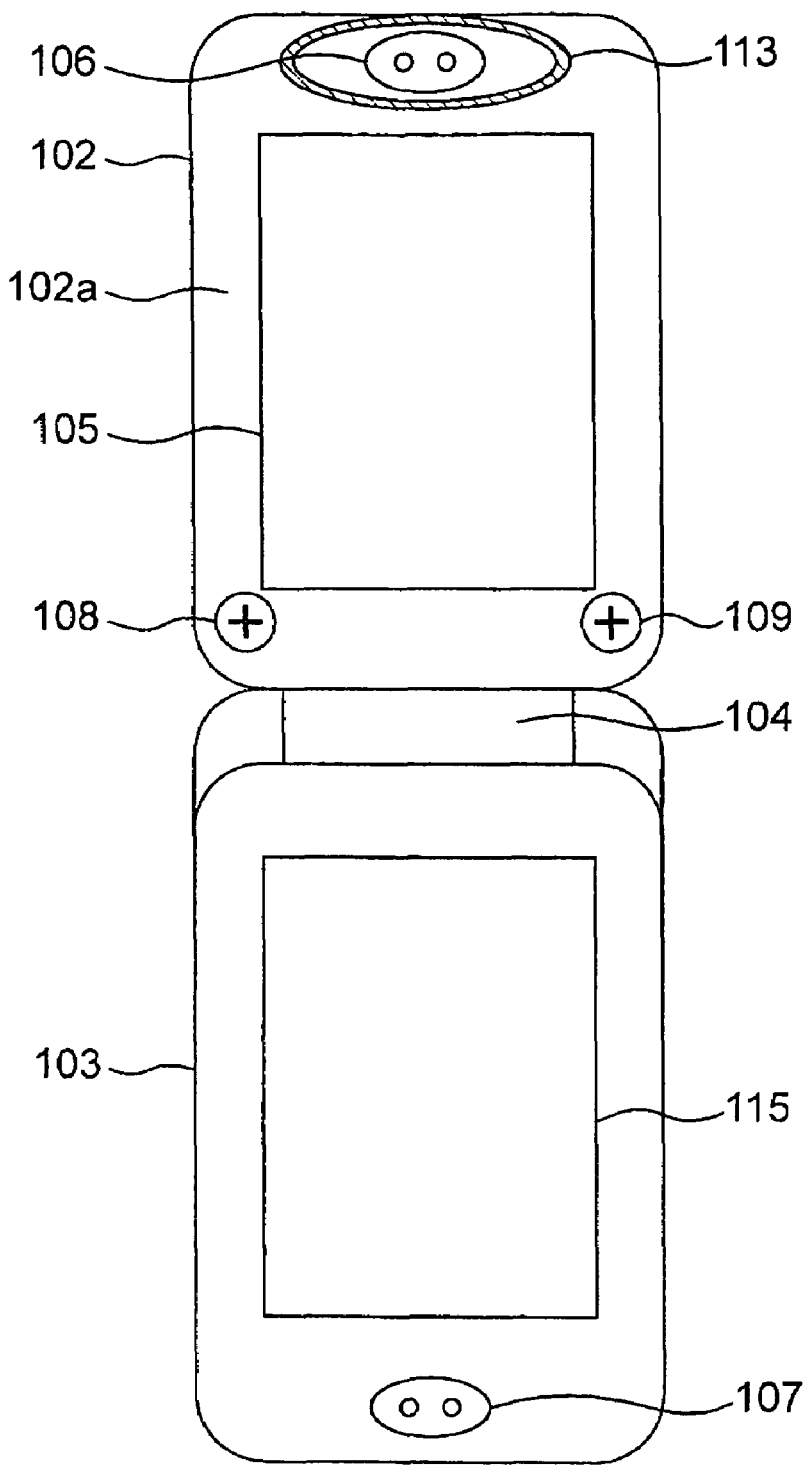
FIG. 33 is a front view of a folding portable radio communication apparatus according to a sixth implemental example of the present invention when a generally elliptic sensor 113 is provided around a sound hole section 106 of an upper housing 102 of the apparatus.
Figure 34:
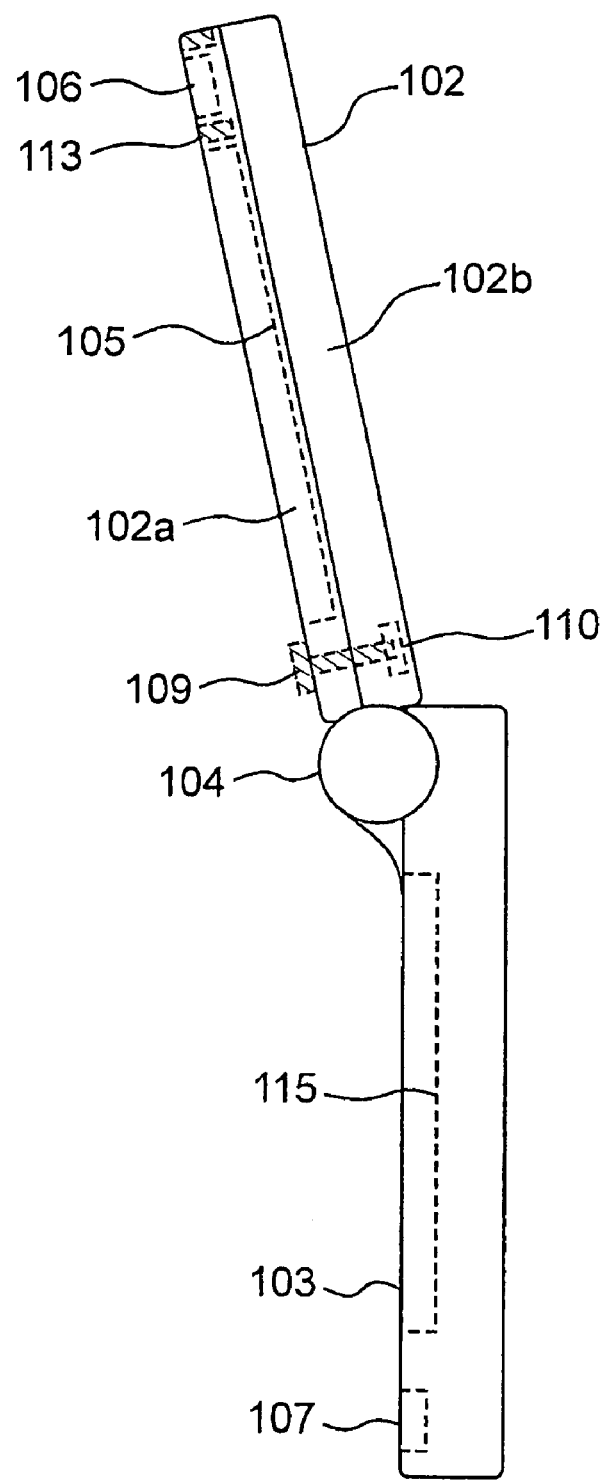
FIG. 34 is a side view of the folding portable radio communication apparatus shown in FIG. 33.

FIG. 33 is a front view of a folding portable radio communication apparatus according to a sixth implemental example of the present invention when a generally elliptic sensor 113 is provided around a sound hole section 106 of an upper housing 102 of the apparatus. FIG. 34 is a side view of the folding portable radio communication apparatus shown in FIG. 33. Referring to FIGS. 33 and 34, the generally elliptic sensor 113 is provided around the sound hole section 106 of the upper housing 102.

Figure 35:
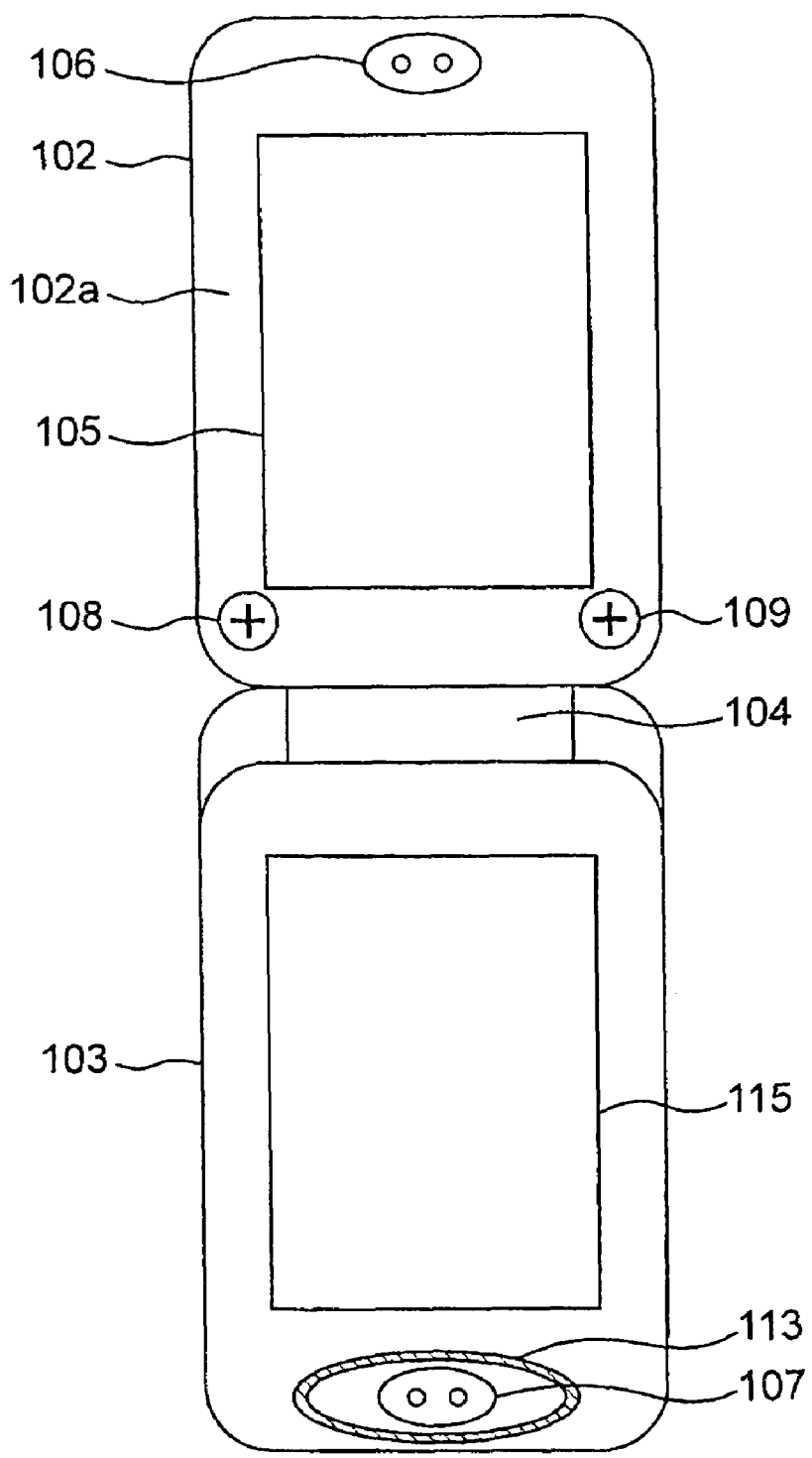
FIG. 35 is a front view of a folding portable radio communication apparatus according to a seventh implemental example of the present invention when the generally elliptic sensor 113 is provided around a microphone 107 of a lower housing 103 of the apparatus.
Figure 36:
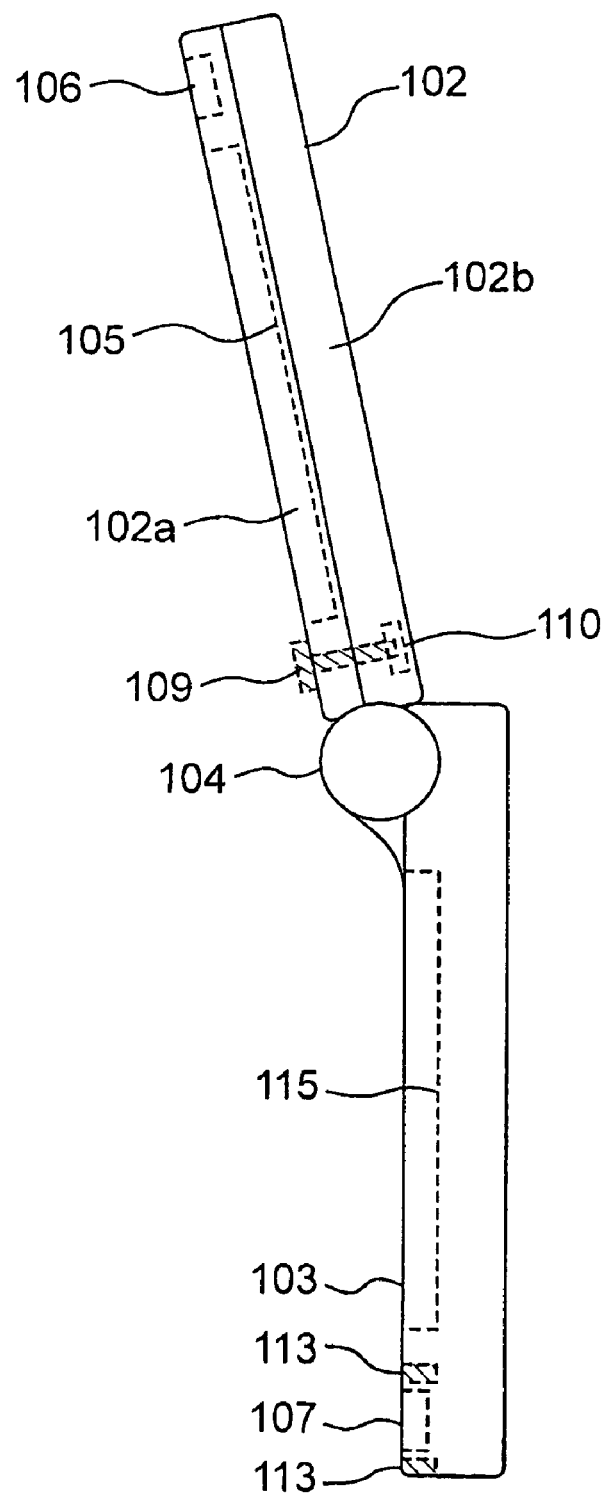
FIG. 36 is a side view of the folding portable radio communication apparatus shown in FIG. 35.

FIG. 35 is a front view of a folding portable radio communication apparatus according to a seventh implemental example of the present invention when the generally elliptic sensor 113 is provided around a microphone 107 of a lower housing 103 of the apparatus. FIG. 36 is a side view of the folding portable radio communication apparatus shown in FIG. 35. Referring to FIGS. 35 and 36, the sensor 113 is provided around the microphone 113.

Figure 37:
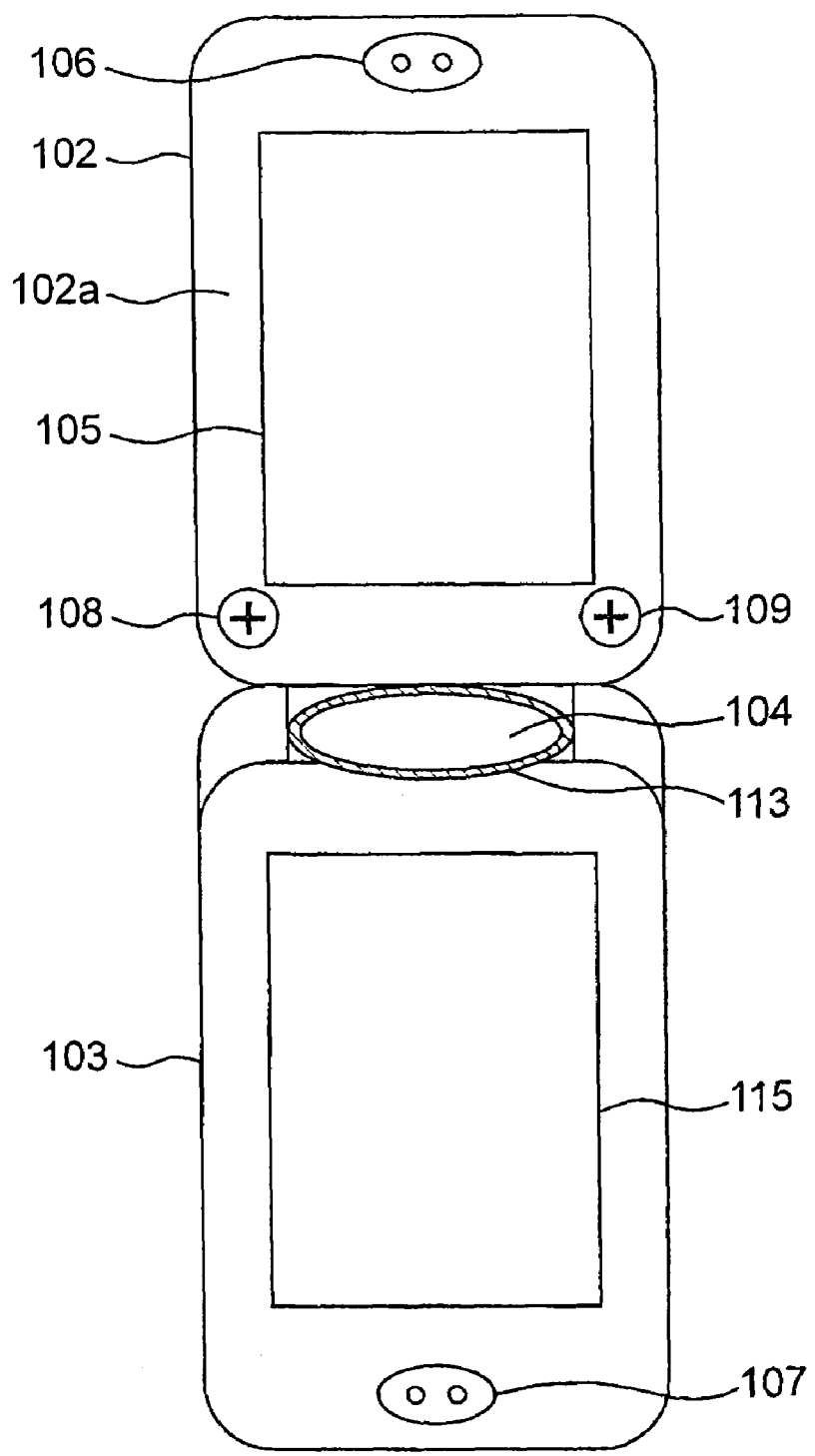
FIG. 37 is a front view of a folding portable radio communication apparatus according to an eighth implemental example of the present invention when the generally elliptic sensor 113 is provided in a hinge section 104 of the apparatus.
Figure 38:
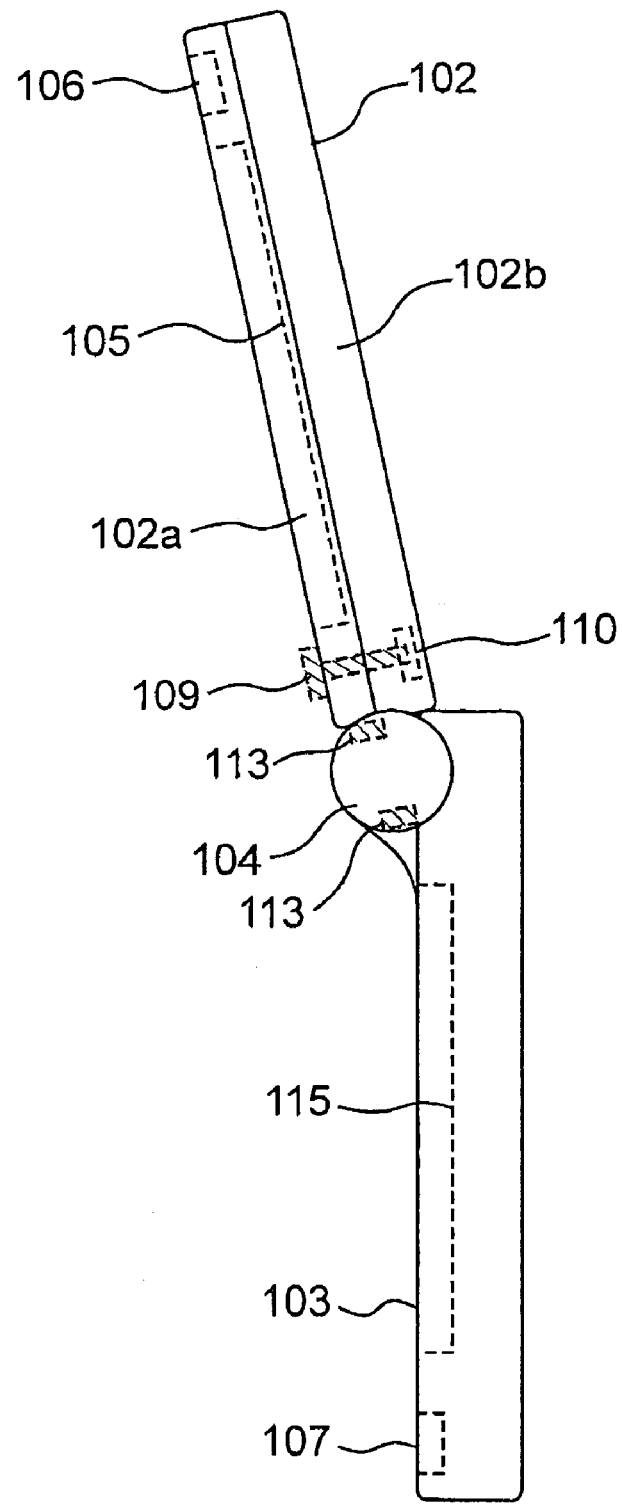
FIG. 38 is a side view of the folding portable radio communication apparatus shown in FIG. 37.

FIG. 37 is a front view of a folding portable radio communication apparatus according to an eighth implemental example of the present invention when the generally elliptic sensor 113 is provided in a hinge section 104 of the apparatus. FIG. 38 is a side view of the folding portable radio communication apparatus shown in FIG. 37. Referring to FIGS. 37 and 38, the sensor 113 is provided on an inner side surface of the hinge section 104.

Figure 39:
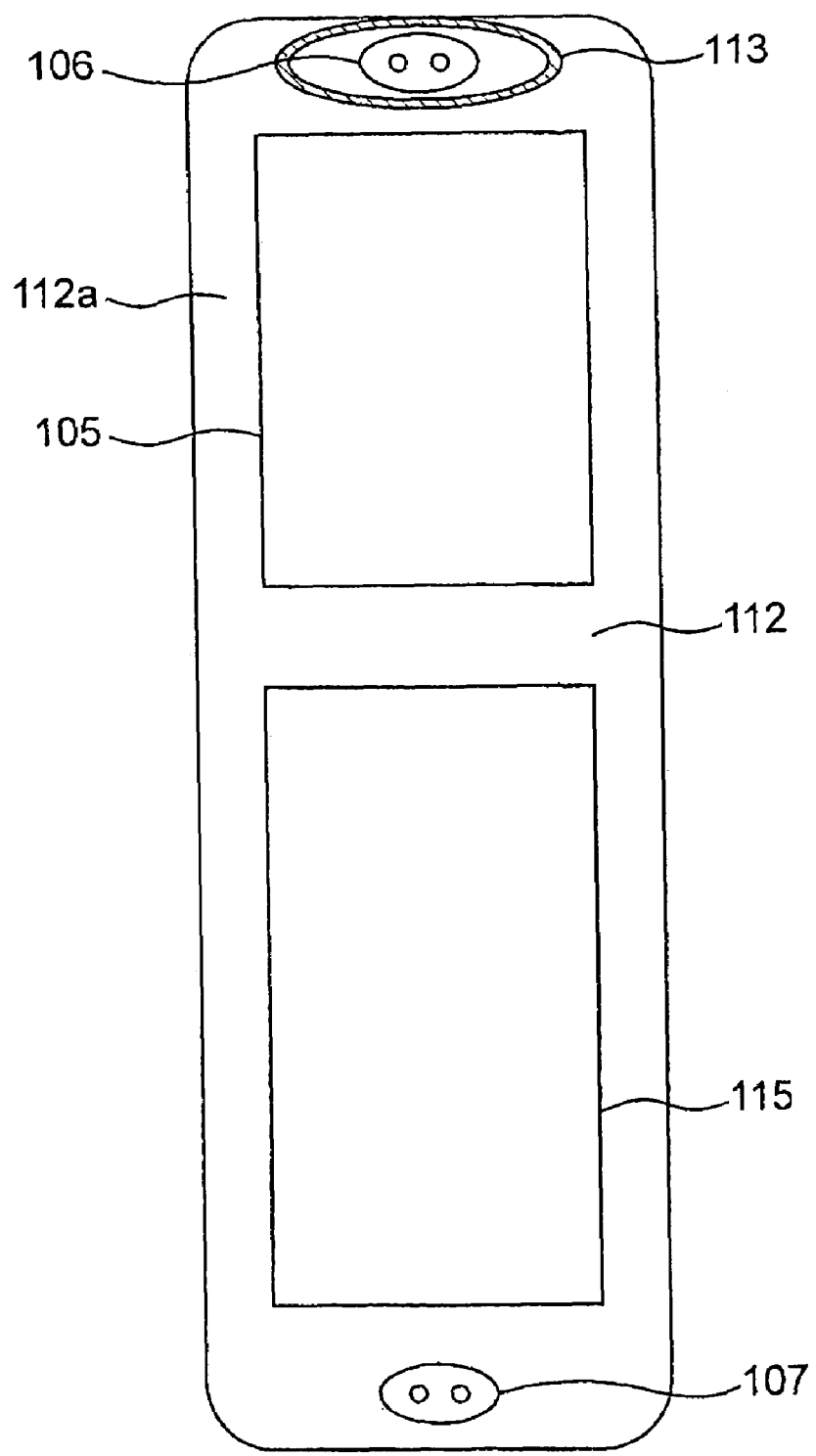
FIG. 39 is a front view of a straight portable radio communication apparatus according to a ninth implemental example of the present invention when the generally elliptic sensor 113 is provided around a sound hole section 106 of a housing 112 of the apparatus.
Figure 40:
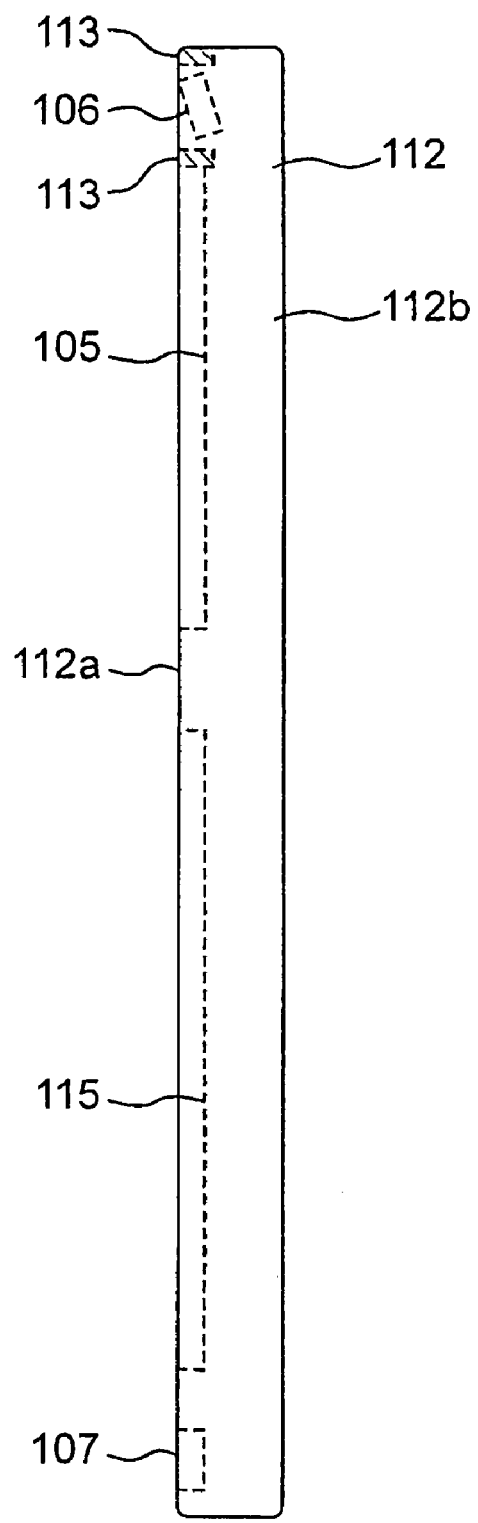
FIG. 40 is a side view of the straight portable radio communication apparatus shown in FIG. 39.

FIG. 39 is a front view of a straight portable radio communication apparatus according to a ninth implemental example of the present invention when the generally elliptic sensor 113 is provided around a sound hole section 106 of a housing 112 of the apparatus. FIG. 40 is a side view of the straight portable radio communication apparatus shown in FIG. 39. Referring to FIGS. 39 and 40, the sensor 113 is provided around the sound hole section 106 of the housing 112.

Figure 41:
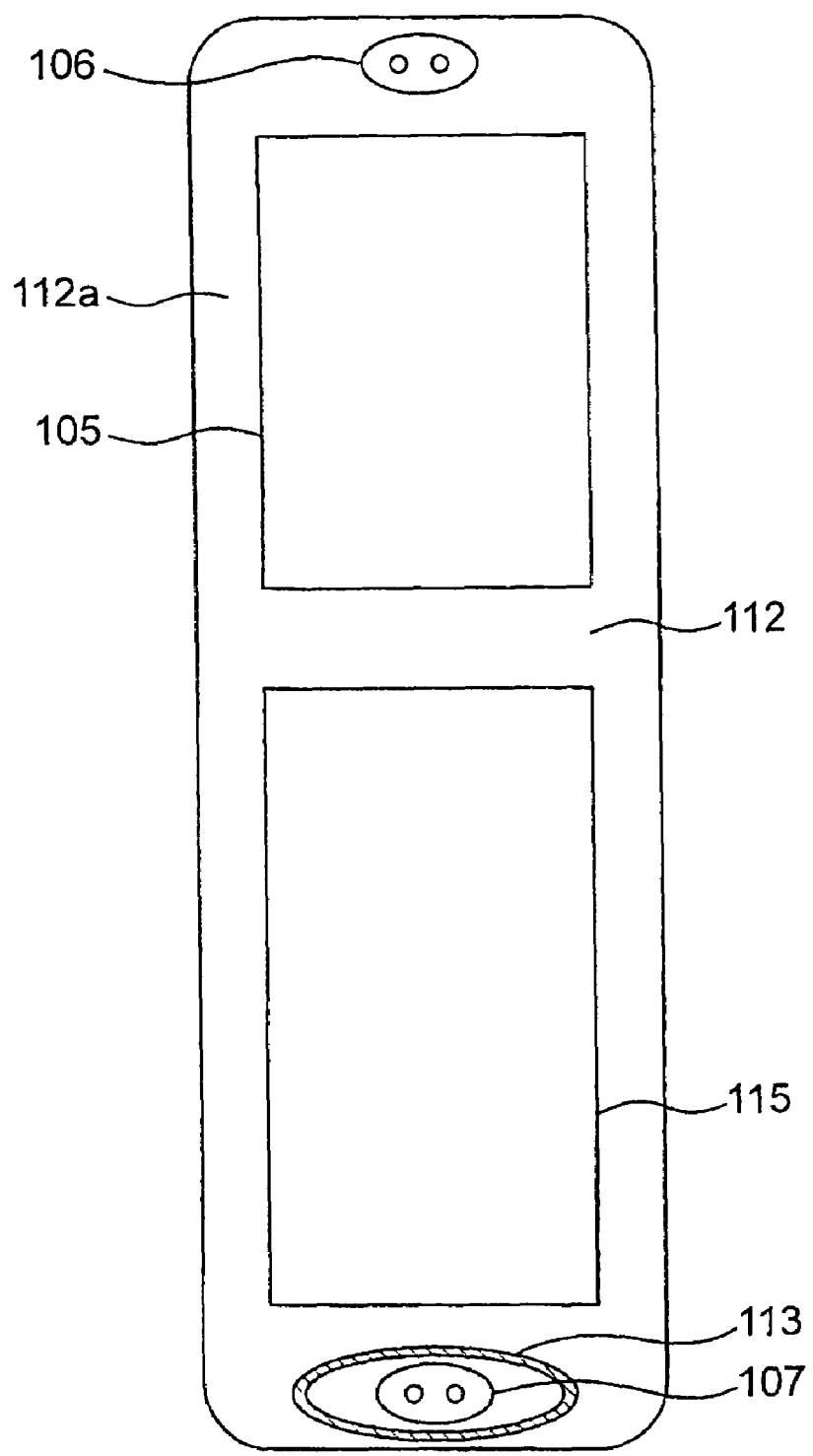
FIG. 41 is a front view of a straight portable radio communication apparatus according to a tenth implemental example of the present invention when the generally elliptic sensor 113 is provided around a microphone 107 of a housing 112 of the apparatus.
Figure 42:
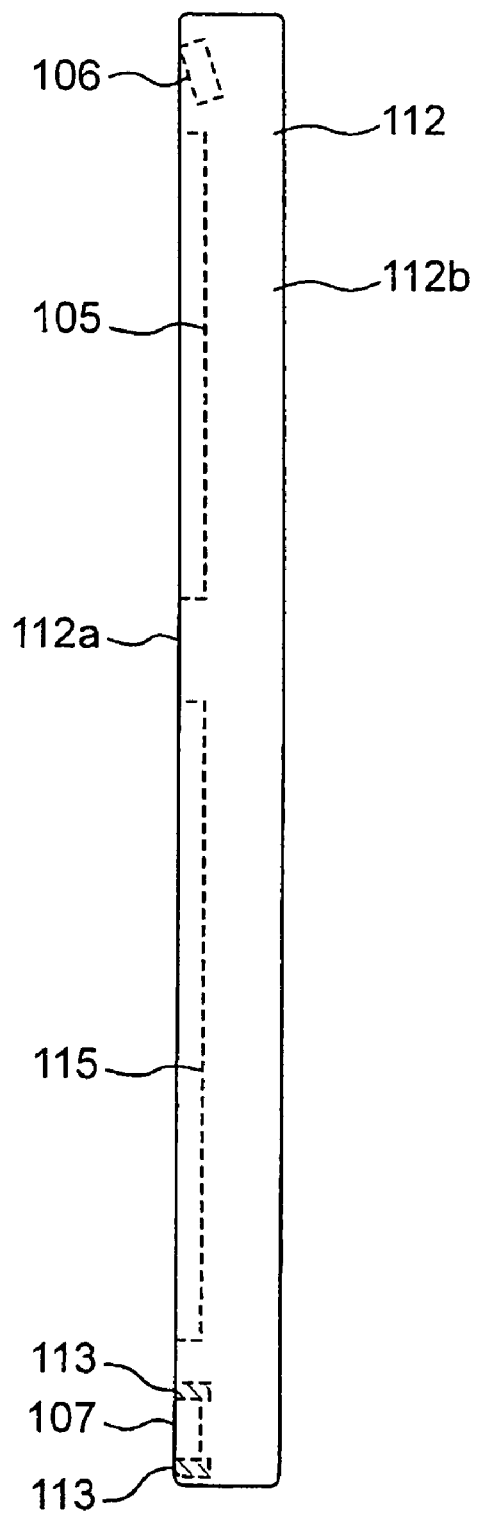
FIG. 42 is a side view of the straight portable radio communication apparatus shown in FIG. 41.

FIG. 41 is a front view of a straight portable radio communication apparatus according to a tenth implemental example of the present invention when the generally elliptic sensor 113 is provided around a microphone 107 of a housing 112 of the apparatus. FIG. 42 is a side view of the straight portable radio communication apparatus shown in FIG. 41. Referring to FIGS. 40 and 41, the sensor 113 is provided around the microphone 107 on an inner side surface of the housing 112.

Method for Detecting Current Flowing on Housing

A method for detecting a current flowing on a housing of a portable radio communication apparatus will be described with reference to FIGS. 43 and 44.

Figure 43:
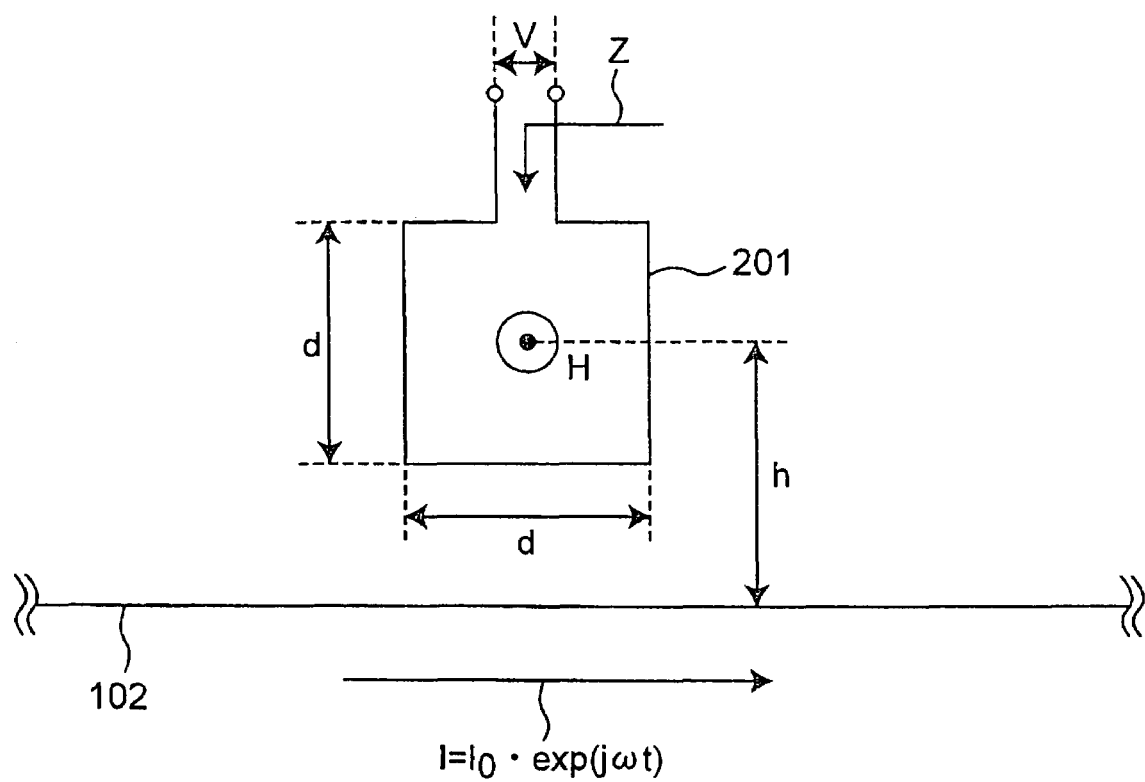
FIG. 43 is a cross-sectional view illustrating a method for detecting a current I flowing on an upper housing 102 using a magnetic field detecting probe 201.

FIG. 43 is a cross-sectional view illustrating a method for detecting a current I flowing on an upper housing 102 using a magnetic field detecting probe 201. Referring to FIG. 43, the magnetic field detecting probe 201 is a probe including a minute loop having a one-edge length of "d" and a square shape. The magnetic field detecting probe 201 is mounted above the upper housing 102 of the portable radio communication apparatus so that the probe 201 is in proximity to the upper housing 102 of the portable radio communication apparatus, and so that the shaft of the minute loop is substantially in parallel with a surface of the upper housing 102. It is assumed herein that an electromotive force on a terminal of the magnetic field detecting probe 201 is V, and an input impedance relative to the magnetic field detecting probe 201 on the terminal is Z. Then a magnetic field H of a shaft center of the magnetic field detecting probe 201 when the current I flows on the upper housing 102 is expressed by the following Equation (2) according to Ampere's rule:

$$H = I/(2\pi h) \tag{2}$$

In addition, the following Equation (3) is established:

$$B = \mu_o \cdot H \tag{3},$$

where $\mu_o$ is a magnetic permeability in a vacuum.

Further, the electromotive force V is expressed by the following Equation (4) according to Faraday's law of electromagnetic induction:

$$V = -(d\Phi/dt) \tag{4},$$

where $\Phi$ is a magnetic flux, which is expressed by the following Equation (5) when an area of the magnetic flux is S=d×d (the maximum width of a distance "d"):

$$\Phi = B \cdot S = \mu_o \cdot H \cdot d^2 = \mu_o \cdot I/(2\pi h) \cdot d^2 \tag{5}.$$

Accordingly, substitution of the Equation (4) to the Equation (5) can be led to the following Equation (6):

$$V = -\mu_o/(2\pi h) \cdot d^2 (dI/dt) \tag{6}$$

Using the Equation (7) can be led to the following Equation (8):

$$(dI/dt) = j\omega I \tag{7; and}$$

$$V = -j\omega \mu_o \cdot I/(2\pi h) \cdot d^2 \tag{8}.$$

If the input impedance of the magnetic field detecting probe 201 is Z, the received power Pr is expressed by the following Equation (9):

$$Pr=V^2/Z= (\omega \cdot \mu_o \cdot I_o \cdot d^2/(2\pi h))^2/Z \qquad (9).$$

Using the Equation (10) can be led to the Equation (11):

$$\omega=2\pi/\lambda (10); \text{ and}$$

$$Pr=(\mu_o \cdot I_o \cdot d^2/(h \cdot \lambda))2/Z \qquad (11)$$

Accordingly, by measuring the received power Pr, the current to can be calculated by using the Equations.

Figure 44:
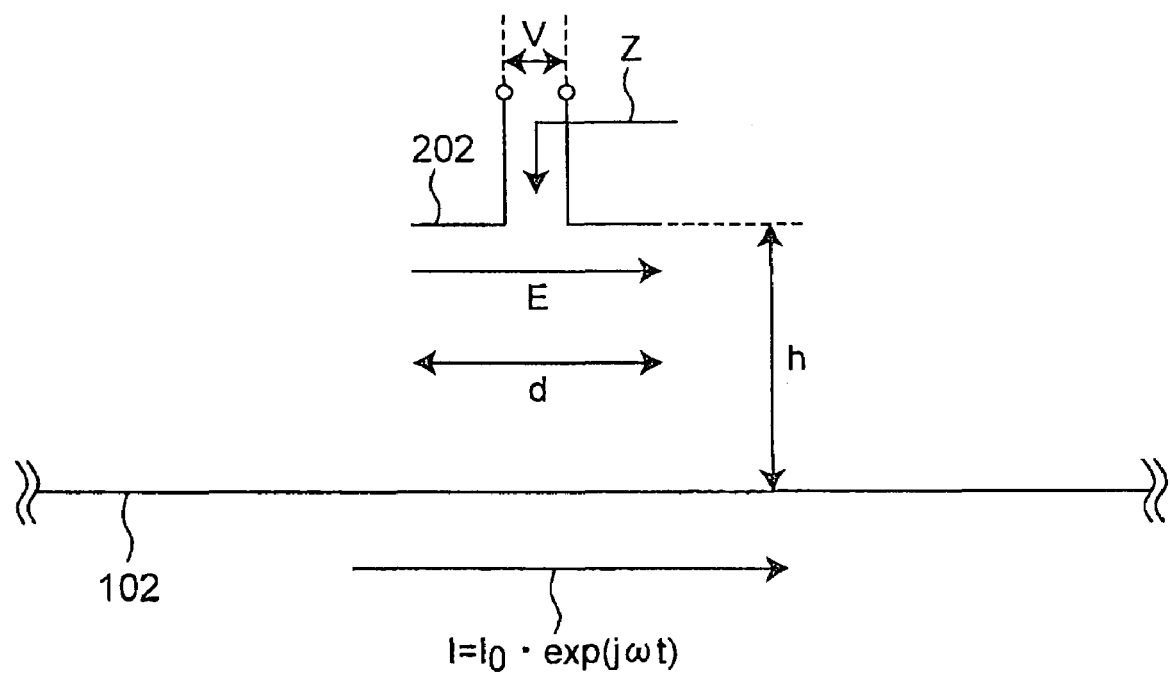
FIG. 44 is a cross-sectional view illustrating a method for detecting a current I flowing on an upper housing 102 using a magnetic field detection minute dipole 202.
Figure 45:
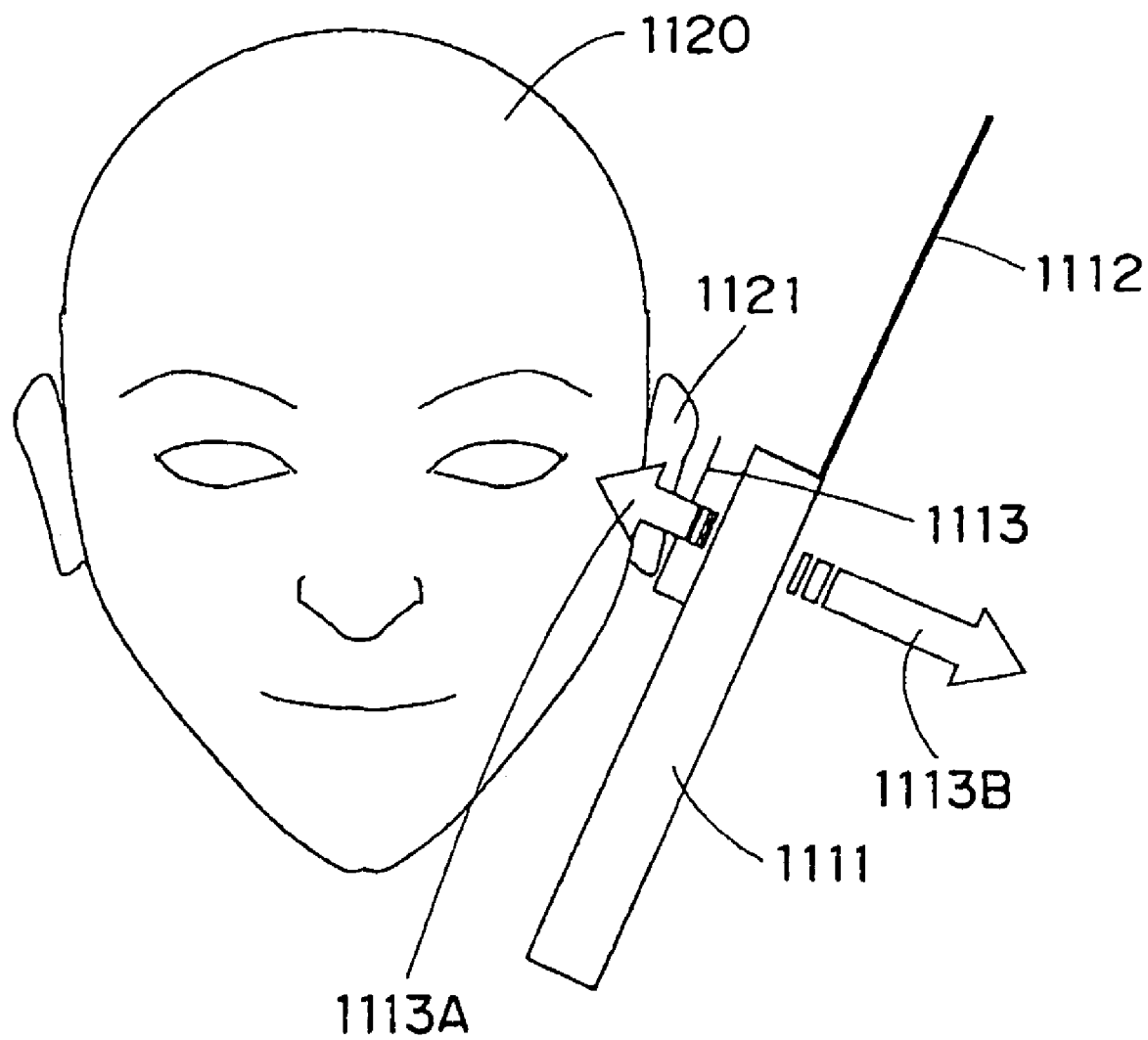
FIG. 45 is a front view showing that the radio communication apparatus including a radio antenna according to a prior art is supported by the head of the human body.
Figure 46:
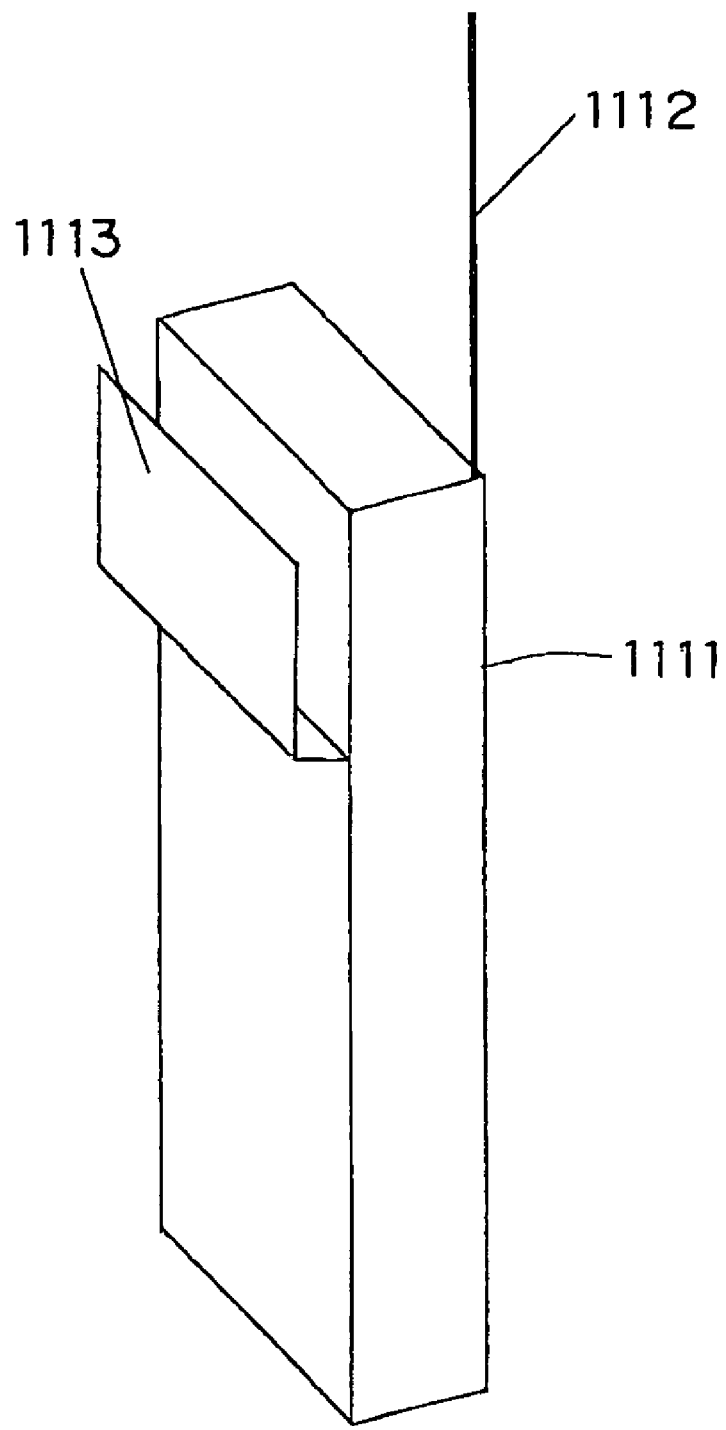
FIG. 46 is a perspective view showing an appearance of the radio communication apparatus shown in FIG. 45.

FIG. 44 is a cross-sectional view illustrating a method for detecting a current I flowing on an upper housing 102 using a magnetic field detection minute dipole 202.

Referring to FIG. 44, the magnetic field detecting probe 202 is a probe including a minute dipole having a minute length "d" ($d<<\lambda$; $\omega= 2\pi f$, $\lambda=c/f$, and c is a velocity of light). The magnetic field detecting probe 202 is mounted above the upper housing 102 so that the probe 202 is in proximity to the upper housing 102 by a distance "h", and so that a longitudinal direction of the minute dipole is substantially in parallel with a surface of the upper housing 102. It is assumed herein that an electromotive force on a terminal of the magnetic field detection minute dipole 202 is V, and an input impedance relative to the magnetic field detection minute dipole 202 on the terminal is Z. In addition, when the magnetic field detection minute dipole 202 is employed, a maximum distance "h" is determined by a received power Pr as shown below. When an electric field at the minute dipole 202 away from the current I by the distance "h" is E, the electromotive force V is expressed by the following Equation (12):

$$V=E \cdot d \qquad (12).$$

When a ratio of the electric field to the magnetic field is $\eta$, the electric field E is expressed by the following Equation (13):

$$E=\eta \cdot H \qquad (13).$$

Accordingly, substitution of the Equation (12) to the Equation (13) can be led to the following Equation (14):

$$E=\eta \cdot I_o/(2\pi h) \qquad (14).$$

Therefore, the electromotive force V and the received power Pr are expressed by the following Equations (15) and (16), respectively:

$$V=E \cdot d= \eta \cdot I_o \cdot d/(2\pi h) \qquad (15); \text{ and}$$

$$Pr=V^2/Z= (\eta \cdot I_o \cdot d/(2\pi h))^2/Z \qquad (16).$$

As is apparent from the Equation (16), when the received power Pr is measured, the current $I_o$ can be detected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A radio antenna apparatus comprising an antenna connected with a radio communication circuit that transmits and receives a radio signal, said radio antenna apparatus comprising:
a parasitic element;
a load impedance element connected between said parasitic element and a ground of a housing of a radio communication apparatus including the radio communication circuit; and
a controller for controlling an element value of said load impedance element so as to set a current flowing on said housing to be equal to or smaller than a predetermined value when said radio communication apparatus transmits the radio signal, thereby controlling a specific absorption rate (SAR) to be equal to or smaller than a predetermined value.

2. The radio antenna apparatus as claimed in claim 1, further comprising a storage device for storing, as a table, the element value of said load impedance element at which the current flowing on said housing is equal to or smaller than the predetermined value when said radio communication apparatus transmits the radio signal,
wherein said controller controls the element value of said load impedance element with reference to the table stored in said storage device.

3. The radio antenna apparatus as claimed in claim 1, further comprising a storage device for storing, for each predetermined frequency as a table, the element value of said load impedance element at which the current flowing on said housing is equal to or smaller than the predetermined value when said radio communication apparatus transmits the radio signal,
wherein said controller controls the element value of said load impedance element with reference to the table stored in said storage device, based on a communication frequency of said radio communication apparatus.

4. The radio antenna apparatus as claimed in claim 1, further comprising a measurement device for measuring the current flowing on said housing when said radio communication apparatus transmits the radio signal,
wherein said controller controls the element value of said load impedance element so as to set the current flowing on said housing to be equal to or smaller than the predetermined value based on said measured current.

5. The radio antenna apparatus as claimed in claim 1, wherein said load impedance element comprises:
a plurality of impedance elements respectively having element values different from each other; and
a switching device for changing the element value of said load impedance element by selectively changing over one of said plurality of impedance elements.

6. The radio antenna apparatus as claimed in claim 1, wherein said load impedance element comprises an impedance element capable of changing the element value, an element value of the impedance element capable of changing said element value being changed thereby changing the element value of said load impedance element.

7. The radio antenna apparatus as claimed in claim 1, wherein said load impedance element comprises an impedance circuit that includes a variable capacitance diode, a reverse bias voltage applied to said variable capacitance diode being changed so as to change an impedance of said impedance circuit, thereby changing the element value of said load impedance element.

8. The radio antenna apparatus as claimed in claim 1, further comprising a human body proximity sensor for detecting that a human body is in proximity to the housing of said radio communication apparatus,
wherein the element value of said load impedance element is controlled as to set the current flowing on said housing to be equal to or smaller than the predetermined value when said human proximity sensor detects that the human body is in proximity to said radio communication apparatus and said radio communication apparatus transmits the radio signal.

9. The radio antenna apparatus as claimed in claim 1, further comprising:
- a human body proximity sensor for detecting that a human body is in proximity to the housing of said radio communication apparatus; and
- a temperature sensor for measuring a body temperature when the human body contacts with the housing of said radio communication apparatus,
- wherein the element value of said load impedance element is controlled so as to set the current flowing on said housing to be equal to or smaller than the predetermined value, when the body temperature measured by said temperature sensor is equal to or higher than a predetermined value, said human proximity sensor detects that the human body is in proximity to said radio communication apparatus, and said radio communication apparatus transmits the radio signal.

10. The radio antenna apparatus as claimed in claim 1, further comprising:
- a human body proximity sensor for detecting that a human body is in proximity to the housing of said radio communication apparatus; and
- a touch sensor for measuring a stress when the human body contacts with the housing of said radio communication apparatus,
- wherein the element value of said load impedance element is controlled so as to set the current flowing on said housing to be equal to or smaller than the predetermined value, when the stress measured by said touch sensor is equal to or larger than a predetermined value, said human proximity sensor detects that the human body is in proximity to said radio communication apparatus, and said radio communication apparatus transmits the radio signal.

11. The radio antenna apparatus as claimed in claim 1, further comprising:
- a human body proximity sensor for detecting that a human body is in proximity to the housing of said radio communication apparatus;
- a touch sensor for measuring a stress when the human body contacts with the housing of said radio communication apparatus; and
- a temperature sensor for measuring a body temperature when the human body contacts with the housing of said radio communication apparatus,
- wherein the element value of said load impedance element is controlled so as to set the current flowing on said housing to be equal to or smaller than the predetermined value, when the body temperature measured by said temperature sensor is equal to or higher than a predetermined value, the stress measured by said touch sensor is equal to or larger than a predetermined value, said human proximity sensor detects that the human body is in proximity to said radio communication apparatus, and said radio communication apparatus transmits the radio signal.

12. The radio antenna apparatus as claimed in claim 1,
wherein said antenna is either one of a monopole antenna and a helical antenna, and
wherein said parasitic element is an electrical conductor plate.

13. A radio antenna apparatus comprising:
a first antenna;
a second antenna;
a switch device for switching over so as to connect said second antenna to a ground of a housing of a radio communication apparatus including a radio communication circuit, that is provided in said radio communication apparatus and transmits and receives a radio signal, through a load impedance element when said first antenna is connected with the radio communication circuit, and so as to connect said first antenna to the ground of said housing through said load impedance element when said second antenna is connected with the radio communication circuit that transmits and receives the radio signal; and
a controller for controlling an element value of said load impedance element so as to set a current flowing on said housing to be equal to or smaller than a predetermined value when said radio communication apparatus transmits the radio signal, thereby controlling a specific absorption rate (SAR) to be equal to or smaller than a predetermined value.

14. The radio antenna apparatus as claimed in claim 13,
wherein said first antenna is either one of a monopole antenna and a helical antenna, and
wherein said second antenna is a plane antenna or an inverse F antenna.

15. A radio communication apparatus comprising:
a radio antenna apparatus including an antenna connected with a radio communication circuit that transmits and receives a radio signal; and
a radio communication circuit, operatively connected with said antenna, for transmitting and receiving a radio signal,
wherein said radio antenna apparatus comprises:
a parasitic element;
a load impedance element connected between said parasitic element and a ground of a housing of the radio communication apparatus including the radio communication circuit; and
a controller for controlling an element value of said load impedance element so as to set a current flowing on said housing to be equal to or smaller than a predetermined value when said radio communication apparatus transmits the radio signal, thereby controlling a specific absorption rate (SAR) to be equal to or smaller than a predetermined value.

16. The radio communication apparatus as claimed in claim 15,
wherein said radio communication apparatus is a portable radio communication apparatus.

17. A radio communication apparatus comprising:
a radio antenna apparatus including first and second antennas; and
a radio communication circuit, operatively connected with either one of said first antenna and said second antenna, for transmitting and receiving a radio signal,
wherein the radio antenna apparatus further comprises:
a switch device for switching over so as to connect said second antenna to a ground of a housing of the radio communication apparatus including the radio communication circuit, that is provided in said radio communication apparatus and transmits and receives a radio signal, through a load impedance element when said first antenna is connected with the radio communication circuit, and so as to connect said first antenna to the ground of said housing through said load impedance element when said second antenna is connected with the radio communication circuit that transmits and receives the radio signal; and a controller for controlling an element value of said load impedance element so as to set a current flowing on said housing to be equal to or smaller than a predetermined value when said radio communication apparatus transmits the radio signal, thereby controlling a specific absorption rate (SAR) to be equal to or smaller than a predetermined value.

18. The radio communication apparatus as claimed in claim 17, wherein said radio communication apparatus is a portable radio communication apparatus.

* * * * *